US006427915B1

(12) United States Patent
Wike, Jr. et al.

(10) Patent No.: US 6,427,915 B1
(45) Date of Patent: Aug. 6, 2002

(54) METHOD OF OPERATING CHECKOUT SYSTEM HAVING MODULAR CONSTRUCTION

(75) Inventors: Charles K. Wike, Jr., Sugar Hill; Kurt J. Lippert, Snellville; Paul F. Nugent, Jr., Alpharetta, all of GA (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/432,636

(22) Filed: Nov. 2, 1999

(51) Int. Cl.7 ................................................ G06K 15/00

(52) U.S. Cl. .......................... 235/383; 235/385; 186/68

(58) Field of Search ................................ 235/379, 383, 235/385; 186/59, 60, 62, 63, 66, 67, 68

(56) References Cited

U.S. PATENT DOCUMENTS

| | | | | | |
|---|---|---|---|---|---|
| 3,076,528 | A | * | 2/1963 | Potrafke | |
| 3,651,566 | A | * | 3/1972 | Kincaid et al. | |
| 3,688,873 | A | * | 9/1972 | Potrafke | 186/68 |
| 3,725,895 | A | | 4/1973 | Haynes | |
| 3,960,420 | A | * | 6/1976 | Speraw et al. | 186/66 |
| 4,061,205 | A | * | 12/1977 | Musser | 186/66 |
| 4,265,336 | A | * | 5/1981 | Foster | 186/66 |
| 4,474,288 | A | * | 10/1984 | Majewski | 186/68 |
| 4,676,343 | A | | 6/1987 | Hymble et al. | |
| 4,779,706 | A | | 10/1988 | Mergenthaler | |
| 4,792,018 | A | | 12/1988 | Humble et al. | |
| 4,947,028 | A | | 8/1990 | Gorog | |
| 5,083,638 | A | | 1/1992 | Schneider | |
| 5,115,888 | A | | 5/1992 | Schneider | |
| 5,174,413 | A | | 12/1992 | Cappi et al. | |
| 5,250,789 | A | | 10/1993 | Johnsen | |
| 5,375,680 | A | | 12/1994 | Ikeda et al. | |
| 5,378,860 | A | | 1/1995 | Dingfelder et al. | |
| 5,424,524 | A | | 6/1995 | Ruppert et al. | |
| 5,426,282 | A | | 6/1995 | Humble | |
| 5,434,394 | A | | 7/1995 | Roach et al. | |
| 5,437,346 | A | | 8/1995 | Dumont | |
| 5,478,989 | A | | 12/1995 | Shepley | |
| 5,494,136 | A | | 2/1996 | Humble | |
| 5,497,853 | A | | 3/1996 | Collins, Jr. et al. | |
| 5,543,607 | A | | 8/1996 | Watanabe et al. | |
| 5,544,040 | A | | 8/1996 | Gerbaulet | |
| 5,560,450 | A | | 10/1996 | Kouno | |
| 5,609,223 | A | | 3/1997 | Iizaka et al. | |
| 5,662,190 | A | | 9/1997 | Abe | |
| 5,706,912 | A | * | 1/1998 | Holland | 186/68 |
| 5,708,782 | A | | 1/1998 | Larson et al. | |
| 5,747,784 | A | | 5/1998 | Walter et al. | |
| 5,752,582 | A | | 5/1998 | Hayward | |
| 5,832,457 | A | | 11/1998 | O'Brien et al. | |
| 5,845,259 | A | | 12/1998 | West et al. | |
| 5,845,263 | A | | 12/1998 | Camaisa et al. | |
| 5,884,281 | A | | 3/1999 | Smith et al. | |
| 5,884,728 | A | | 3/1999 | d'Estaintot et al. | |
| 5,890,135 | A | | 3/1999 | Powell | |
| 6,155,381 | A | * | 12/2000 | White et al. | 186/68 |

* cited by examiner

*Primary Examiner*—Mark Tremblay
(74) *Attorney, Agent, or Firm*—Maginot, Moore & Bowman LLP

(57) ABSTRACT

A checkout terminal includes a first bagging station and a second bagging station which is spaced apart from the first bagging station. The terminal also includes an item transport mechanism. The item transport mechanism is positionable between a first transport position and a second transport position. The item transport mechanism is configured to transport a first item for purchase of the number of items for purchase to the first bagging station when the item transport mechanism is positioned in the first transport position. The item transport mechanism is further configured to allow a second item for purchase of the number of items for purchase to be advanced to the second bagging station when the item transport mechanism is positioned in the second transport position. A method of operating a checkout terminal is also disclosed.

13 Claims, 31 Drawing Sheets

METHOD OF OPERATING CHECKOUT SYSTEM HAVING MODULAR CONSTRUCTION

CROSS REFERENCE

Cross reference is made to copending U.S. patent applications Ser. No. 09/432,638, entitled "Apparatus and Method for Operating a Checkout System Having a Security Scale for Providing Security During an Assisted Checkout Transaction" by Wilfried E. Y. Dejaeger; Ser. No. 09/432, 641, entitled "Apparatus and Method for Operating a Checkout System Having a Scanner Which is Rotatable Between an Assisted Scanner Position and a Self-Service Scanner Position" by Wilfried E. Y. Dejaeger, Mark S. Hoffman, Terry M. Glogovsky, and Alfred J. Hutcheon; Ser. No. 09/432,640, entitled "Apparatus and Method for Operating Convertible Checkout System Which Has a Customer Side and a Personnel Side" by Wilfried E. Y. Dejaeger, Alfred J. Hutcheon, John C. Addy, and James Morrison; Ser. No. 09/432,635, entitled "Apparatus and Method for Operating a Checkout System Having an Item Set-Aside Shelf Which is Movable Between a Number of Shelf Positions" by Paul F. Nugent, Jr.; Ser. No. 09/432,634, entitled "Apparatus and Method for Operating a Checkout System Having a Number of Port Expander Devices Associated Therewith" by Robert T. Snyder; Ser. No. 09/432,637, entitled "Apparatus and Method for Operating a Checkout System Having a Power Distribution Architecture Which Conforms to an International Standard" by Robert T. Snyder; Ser. No. 09/432,626, entitled "Apparatus and Method for Operating a Checkout System Having an Electronic Security Deactivation Device Associated Therewith" by Robert T. Snyder and Kurt J. Lippert; Ser. No. 09/432,157, entitled "Apparatus and Method for Operating a Checkout System Which Has a Number of Payment Devices for Tendering Payment During an Assisted Checkout Transaction" by Donald L. Forsythe and Horng Jaan Lin; Ser. No. 09/432,630, entitled "Apparatus and Method for Operating a Checkout System Having a Number of Interface Terminals Associated Therewith" by Kurt J. Lippert, Charles K. Wike, Jr., and Paul F. Nugent, Jr.; Ser. No. 09/432,639, entitled "Apparatus and Method for Operating a Checkout System Having a Display Monitor Which Displays Both Transaction Information and Customer-Specific Messages During a Checkout Transaction" by Wilfried E. Y. Dejaeger; Ser. No. 09/432,627, entitled "Apparatus and Method for Operating a Checkout System Having an RF Transmitter for Communicating to a Number of Wireless Personal Pagers" by Robert T. Snyder; Ser. No. 09/432,631, entitled "Apparatus and Method for Operating a Checkout System Having an RF Transmitter for Communicating to a Receiver Associated with an Intercom System" by Robert T. Snyder and Kurt J. Lippert; Ser. No. 09/432,627, entitled "Apparatus and Method for Operating a Checkout System Having a Number of Item Sensors for Controlling Operation of an Input Belt Mechanism" by Kurt J. Lippert and Robert T. Snyder; and Ser. No. 09/432,629, entitled "Apparatus and Method for Operating a Checkout System Having a Video Camera for Enhancing Security During Operation Thereof" by Kurt J. Lippert, each of which is assigned to the same assignee as the present invention, and each of which is filed concurrently herewith.

TECHNICAL FIELD OF THE INVENTION

The present invention relates generally to a checkout system, and more particularly to an apparatus and method for operating a checkout system having a movable takeaway belt mechanism and associated system construction.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout systems developed which attempt to substantially eliminate the need for a checkout clerk.

A self-service checkout system is operated by a customer without the aid of a checkout clerk. Hence, during operation of a self-service checkout system, the customer scans individual items for purchase across a scanner and then places the scanned items into a grocery bag, if desired. The customer then pays for his or her purchases either at the self-service checkout system if so equipped, or at a central payment area which is staffed by a store employee. Thus, a self-service checkout system permits a customer to select, itemize, and in some cases pay for his or her purchases without the assistance of the retailer's personnel.

It should be appreciated that a given retailer may have a number of reservations in regard to implementation of self-service checkout systems into the retailer's operation. For example, certain self-service checkout systems which have heretofore been designed are more expensive relative to assisted checkout systems (i.e. retail checkout systems which are operated by an employee of the retailer such as a checkout clerk). The higher cost associated with a self-service checkout system is typically due to the fact that the system itself must perform functions that would normally be performed by the checkout clerk operating the checkout system thereby increasing the number of components associated with the self-service checkout system. For instance, in the case of a self-service checkout system, the system must provide security from improprieties such as theft. Moreover, in certain self-service checkout systems, the checkout system itself must collect payment from the customer for his or her items for purchase. It is the cost of the hardware and software necessary to provide such functions to the self-service checkout system which in certain cases cause the cost of the system to typically exceed the cost of an assisted checkout system.

Moreover, a number of retailers fear that the retailer's customers may not embrace the idea of using self-service checkout systems to checkout their items for purchase thereby potentially causing the systems to go unused in the retailer's store. In such a situation, the retailer would have expended a relatively substantial sum of money for a checkout system which is not being utilized thereby increasing costs associated with the retailer's operation.

Yet further, it is generally recognized that a well-trained checkout clerk is capable of completing a checkout transaction in a more timely manner relative to an untrained customer. Accordingly, during periods of peak demand within the retailer's store, it is desirable for the retailer to operate a relatively large number of assisted checkout systems in order to expedite the checkout process thereby preventing customers from undesirably being forced to wait in long checkout queues. However, during periods of lesser demand within the retailer's store, it is desirable for the retailer to operate a relatively large number of self-service checkout systems in order to reduce the number of employees (i.e. checkout clerks) that the retailer must have present in the store. Hence, a compromise must be made between the number of assisted checkout systems and the number of self-service checkout systems which are installed in the retailer's store.

What is needed therefore is a checkout system which overcomes one or more of the above-mentioned drawbacks. What is particularly needed is a low-cost, easy-to-operate checkout system that may be operated as either an assisted checkout system or a self-service checkout system. What is further needed is a checkout system that may be operated as either an assisted checkout system or a self-service checkout system that can be quickly and easily converted between the two types of systems.

SUMMARY OF THE INVENTION

In accordance with a first embodiment of the present invention, there is provided a method of operating a checkout terminal which has (i) an item transport mechanism which is movable between a first transport position and second transport position, (ii) a first bagging station, and (iii) a second bagging station. The method includes the step of positioning the item transport mechanism in the first transport position during a first period of time. The method also includes the step of advancing a first number of items for purchase to the first bagging station with the item transport mechanism subsequent to entry of the first number of items into the checkout terminal during the first period of time. The method further includes the step of positioning the item transport mechanism in the second transport position during a second period of time. Moreover, the method includes the step of advancing a second number of items for purchase to the second bagging station subsequent to entry of the second number of items into the checkout terminal during the second period of time.

In accordance with a second embodiment of the present invention, there is provided a checkout terminal. The terminal includes a first bagging station and a second bagging station which is spaced apart from the first bagging station. The terminal also includes an item transport mechanism. The item transport mechanism is positionable between a first transport position and a second transport position. The item transport mechanism is configured to transport a first item for purchase of the number of items for purchase to the first bagging station when the item transport mechanism is positioned in the first transport position. The item transport mechanism is further configured to allow a second item for purchase of the number of items for purchase to be advanced to the second bagging station when the item transport mechanism is positioned in the second transport position.

In accordance with a third embodiment of the present invention, there is provided a method of operating a checkout terminal. The method includes the step of providing a first terminal cabinet having (i) a scanner, (ii) a display device, (iii) a payment device, and (iv) a processing unit which is electrically coupled to each of the scanner, the display device, and the payment device. The method also includes the step of securing a second terminal cabinet to the first terminal cabinet during a first period of time, the second terminal cabinet having a belt mechanism secured thereto. The method also includes the step of transporting a first number of items substantially toward the scanner with the belt mechanism during the first period of time. The method further includes the step of operating the scanner so as to enter the first number of items into the checkout terminal during the first period of time. Moreover, the method includes the step of detaching the second terminal cabinet from the first terminal cabinet. Yet further, the method includes the step of securing a third terminal cabinet to the first terminal cabinet during a second period of time, the third terminal cabinet having a stationary counter top. In addition, the method includes the step of positioning a second number of items on the stationary counter top of the third terminal cabinet during the second period of time. The method also includes the step of operating the scanner so as to enter the second number of items into the checkout terminal during the second period of time.

It is therefore an object of the present invention to provide a new and useful checkout system.

It is moreover an object of the present invention to provide an improved checkout system.

It is a further object of the present invention to provide a new and useful method of operating a checkout system.

It is also an object of the present invention to provide an improved method of operating a checkout system.

It is yet another object of the present invention to provide a low-cost, easy-to-operate checkout system that may be operated as either an assisted checkout system or a self-service checkout system.

It is moreover an object of the present invention to provide a checkout system that may be operated as either an assisted checkout system or a self-service checkout system that can be quickly and easily converted between the two types of systems.

The above and other objects, features, and advantages of the present invention will become apparent from the following description and the attached drawings.

DETAILED DESCRIPTION OF THE INVENTION

Figure 1:
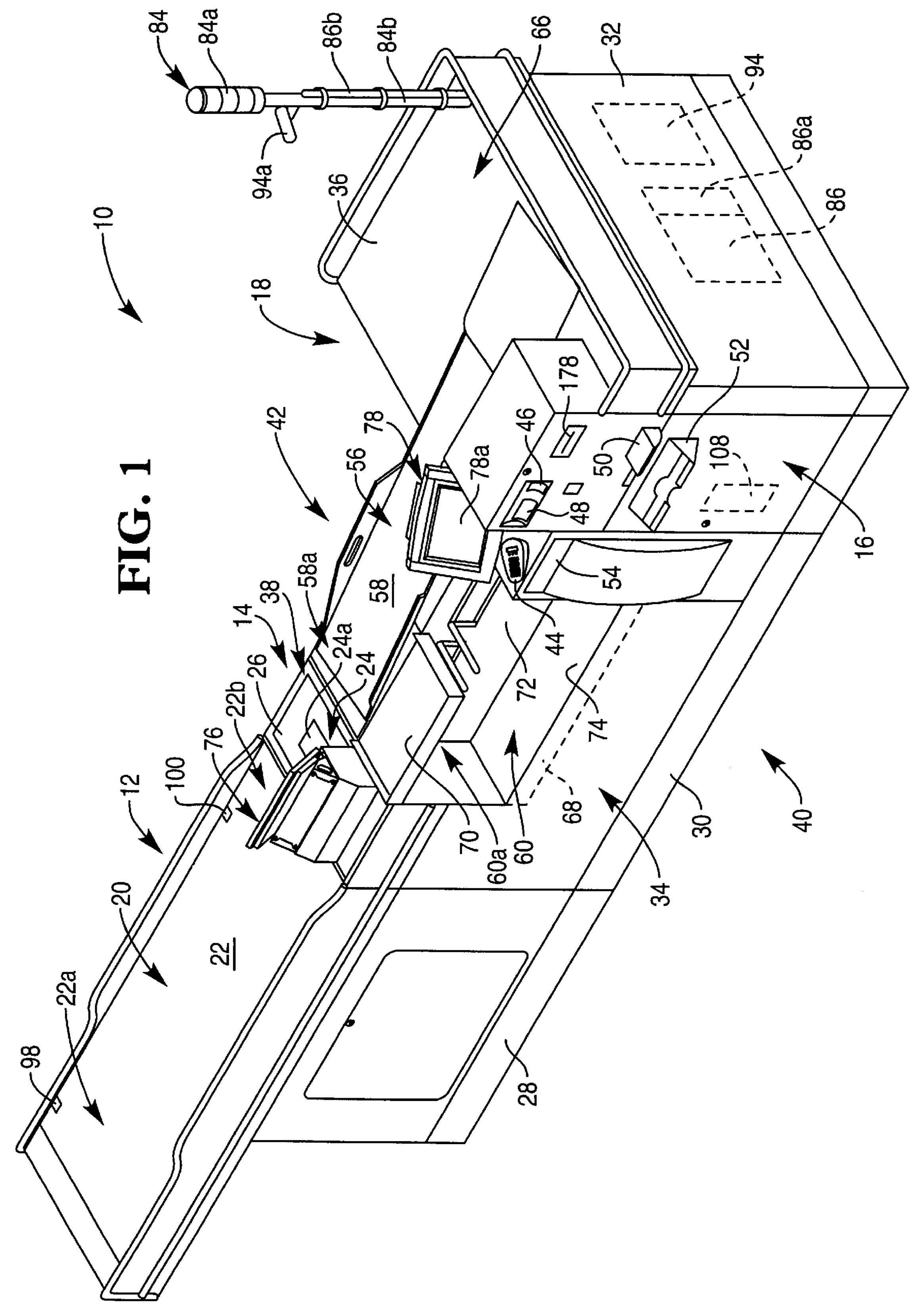
FIG. 1 is a perspective view of a retail checkout system which incorporates the features of the present invention therein, note that the checkout system is shown configured in its assisted checkout system configuration.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIGS. 1–8, there is shown a retail checkout terminal or system 10 for use in a retail business such as a grocery store. The checkout system 10 is configured to perform a number of retail functions such as assisted checkout functions and unassisted or "self-service" checkout functions. What is meant herein by the term "assisted checkout functions" or "assisted checkout transactions" are those checkout functions or transactions performed by a checkout system when the checkout system is being operated by retail personnel such as a clerk or associate which is employed by the retailer to operate the checkout system. For example, an assisted checkout function or transaction would be performed by the checkout system 10 in response to a store-employed clerk scanning or otherwise entering a customer's items for purchase into the checkout system, and thereafter depressing a payment-received key on the checkout system which indicates that the customer paid for such items. Accordingly, what is meant herein by the phrase "assisted mode of operation" is a configuration of the checkout system 10 which allows the system 10 to perform an assisted checkout function or transaction.

Moreover, what is meant herein by the term "self-service checkout functions" or "self-service checkout transactions" are those checkout functions or transactions which are performed by a checkout system by the customer himself or herself without the assistance of a clerk or other personnel employed by the retailer. For example, a self-service checkout function or transaction would be performed by the checkout system 10 in response to a customer himself or herself scanning or otherwise entering items for purchase into the checkout system, and thereafter depressing a payment key on the checkout system which indicates the manner by which the customer intends to pay for such items (e.g. by interaction with a credit/debit card reader or a currency acceptor). Accordingly, what is meant herein by the phrase "self-service mode of operation" is a configuration of the checkout system 10 which allows the system 10 to perform a self-service checkout function or transaction.

In addition, what is meant herein by the term "customer" is a person who enters a retailer's store, selects his or her items for purchase from the shopping area of the store, checks out his or items for purchase at a checkout system such as the checkout system 10 (including tendering payment for his or her items for purchase), and then exits the store subsequent to tendering payment. Hence, as used herein, a customer is distinguished from retail personnel such as a checkout clerk or other employee of the retailer in that a customer enters the retailer's store for the sole purpose of purchasing items from the store. Moreover, what is meant herein by the term "retail personnel" is a person that is employed by the retailer to perform a retail activity such as operation of a checkout system such as the checkout system 10 for the purpose of conducting a retail transaction such as an assisted checkout transaction. Examples of retail personnel include a checkout clerk or customer service manager. Also, the term "user" is herein used to refer to any operator of the checkout system 10. Accordingly, a user may be retail personnel, a customer, or any other person who operates the checkout system 10.

The checkout system 10 includes a pre-scan area 12, an itemization area 14, a payment area 16, and a post-scan area 18. The pre-scan area 12 includes an item transport mechanism such as an input belt mechanism 20 which includes an input belt 22. As will be discussed below in greater detail, the input belt mechanism 20 is utilized to convey items for purchase toward the itemization area 14 in order for the items to be scanned by a user of the checkout system 10.

The pre-scan area 12 also includes an upstream item sensor 98 and a downstream item sensor 100. The item sensors 98, 100 are preferably embodied as known photodetector devices which are capable of detecting presence of an item at predetermined locations on the input belt 22 when a light beam respectively generated the sensors 98, 100 is interrupted by an item. However, it should be appreciated that the item sensors 98, 100 may alternatively be embodied as any type of sensor which is capable of detecting presence of items on the input belt 22. The item sensors 98, 100 are provided to facilitate item movement from an upstream location to a downstream location on the input belt 22. The terms "upstream" and "downstream" are used herein to be consistent with the flow of items through the checkout system 10 during a typical checkout procedure. In particular, an item enters at the area proximate the pre-scan 12 then flows in a downstream direction to be scanned or otherwise entered at the itemization area 14. Once the item is scanned or otherwise entered at the itemization area 14, the item flows from the itemization area 14 in a downstream direction to the post-scan area 18.

Figure 4:
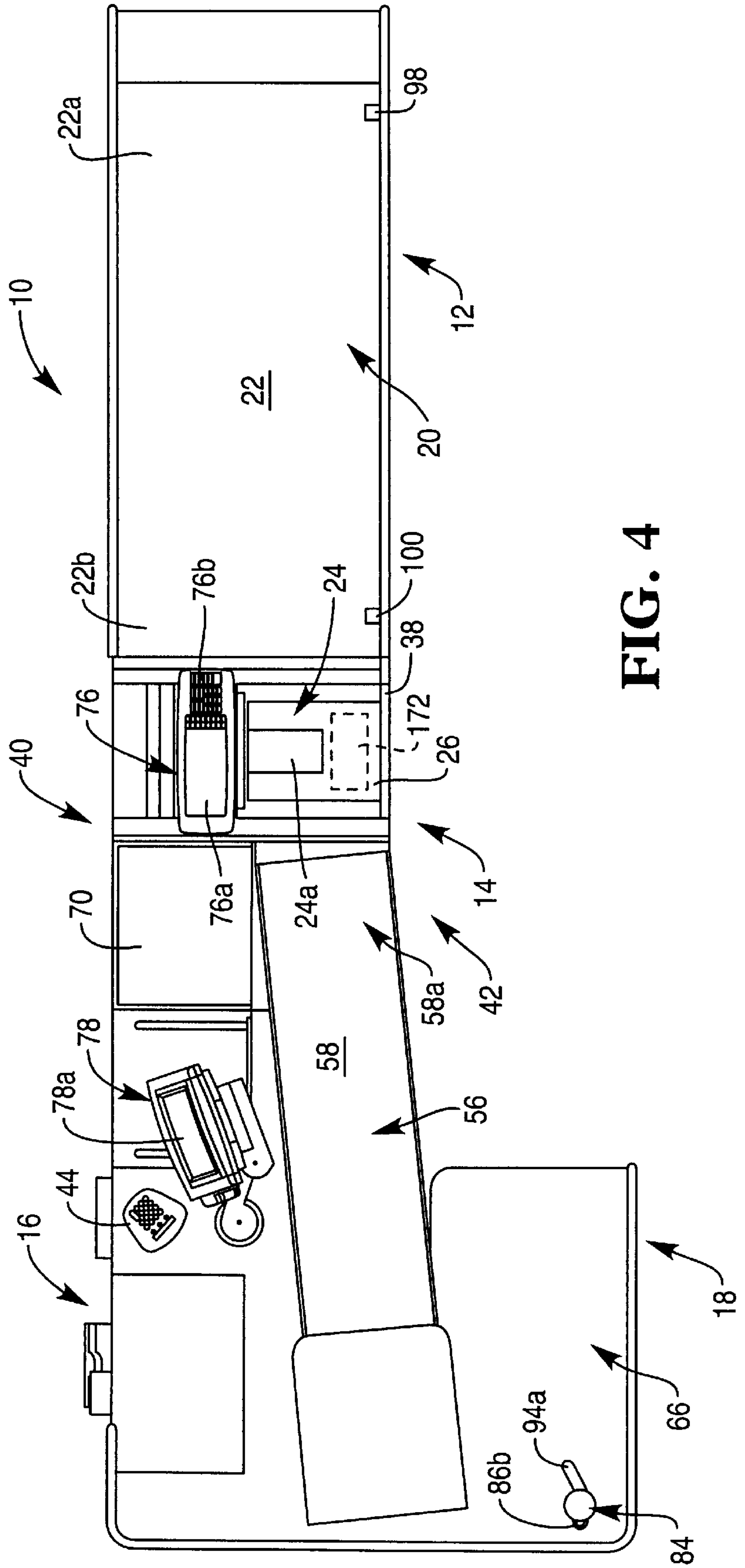
FIG. 4 is a plan view of the checkout system of FIG. 1.
Figure 8:
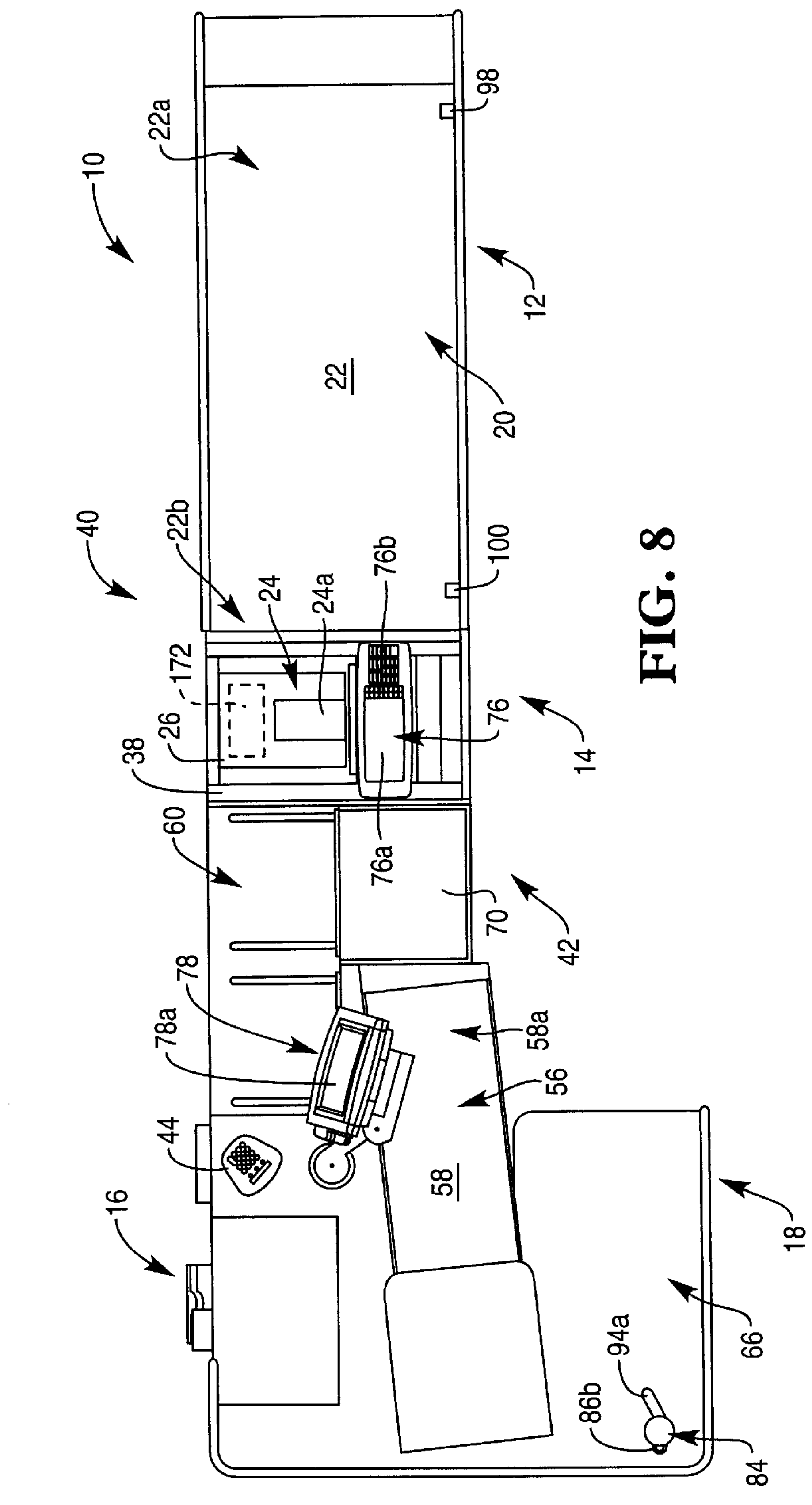
FIG. 8 is a plan view of the checkout system of FIG. 5.

The upstream item sensor 98 is provided to determine when a customer places an item on an upstream end portion 22*a* of the input belt 22. Although only a single item sensor 98 is shown in FIGS. 1–8, it should be appreciated that any number of item sensors 98 may be utilized so as to detect item placement at any location on the upstream end portion 22*a* of the input belt 22. As described below in greater detail, once the item sensor 98 detects presence of an item on the upstream end portion 22*a* of the input belt 22, the motor (not shown) associated with the input belt mechanism 20 is actuated so as to advance the input belt 22 thereby causing the item to be advanced in a downstream direction toward the itemization area 14. More specifically, actuation of the motor associated with the input belt mechanism 20 causes the item to be advanced in a downstream direction until it reaches a predetermined location at a downstream end portion 22*b* of the input belt. As can be seen in FIGS. 4 and 8, the downstream end portion 22*b* of the input belt 22 is upstream of the itemization area 14. Once the item is advanced to the predetermined location at the downstream end portion 22*b* of the input belt 22, presence of the item is detected by the downstream item sensor 100 which in turn causes the motor associated with the input belt mechanism 20 to be deactuated thereby halting advancement of the item at a position in which the item can be easily scanned or otherwise entered by a customer (in the case of when the checkout system 10 is being operated in its self-service mode of operation) or a checkout clerk (in the case of the were the checkout system 10 is being operated in its assisted mode of operation).

The itemization area 14 of the checkout system includes a scanner 24 and a product scale 26. The scanner 24 conventionally scans or reads a product identification code such as a Universal Product Code (UPC), industrial symbol (s), alphanumeric character(s), or other indicia associated with an item to be purchased. One scanner which may be used in the present invention is a model number 7875 bi-optic scanner which is commercially available from NCR Corporation of Dayton, Ohio.

Figure 2:
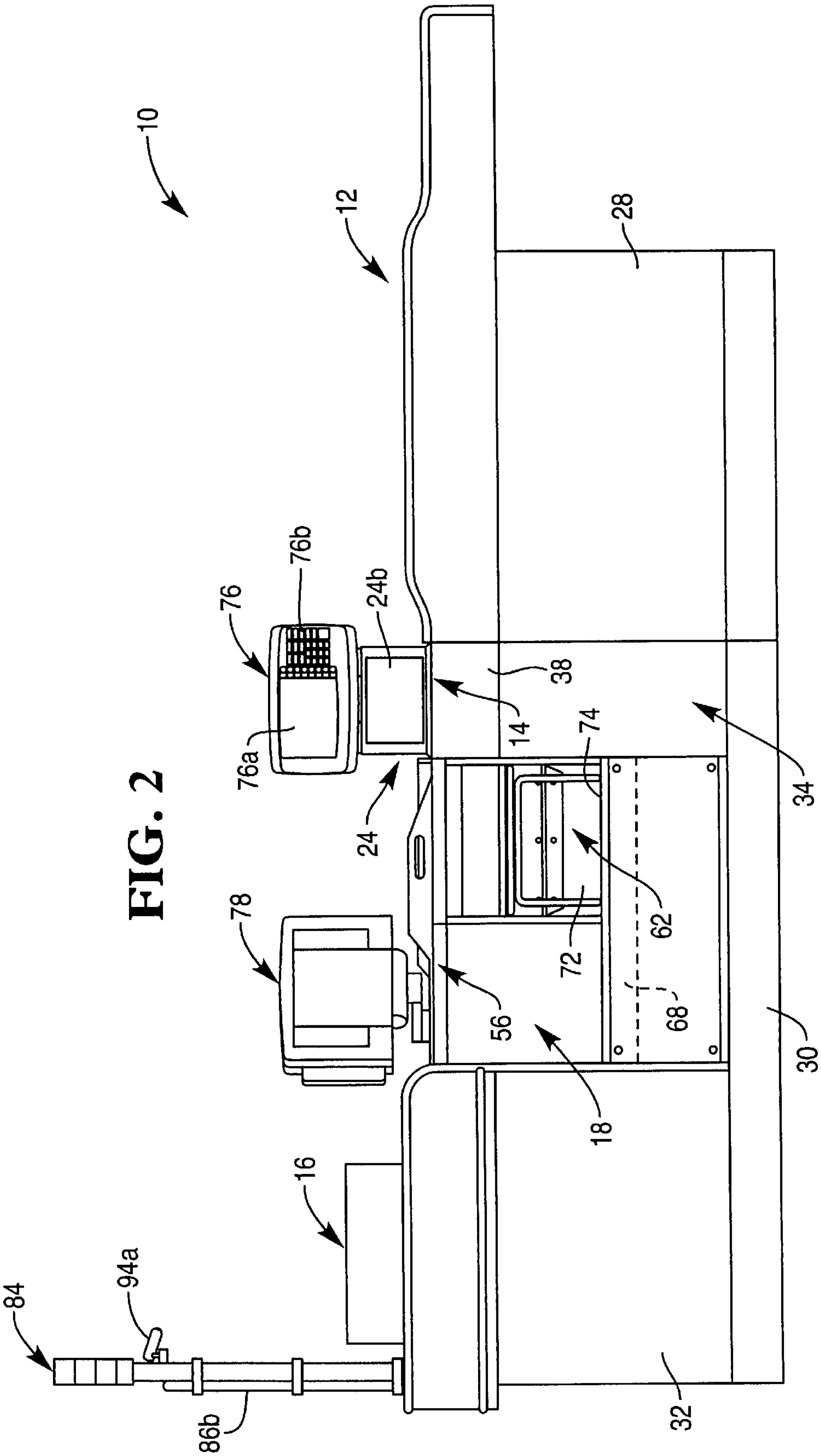
FIG. 2 is a side elevational of the personnel side of the checkout system of FIG. 1.
Figure 3:
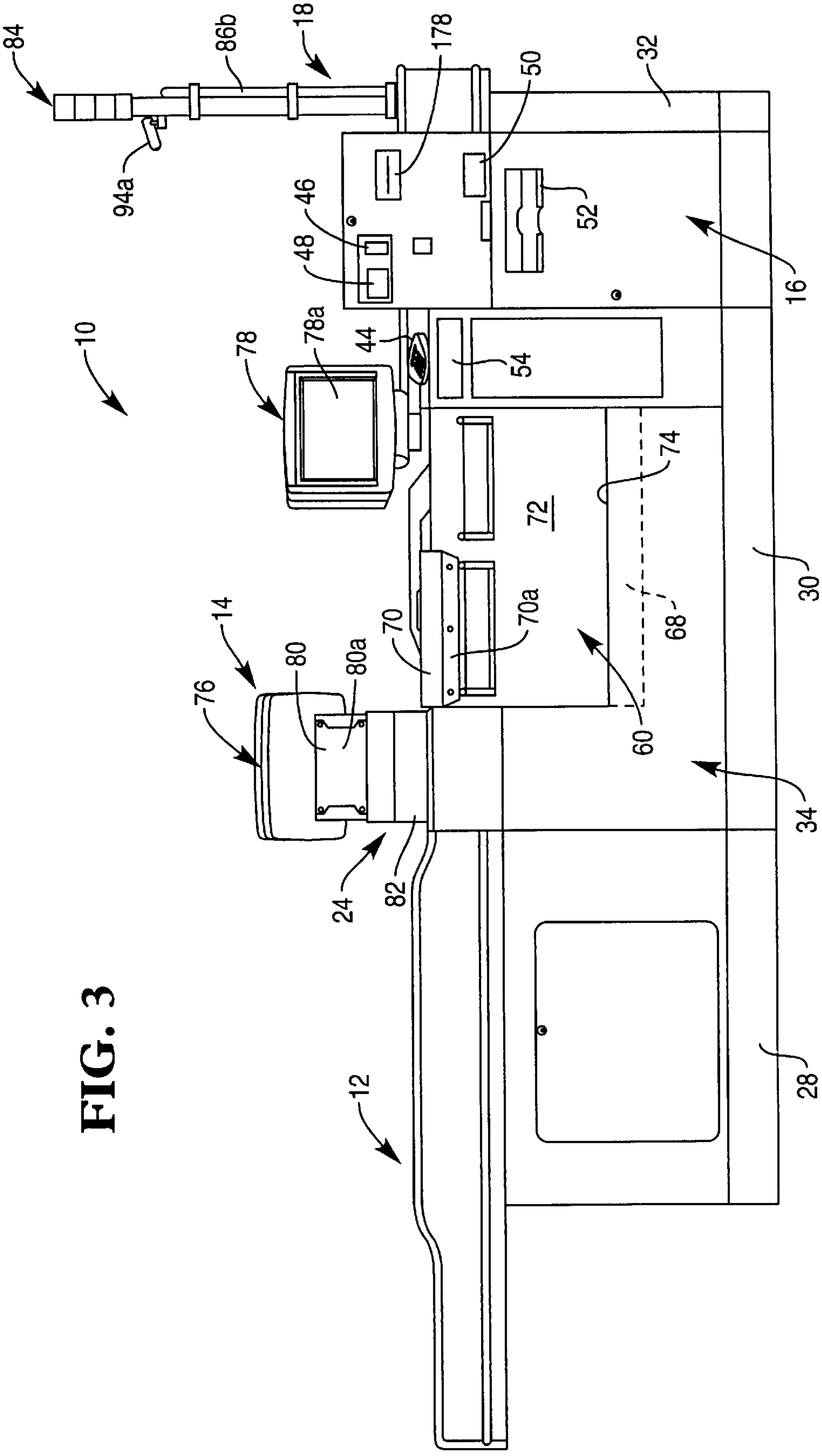
FIG. 3 is a side elevational view of the customer side of the checkout system of FIG. 1.
Figure 5:
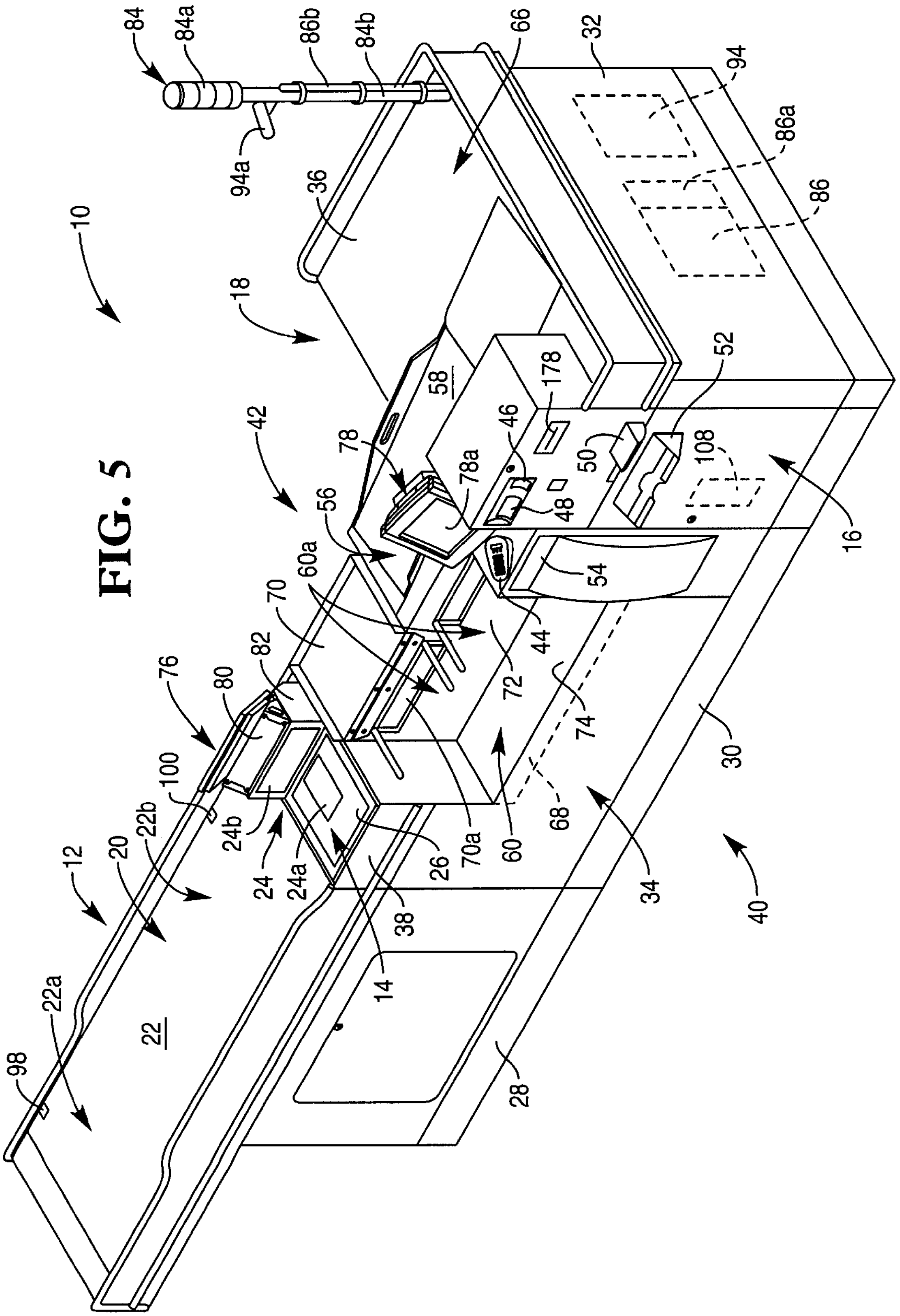
FIG. 5 is a view similar to FIG. 1, but showing the checkout system configured in its self-service checkout system configuration.
Figure 6:
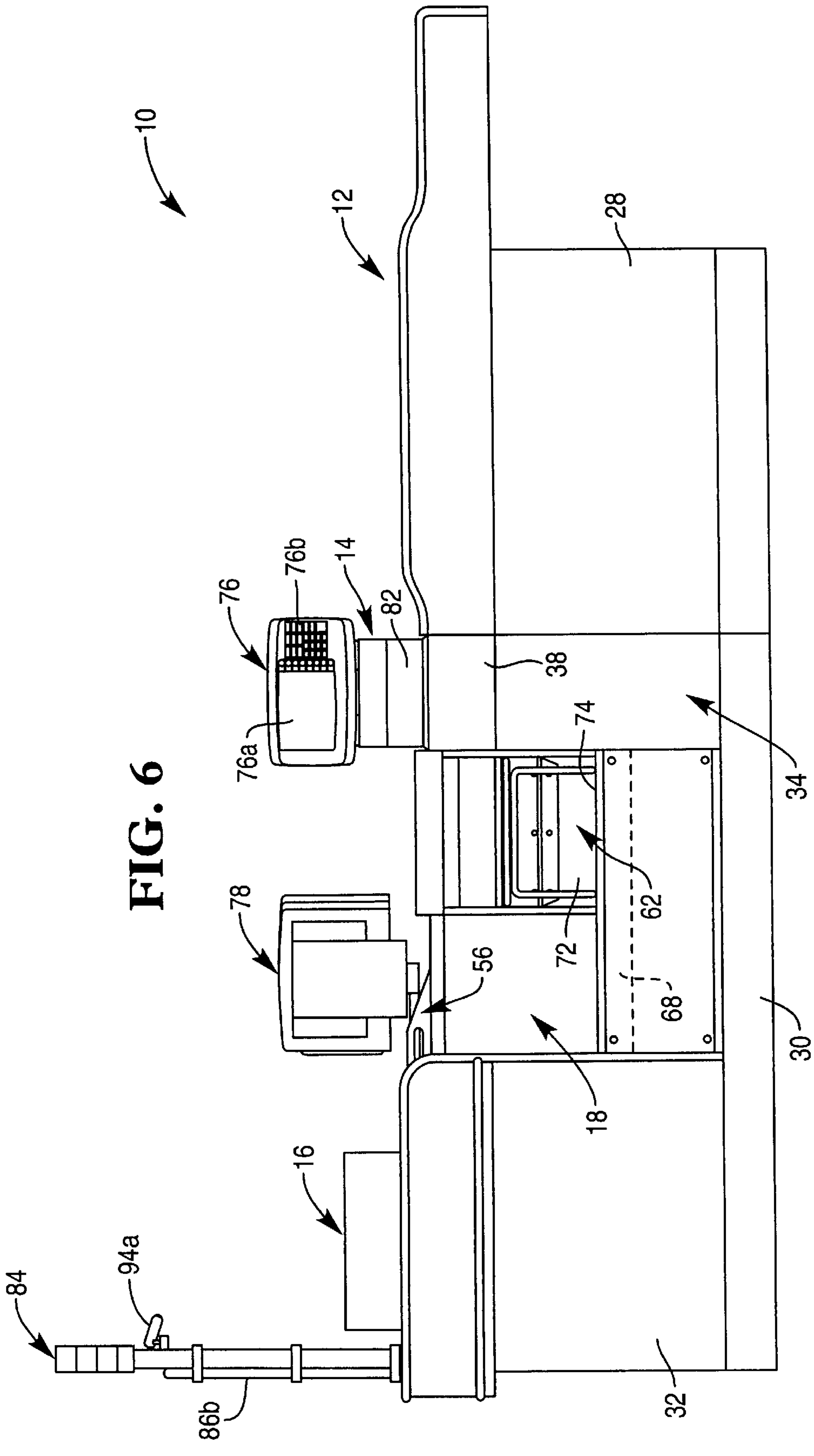
FIG. 6 is a side elevational of the personnel side of the checkout system of FIG. 5.
Figure 7:
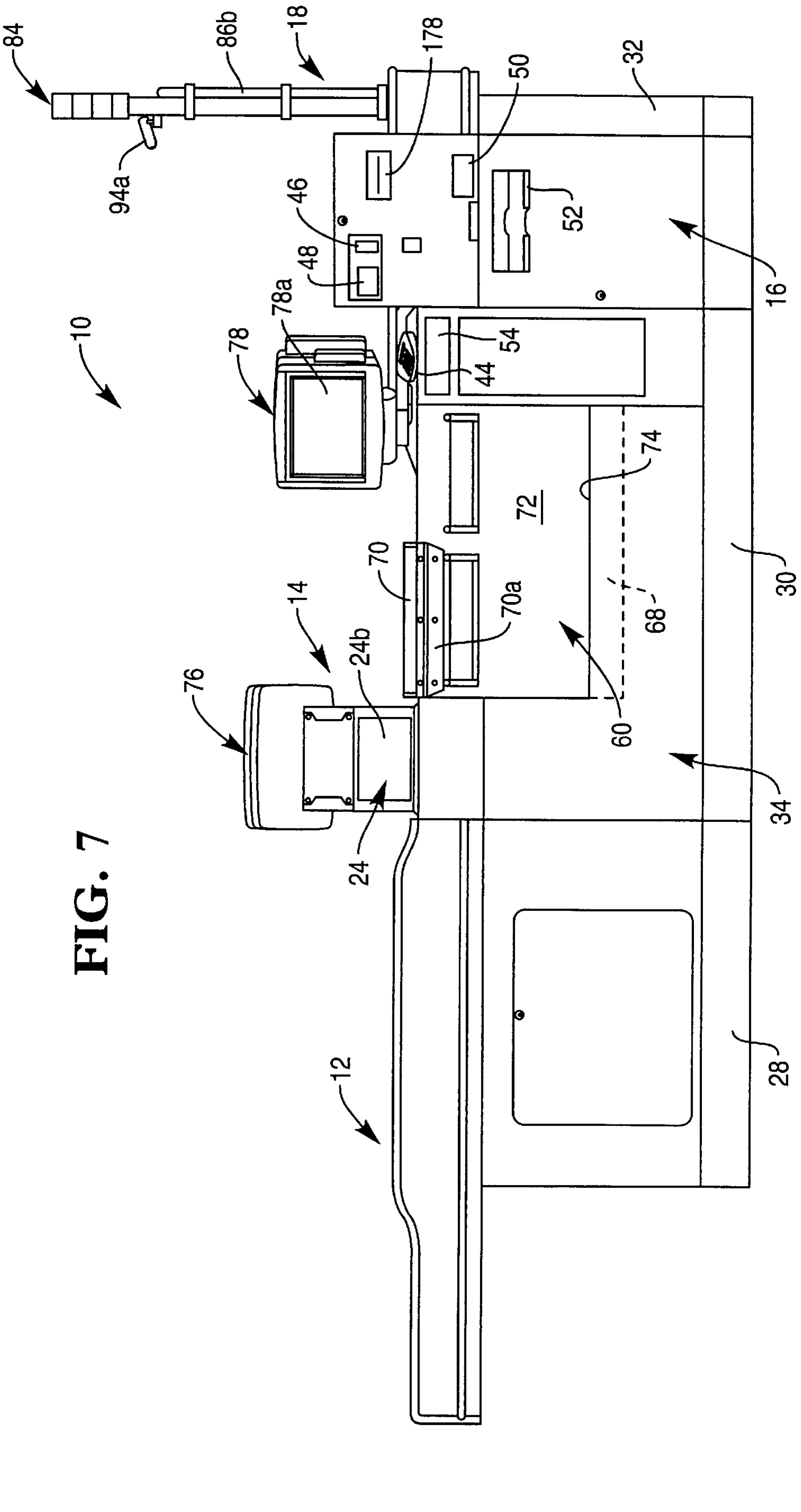
FIG. 7 is a side elevational view of the customer side of the checkout system of FIG. 5.

The scanner 24 includes a first scanning window 24*a* and a second scanning window 24*b*. The first scanning window 24*a* is disposed in a substantially horizontal manner, whereas the second scanning window 24*b* is disposed in a substantially vertical manner, as shown in FIG. 2. More specifically, the checkout system 10 includes a number of cabinets 28, 30, 32. A portion of the cabinets 28, 30, 32 define a terminal base 34 which has a substantially horizontal upper surface 36. As shown in FIGS. 1 and 5, the horizontal scanning window 24*a* is disposed in a relatively flush-mount arrangement with the upper surface 36 of the terminal base 34. Moreover, the product scale 26 is integrated with the scanner 24. More specifically, the product scale 26 is disposed substantially parallel to the upper surface 36 of the terminal base 34 and hence the horizontal scanning window 24*a* thereby enveloping the horizontal scanning window 24*a*. If an item such as produce is placed upon the product scale 26 or the horizontal scanning window 24*a*, the product scale 26 may be used to determine the weight of the item.

The scanner 24 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 24, the scanning light beams scatter off the code and are returned to the scanner 24 where they are collected and detected. The reflected light is then analyzed electronically in order to determine whether the reflected light contains a valid code pattern. If a valid code pattern is present, the product identification code may then be utilized to retrieve product information associated with the item (e.g. the price of the item).

Figure 11:
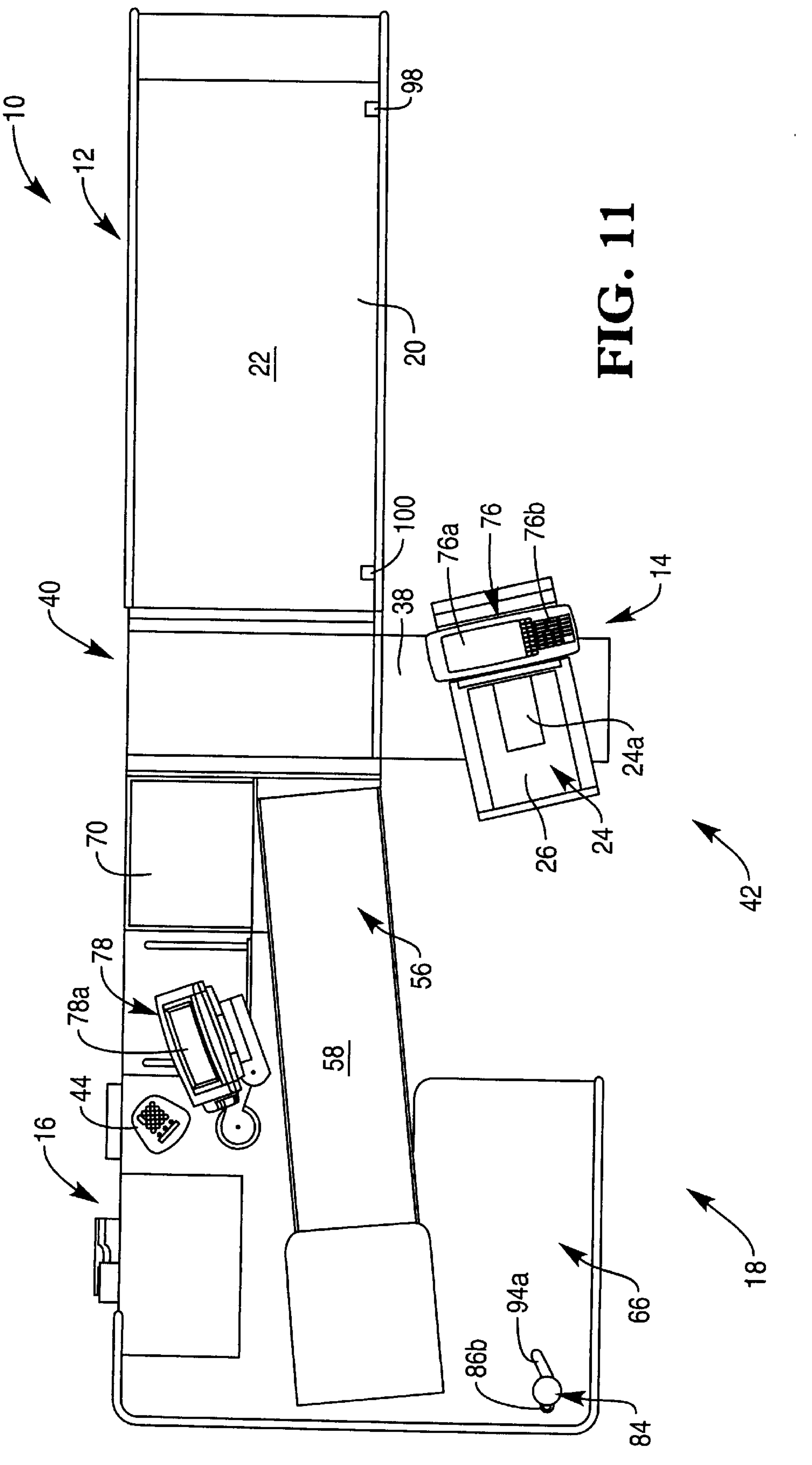
FIG. 11 is a plan view similar to FIGS. 4 and 8 which shows the scanner assembly during rotation thereof.

The scanner 24 and the product scale 26 are movably mounted to the terminal base 34. In particular, the scanner 24 and the product scale 26 are rotatably mounted to a support platform such as a sliding drawer assembly 38. Use of the sliding drawer assembly 38 allows the scanner 24 and the product scale 26 to be rotated relative to the terminal base 34 so as to be operated by either a customer or a checkout clerk. In particular, as shown in FIG. 11, the sliding drawer assembly 38 may be slid out from the terminal base 34 into its extended position such that the scanner 24 (and hence the product scale 26) may be rotated between an assisted scanner position (see FIGS. 1–4) in which the scanner 24 is operable by a checkout clerk, and a self-service scanner position (see FIGS. 5–8) in which the scanner 24 is operable by a customer. Thereafter, the sliding drawer assembly is slid back into its retracted position within the interior of the terminal base 34 such that operation of the scanner 24 by the checkout clerk or the customer may be commenced.

As shown in FIGS. 4 and 8, the checkout system 10 has a customer side 40 and a personnel side 42. More specifically, the terminal base 34 divides the checkout system 10 into the customer side 40 which is the side of the checkout system 10 where the customer is positioned during a checkout transaction, and the personnel side 42 which is the side of the checkout system 10 where retail personnel such as a checkout clerk is located during a checkout transaction. A customer is positioned on the customer side 40 of the checkout system 10 irrespective of whether the system 10 is being operated to perform an assisted checkout transaction or a self-service checkout transaction, whereas retail personnel is at all times positioned on the personnel side 42 of the checkout system 10. Use of the rotating scanner 24 facilitates such "same side" operation of the checkout system 10. In particular, as shown in FIGS. 1–4, rotation of the scanner 24 into its assisted scanner position causes the vertical scanning window 24*b* to face the personnel side 42 of the checkout system 10, whereas rotation of the scanner 24 into its self-service scanner position causes the vertical scanning window 24*b* to face the customer side 40 of the checkout system 10 (see FIGS. 5–8). Such a system configuration (i.e. use of the rotating scanner 24 to cause the customer to be positioned on the customer side 40 of the checkout system 10 irrespective of whether the system 10 is being operated to perform an assisted checkout transaction or a self-service checkout transaction, and retail personnel to be positioned on the personnel side 42 of the checkout system 10) is particularly useful for enhancing system component layout and system placement within the store.

The itemization area 14 also includes a security deactivation device 172 (see FIGS. 4 and 8). The security deactivation device 172 is provided to deactivate or otherwise disable security tags associated with an electronic article surveillance (EAS) system. In particular, certain items sold by the retailer may have an electronic tag secured thereto. Such electronic tags are generally a label or "clip-on" mechanism which has an electronic transponder imbedded therein which triggers an alarm if the item is taken from the retailer's store without the tag being deactivated or otherwise disabled beforehand. It should be appreciated that such tags are generally secured to items that are expensive in nature, but as the cost associated with such electronic tags continues to decrease, more and more items associated with a given retail operation may be equipped with such electronic tags.

In any event, the electronic tags associated with EAS systems are deactivated by exposing the tag to a magnetic field or an electromagnetic field such as an RF field. The security deactivation device 172 of the present invention generates such a magnetic field or electromagnetic field during operation of the checkout system 10 so as to deactivate electronic tags associated with items for purchase as the items are scanned with the scanner 24. In particular, the security deactivation device 172 generates a deactivation field (e.g. a magnetic and/or electromagnetic field) proximate to a scanner detection zone associated with the scanner 24. What is meant herein by the term "scanner detection zone" is the area proximate the scanning windows 24*a*, 24*b* of the scanner 24 which defines the maximum range in which an item can be successfully scanned as it is passed across the scanner 24. Security deactivation devices which are suitable for use as the security deactivation device 172 of the present invention are commercially available from Checkpoint Systems, Incorporated of Thorofare, N.J. (in the case of an RF field generator) and Sensormatic Electronics Corporation of Boca Raton, Fla. (in the case of a magnetic field generator).

By generating the deactivation field proximate to the scanner detection zone, a scanning motion utilized to scan an item with the scanner 24 causes the item to be advanced through the deactivation field thereby deactivating the electronic security tag secured to the item in the same scanning motion. Such utilization of the security deactivation device 172 is particularly useful when the checkout system 10 is being operated in its self-service mode of operation. In particular, by "automatically" deactivating the electronic security tag when the item is being scanned by a customer (i.e. deactivating the tag during a scanning motion), the customer is not required to perform additional operations for the sole purpose to deactivating the tag prior to exiting the store. In particular, heretofore designed self-service checkout systems have required the customer to take his or her items for purchase to a centralized area such as a terminal operated by a retail clerk after the customer has completed his or her transaction in order to allow the clerk to determine which of the customer's items contain electronic security tags that need to be deactivated. Thereafter, the clerk manually deactivates each of the electronic security tags associated with the customer's items for purchase. It should be appreciated that the extra step of requiring the customer to take his or her items to the centralized area to deactivate the electronic security tags adds cost to the retailer's operation (e.g. the cost associated with staffing the centralized area with a retail clerk) and also creates an inconvenience for the customer by requiring the customer to spend additional time in the retailer's store. Such an inconvenience to the customer is augmented if a line or queue is present at the centralized area.

Utilization of the security deactivation device 172 of the present invention solves such shortcomings of heretofore self-service checkout systems by deactivating the electronic security tag as part of routine entry of items into the checkout system 10 by the customer. In particular, utilization of the security deactivation device 172 eliminates the need for the retail clerk to intervene into the customer's transaction thereby reducing labor costs associated with the retailer's operation, along with increasing convenience to the customer by not requiring him or her to stand in a potentially long line or queue. Moreover, by generating the deactivation field proximate to the scanner detection zone such that the electronic security tag is deactivated as a result of an item scanning motion, the customer is not required to operate a separate deactivation device such as a magnetic pad or the like thereby reducing the number of components that a customer is presented with during operation of the checkout system 10 in its self-service mode of operation.

It should be appreciated that the security deactivation device 172 may be configured to continuously generate the deactivation field (e.g. the magnetic or electromagnetic field), or may only generate the deactivation field once the product code associated with the item has been captured by the scanner 24. In particular, under the premise that if the customer is making an attempt to scan the item, the customer is likely not trying to commit an impropriety such as theft, the security deactivation device 172 may be configured to continuously generate the deactivation field such that the electronic security tag is deactivated irrespective of whether or not the product code associated with the item is actually captured with the scanner 24. For example, if the customer attempts to scan the item with the scanner 24 (by advancing the item through the scanner detection zone with the bar code associated with the item facing one of the scanning windows 24*a*, 24*b*), but the product code is not captured by the scanner 24 for any reason, the security deactivation device 172, if configured to continuously produce the deactivation field, causes the electronic security tag to be deactivated even though the item was not actually entered in the checkout system 10. However, in the case of operation of the checkout system 10 by an honest customer, such premature deactivation of the security tag is not an issue once the customer is subsequently successful at entering the item (e.g. by re-scanning the item or manually entering the product code). It should be appreciated that the customer is likely to perform such re-scanning or manual entry of the item since the customer is not generally made aware of the fact that the electronic security tag has been deactivated.

However, to prevent the unlikely occurrence that the electronic security tag is prematurely deactivated without the item being subsequently entered in the checkout system 10, the security deactivation device 172 may be configured to generate the deactivation field only after the product code associated with the item has been entered into the checkout system 10. In particular, a control signal is generated when a product code associated with an item is captured by the scanner 24. In response to generation of such a control signal, the security deactivation device 172 may be instantaneously actuated so as to generate a deactivation field thereby deactivating the electronic security tag associated with the scanned item. In such a configuration, the location, width, and/or shape of the deactivation field generated by the security deactivation device 172 may be configured to ensure that the item is advanced therethrough during a scanning motion or subsequent handling motion (e.g. the motion associated with placement of the item into the post-scan area 18).

As shown in FIGS. 1 and 5, the payment area 16 of the checkout system 10 includes the system components necessary to allow a customer to perform retail finalization functions such as tendering payment for his or her items for purchase and printing of transaction receipts. In particular, the payment area 16 of the checkout system 10 includes an electronic payment terminal 44 having a card reader and keypad, a pair of currency acceptors such as a coin acceptor 46 and a bill acceptor 50, a corresponding pair of currency dispensers such as a coin dispenser 48 and a bill dispenser 52, and a receipt printer 54. As shown in FIG. 1, the system components associated with the payment area 16 are positioned to face the customer side 40 of the checkout system 10 so as to be accessible to a customer during a checkout transaction.

The system components associated with the payment area 16 of the checkout system 10 are provided to allow the customer to tender payment for his or her items for purchase when the checkout system 10 is being operated in its self-service mode of operation. In particular, once the customer has entered all of his or her items for purchase into the checkout terminal 10 during a self-service checkout transaction, the components associated with the payment area 16 are utilized to complete the self-service checkout transaction by (1) allowing payment to be tendered by either insertion of currency into a currency acceptor (i.e. the coin acceptor 46 and/or the bill acceptor 50), charging a credit card or debit card account, or decreasing a value amount stored on a smart card via the electronic payment terminal 44, and (2) printing a transaction receipt with the receipt printer 54. In the case of when a customer inserts currency into the coin acceptor 46 and/or the bill acceptor 50, the checkout system 10 may provide change via a currency dispenser (i.e. the coin dispenser 48 and/or the bill dispenser 52).

However, the system components associated with the payment area 16 of the checkout system 10 are also provided to enhance the efficiency and throughput associated with operation of the checkout system 10 in its assisted mode of operation. In particular, once the checkout clerk operating the checkout system 10 to perform the assisted checkout transaction has entered the last of the customer's items for purchase, the system components associated with the payment area 16 may be utilized to finalize or otherwise complete the customer's transaction without additional intervention or assistance from the checkout clerk. In particular, as the checkout clerk begins to enter items associated with a subsequent checkout transaction, the customer may tender payment for the previous checkout transaction by either inserting currency into a currency acceptor (i.e. the coin acceptor 46 and/or the bill acceptor 50), charging a credit card or debit card account, or decreasing a value amount stored on a smart card via the electronic payment terminal 44. In the case of when a customer inserts currency into the coin acceptor 46 and/or the bill acceptor 50, the checkout system 10 may provide change via a currency dispenser (i.e. the coin dispenser 48 and/or the bill dispenser 52). Thereafter, a transaction receipt is printed by the receipt printer 54 for presentation to the customer without assistance from retail personnel.

As described, use of the system components associated with the payment area 16 of the checkout system 10 provides numerous advantages to the checkout system 10 of the present invention. For example, by operating the checkout system 10 such that payment is tendered by the customer by use of the currency acceptor (i.e. the coin acceptor 46 and/or the bill acceptor 50) or the electronic payment device 44 without the assistance of the checkout clerk allows the checkout clerk to begin a subsequent transaction while the customer completes the current transaction thereby enhancing the efficiency and throughput associated with the checkout system 10. Similarly, operation of the electronic payment terminal 44 and generation of the transaction receipt on the customer side 40 of the checkout system 10 allows the customer to complete his or her transaction without further assistance from the checkout clerk thereby further enhancing the efficiency and throughput associated with the checkout system 10.

The post-scan area 18 includes an item transport mechanism such as a takeaway belt mechanism 56 having a takeaway belt 58. Moreover, the post-scan area 18 includes a includes a self-service bagwell 60 (see FIG. 1) and an assisted bagwell 62 (see FIGS. 2 and 6). The bagwells 60, 62 are provided to accommodate one or more grocery containers such as grocery bags (not shown). In particular, the self-service bagwell 60 is configured to allow two or more grocery bags to be accessed by the customer at any given time thereby allowing a customer to selectively load various item types into the grocery bags during operation of the checkout system 10 in its self-service mode of operation. For example, during a self-service checkout transaction, the customer may desire to use a first grocery bag for household chemical items such as soap or bleach, and a second grocery bag for edible items such as meat and produce in order to keep the two types of items separate.

Similarly, the assisted bagwell 62 is configured to allow two or more grocery bags to be accessed by the checkout clerk at any given time thereby allowing the clerk to selectively load various item types into the grocery bags during operation of the checkout system 10 in its assisted mode of operation. Such a configuration of the assisted bagwell 62 is particularly useful when the checkout system 10 is being operated by a checkout clerk to perform an "express" checkout transaction in which the total number of items for purchase in the transaction is relatively small and can therefore be bagged in a small number of grocery bags.

The takeaway belt mechanism 56 is provided to transport items which have been scanned with the scanner 24 or otherwise entered into the checkout system 10 to a bagging counter 66 where the items are placed into grocery bags or the like by a bagging clerk. Hence, as described herein, the self-service bagwell 60, the assisted bagwell 62, and the bagging counter 66 define the three bagging stations associated with the checkout system 10. The takeaway belt 58 of the takeaway belt mechanism 56 is slidably secured to the terminal base 34. In particular, the takeaway belt 58 may be slid between an extended position (see FIG. 12) and a retracted position (see FIG. 13). As shown in FIG. 13, when the takeaway belt 58 is positioned in its retracted position, an end portion **58*a* of the takeaway belt 58 is spaced apart from the scanner 24 so as to expose an overhead access opening 62*a* associated with the assisted bagwell 62 in order to allow the checkout clerk operating the scanner 24 to place an item into a grocery bag within the assisted bagwell 62** once the item has been scanned.

Figure 12:
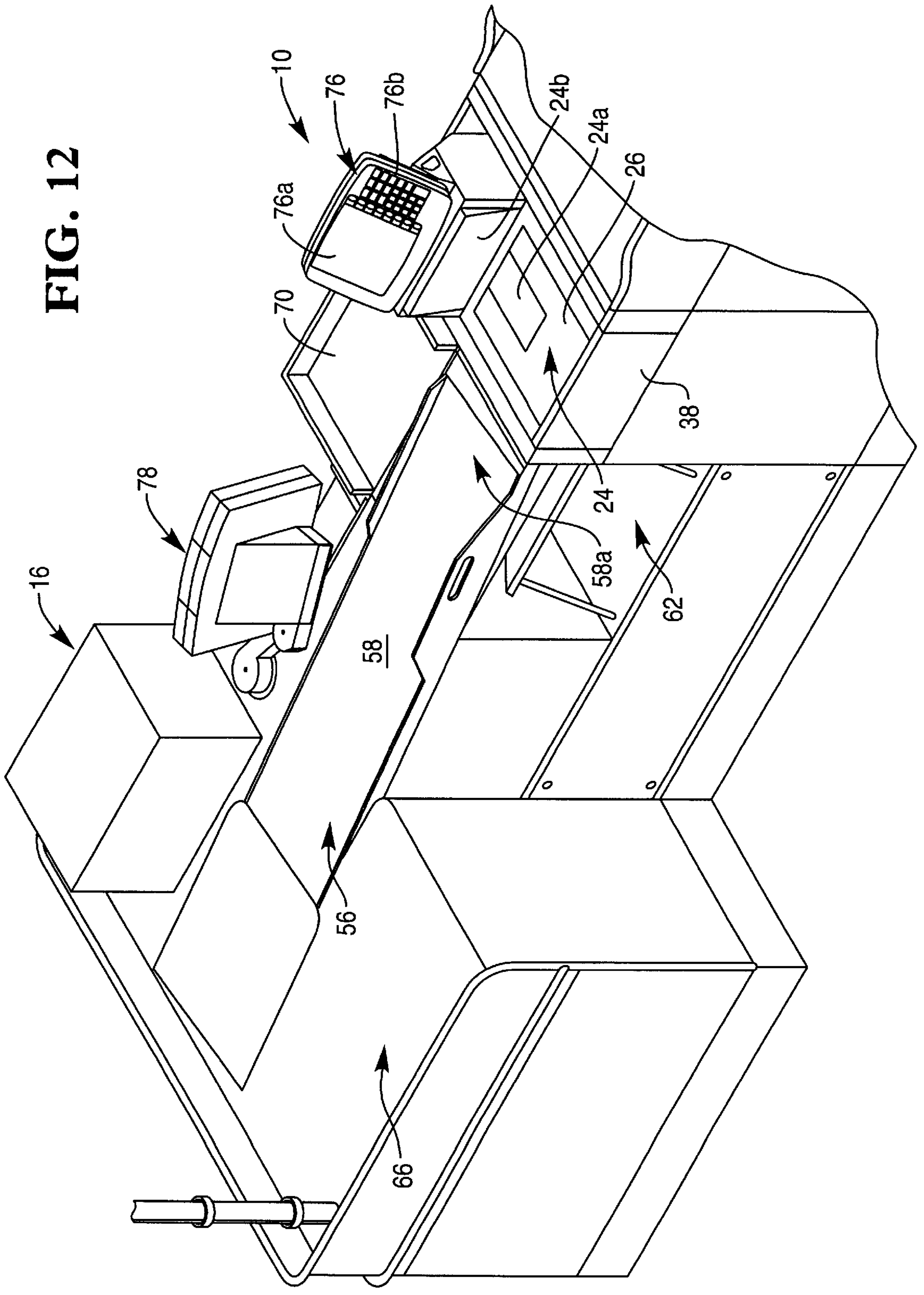
FIG. 12 is a fragmentary perspective view of the checkout system of FIGS. 1–4 which shows the takeaway belt mechanism in its extended position.
Figure 13:
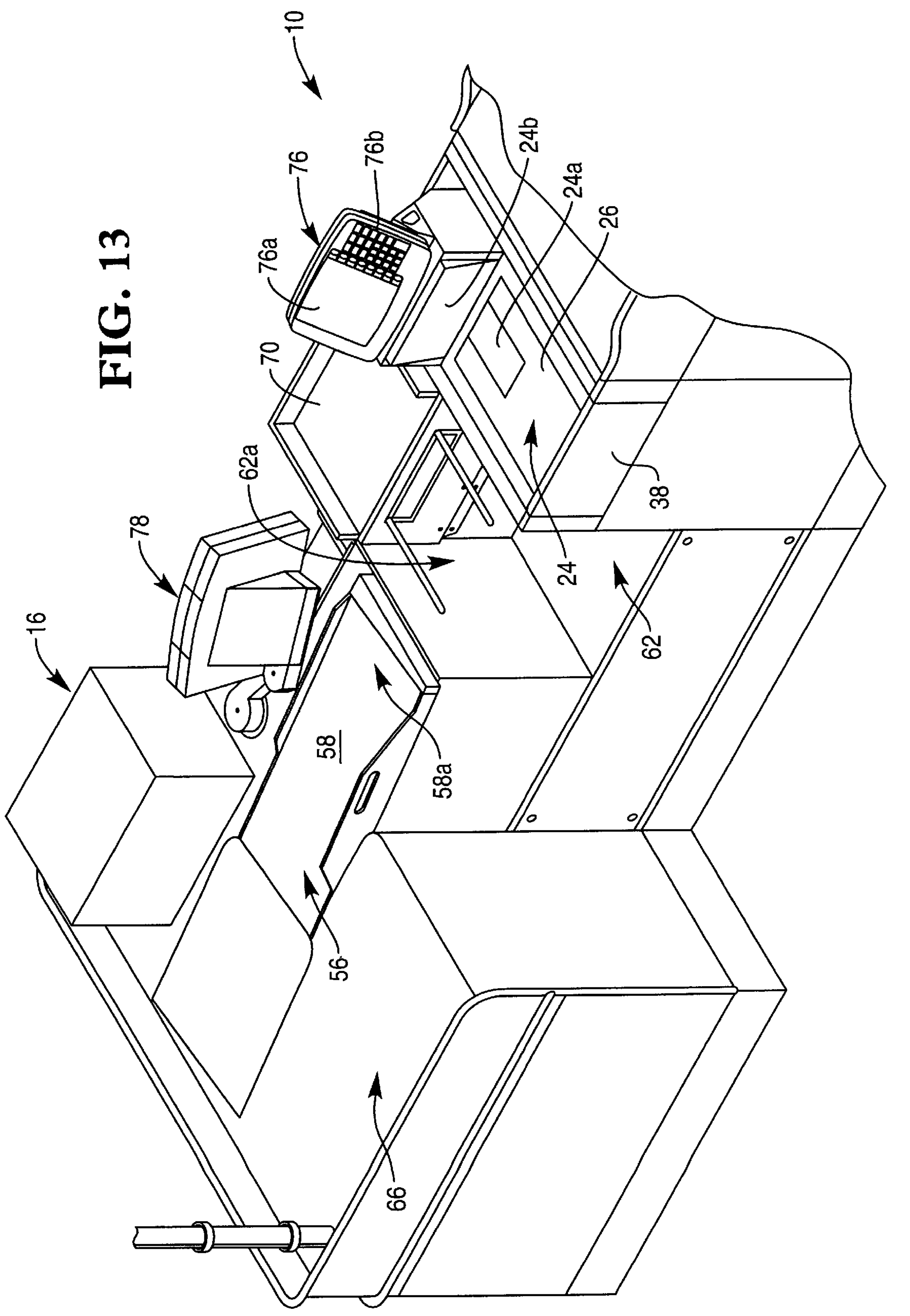
FIG. 13 is a view similar to FIG. 12, but showing the takeaway belt mechanism in its retracted position.

Conversely, as shown in FIG. 12, when the takeaway belt 58 is positioned in its extended position, the end portion **58*a* of the takeaway belt 58 is positioned proximate to the scanner 24** in order to cover the overhead access opening 62*a* associated with the assisted bagwell 62. Positioning the takeaway belt 58 in its extended position allows the checkout clerk operating the scanner 24 to place an item onto the takeaway belt 58 once the item has been scanned thereby allowing the item to be transported to the bagging counter 66 by the takeaway belt mechanism 56.

Hence, what is meant herein by the term "overhead access opening" is a substantially downward ingress into one of the bagwells 60, 62 which allows an item to be advanced in a substantially downward direction into one of the grocery bags positioned in the bagwell 60, 62. For example, as shown in FIG. 13, the overhead access opening 62*a* associated with the assisted bagwell 62 is exposed when the takeaway belt 58 is positioned in its retracted position thereby allowing the checkout clerk operating the scanner 24 to advance an item in a substantially downward direction into a grocery bag positioned within the assisted bagwell 62. However, as shown in FIG. 12, the overhead access opening 62*a* associated with the assisted bagwell 62 is covered when the takeaway belt 58 is positioned in its extended position thereby preventing the checkout clerk from advancing an item in a substantially downward direction into the assisted bagwell 62.

The post-scan area 18 also includes a security scale 68. The security scale 68 is a weight scale which monitors the weight of items placed in either the self-service bagwell 60 (i.e. into a grocery bag located in the bagwell 60) or the assisted bagwell 62 (i.e. into a grocery bag located in the bagwell 62). As shall be discussed below in greater detail, in addition to providing security by monitoring item movement into and out of the self-service bagwell 60 during a self-service checkout transaction, the security scale 68 is also utilized to provide security by monitoring item movement into and out of the assisted bagwell 62 during an assisted checkout transaction. Such monitoring during an assisted checkout transaction is particularly useful to prevent "sweethearting" in which the checkout clerk scans a first item, but then places a second, more expensive item (or an item which hasn't been scanned at all) into the customer's bag. Such "sweethearting" is generally the result of a checkout clerk attempting to provide an improper benefit to a customer who is an acquaintance of the checkout clerk. Use of a bagwell scale has heretofore only been included in dedicated self-service checkout system designs. However, since the checkout system 10 of the present invention includes the security scale 68 for monitoring item movement during self-service checkout transactions, the same scale (i.e. the security scale 68) can be utilized in a novel manner by the systems and methods described herein to provide the aforedescribed security during assisted checkout transactions without adding additional costs to the design of the checkout system 10.

The post-scan area 18 of the checkout system further includes a set-aside shelf 70. The set-aside shelf 70 is positionable in either an assisted shelf position (see FIGS. 1, 12, and 13) or a self-service shelf position (see FIGS. 5 and 15). The set-aside shelf 70 is provided to allow a user of the system 10 (e.g. either a customer or a checkout clerk) to set an item aside once the item has been scanned or otherwise entered into the system 10, but prior to placing the item into a grocery bag within one of the bagwells 60, 62. For example, if the checkout system 10 is being operated in its self-service mode of operation, and a customer scans a loaf of bread, the customer may want to place the bread onto the set-aside shelf 70 until one of the grocery bags within the self-service bagwell 60 is nearly full thereby preventing the bread from being crushed. Moreover, a vertical support structure 72 (see FIGS. 1 and 5) mechanically couples the set-aside shelf 70 to a lower support surface 74 of the bagwells 60, 62, which is in turn mechanically coupled to the input plate or tray of the security scale 68. Hence, in addition to monitoring placement and removal of items into and out of the bagwells 60, 62, the security scale 68 is also utilized to monitor placement and removal of items onto and off of the set-aside shelf 70.

The set-aside shelf 70 is movably secured to the terminal base 34 so that a single shelf may be utilized by both retail personnel (when the checkout system 10 is being operated in its assisted mode of operation) and the customer (when the checkout system 10 is being operated in its self-service mode of operation). For example, the set-aside shelf 70 may be secured to the terminal cabinet 30 by use of a sliding rail assembly so as to allow the shelf 70 to be slid between its assisted position (see FIGS. 1, 12, and 13) and its self-service position (see FIGS. 5 and 15). Alternatively, the set-aside shelf 70 may be secured to the terminal cabinet 30 by use of a hinge assembly 70*a* (see FIGS. 3 and 5) so as to allow the shelf 70 to be pivoted between its assisted position and its self-service position.

Figure 15:
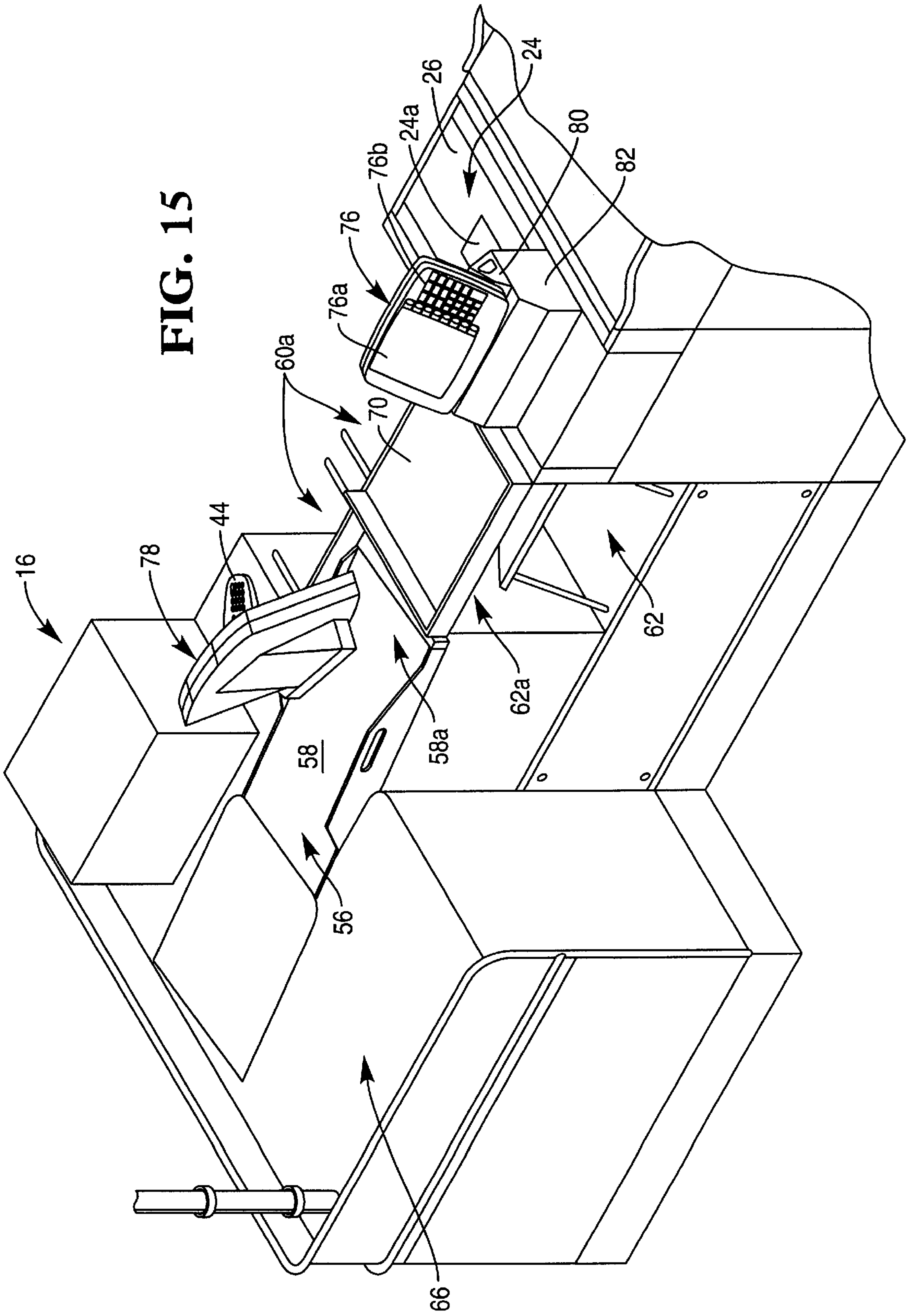
FIG. 15 is a view similar to FIGS. 12 and 13, but showing the set-aside shelf positioned in its self-service position.

Moreover, the set-aside shelf 70 selectively covers and exposes the respective overhead access openings of the bagwells 60, 62 as the shelf 70 is moved between its assisted shelf position (see FIGS. 1 and 13) or a self-service shelf position (see FIGS. 5 and 15). In particular, as shown in FIG. 13, the overhead access opening 62*a* associated with the assisted bagwell 62 is exposed when the set-aside shelf 70 is positioned in its assisted shelf position thereby allowing the checkout clerk operating the scanner 24 to advance an item in a substantially downward direction into a grocery bag positioned within the assisted bagwell 62. However, as shown in FIG. 1, a portion of an overhead access opening 60*a* associated with the self-service bagwell 60 is covered when the set-aside shelf 70 is positioned in its assisted shelf position.

Conversely, as shown in FIGS. 5 and 15, the overhead access opening 60*a* associated with the self-service bagwell 60 is exposed when the set-aside shelf 70 is positioned in its self-service shelf position thereby allowing the customer operating the scanner 24 to advance an item in a substantially downward direction into a grocery bag positioned within the self-service bagwell 60. However, as shown in FIG. 15, the overhead access opening 62*a* associated with the assisted bagwell 62 is covered when the set-aside shelf 70 is positioned in its self-service shelf position.

As discussed above, the security scale 68 may be utilized to provide security to the checkout system 10 during operation thereof in either its self-service mode of operation or its assisted mode of operation. In particular, the security scale 68 is utilized to monitor the ingress and egress of items into and out of the post-scan area 18. More specifically, the security scale 68 is utilized to detect placement of items (1) into and out of the bagwells 60, 62, and (2) onto and off of the set-aside shelf 70*a*. Such item movement monitoring may be utilized to determine if the customer is unintentionally or intentionally committing an impropriety such as theft. For example, a control signal is generated when the scanner 24 successfully captures a product code associated with an item being entered into the checkout system 10. The security scale 68 may be used to detect placement of an item into the post-scan area 18 prior to generation of the control signal thereby enabling detection of the situation in which an unscanned item has been placed into a grocery bag or onto the set-aside shelf 70.

Moreover, when an item is scanned with the scanner 24 and thereafter placed in the post-scan area 18, the detected weight of the item (as detected by the security scale 68) may be compared to a known weight value of the item that is stored in a database in order to confirm that a different, more expensive item was not substituted for the scanned item. It should be appreciated that the database may be in the form of a master database which includes every item sold by the retailer, or may be a "transaction level" database which is constructed locally at the checkout system 10 during operation thereof.

It should be appreciated that a number of security schemes utilizing the security scale 68 may be employed during operation of the checkout system 10 in both its self-service mode of operation and its assisted mode of operation. Examples of security schemes utilizing a security scale that is somewhat similar to the security scale 68 in a self-service checkout system are disclosed in U.S. Pat. No. 5,952,642 entitled "Method and Apparatus for Detecting Item Substitutions During Entry of an Item into a Self-Service Checkout Terminal" by Dusty Lutz, which was issued on Sep. 14, 1999, along with copending U.S. patent applications Ser. No. 08/990,241 entitled "Method and Apparatus for Detecting Item Placement and Item Removal During Operation of A Self-Service Checkout Terminal" which was filed on Dec. 15, 1997, by Jim Morrison and Dusty Lutz; and Ser. No. 09/071,024 entitled "Method of Monitoring Item Shuffling in a Post-Scan Area of a Self-Service Checkout Terminal" which was filed on May 1, 1998, by Dusty Lutz, Chris Malchak, Tim Mason, Ali Vassigh. The disclosures of the above-identified issued patent along with each of the above-identified patent applications are hereby incorporated by reference, and are assigned to the same assignee as the present invention.

Figure 23:
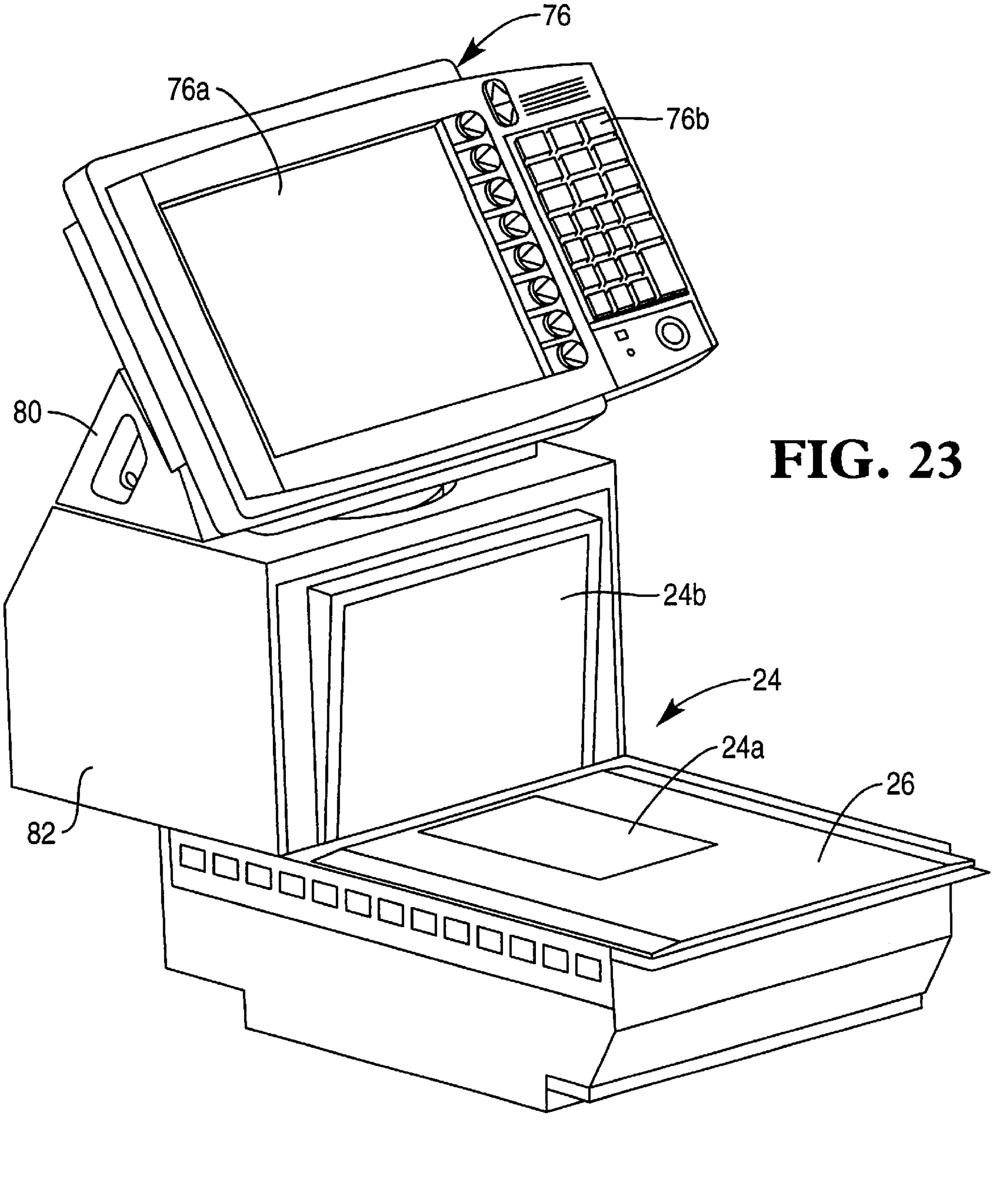
FIG. 23 is a perspective view which shows the personnel interface terminal of the checkout system of FIGS. 1–8 in its assisted position.

The checkout system 10 also includes a pair of user interface terminals for receiving input from and providing information to a user. In particular, the checkout system 10 includes personnel interface terminal 76 (see FIG. 2) and an interactive customer interface terminal 78 (see FIG. 1). The personnel interface terminal 76 includes a display monitor 76*a* and a keypad 76*b* (see FIG. 23). Transaction information such as item price, item description, total amount of the transaction, instructions, etcetera is displayed to the checkout clerk via the display monitor 76*a* during operation of the checkout system 10 by the clerk. Moreover, the checkout clerk may manually enter retail information such as item codes and quantities into the checkout system 10 by use of the keypad 76*b* associated with the personnel interface terminal 76. The personnel interface terminal 76 of the present invention may be embodied as a single, integrated device (as shown in FIG. 23) having both the display monitor 76*a* and the keypad 76*b*, or alternatively, the display monitor 76*a* and the keypad 76*b* may be embodied as separate components. One integrated terminal which is particularly useful as the personnel interface terminal 76 of the present invention is a Dynakey terminal which is commercially available from NCR Corporation.

As discussed above, the personnel interface terminal 76 is provided for use by the checkout clerk when the checkout system 10 is being operated in its assisted mode of operation. As shall be discussed below in more detail, the interactive customer interface terminal 78 is provided for use by customer when the checkout system 10 is being operated in both its assisted mode of operation and its self-service mode of operation. Accordingly, the personnel interface terminal 76 is generally not utilized by the customer when the checkout system 10 is being operated in its self-service mode of operation.

Figure 24:
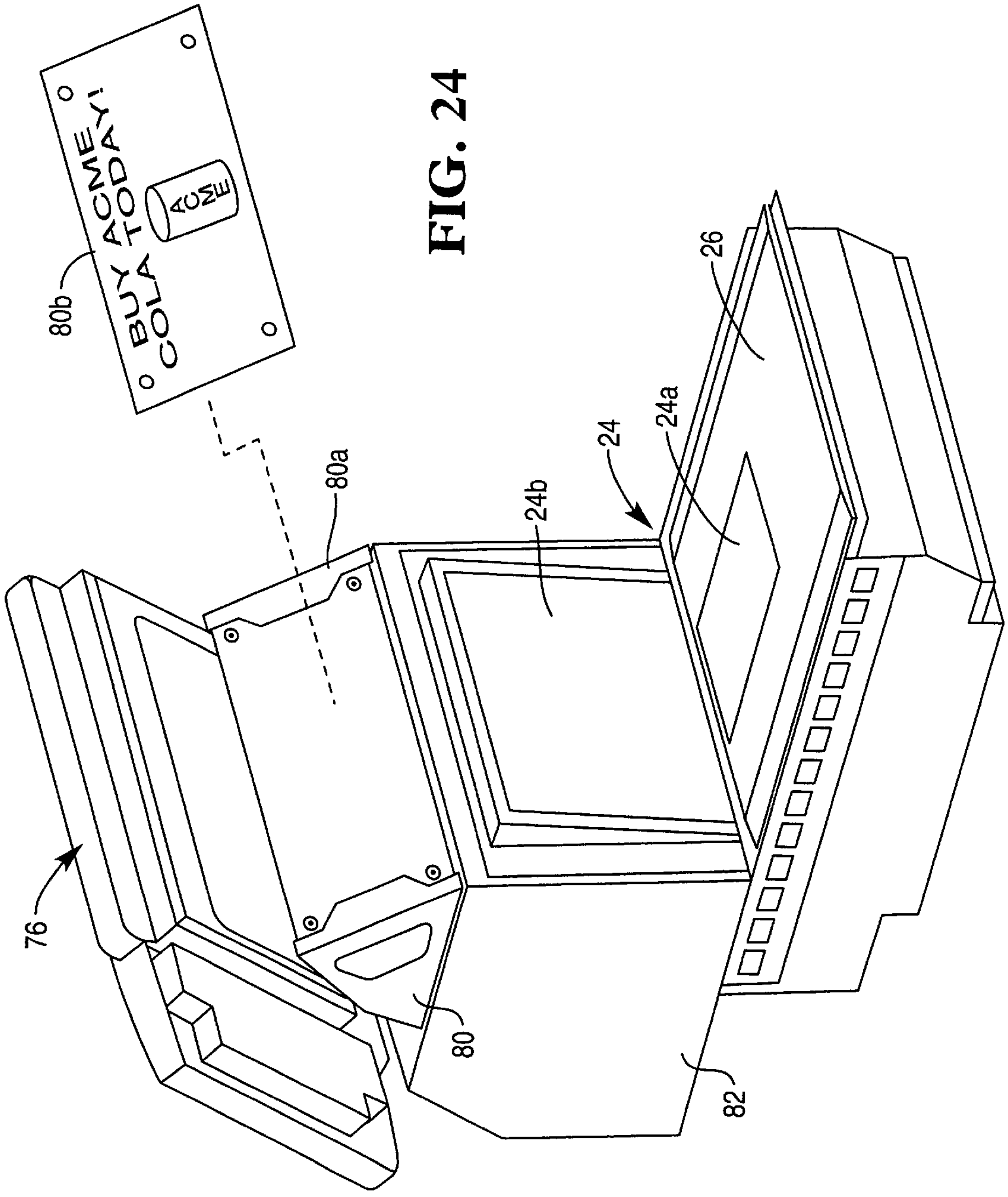
FIG. 24 is a view similar to FIG. 23, but showing the personnel interface terminal in its self-service position.

Hence, the personnel interface terminal 76 is secured to the terminal base 34 in a manner which allows the display monitor 76*a* and the keypad 76*b* to face the personnel side 43 of the system 10 at all times during operation of the checkout system 10. In particular, as shown in FIGS. 23 and 24, the personnel interface terminal 76 is secured to a terminal support member 80. The terminal support member 80 is pivotally secured to a scanner housing 82 which houses the vertical scanning window 24*b* of the scanner 24. Such a mounting configuration allows the terminal support member 80 (and hence the personnel interface terminal 76) to rotate relative to the housing 82 (and hence the scanner 24). More specifically, as the scanner 24 (and hence the housing 82) is rotated between the assisted scanner position (see FIG. 1) and the self-service scanner position (see FIG. 5), the terminal support member 80 (and hence the personnel interface terminal 76) may be rotated relative to the housing 82 such that the display monitor 76*a* and the keypad 76*b* face the personnel side 42 of the checkout system 10 irrespective of whether the scanner 24 is positioned in its assisted scanner position or its self-service scanner position.

Such a configuration in which the display monitor 76*a* and the keypad 76*b* of the personnel interface terminal 76 face the personnel side 42 of the checkout system 10 irrespective of whether the scanner 24 is positioned in its assisted scanner position or its self-service scanner position provides numerous advantages to the checkout system 10. For example, facing the keypad 76*b* away from the customer when the checkout system 10 is being operated in its self-service mode of operation prevents the customer from becoming confused by the presence of the keypad 76*b* thereby eliminating the possibility that the customer attempts to operate the personnel interface terminal 76. Moreover, facing the keypad 76*b* away from the customer when the checkout system 10 is being operated in its self-service mode of operation reduces the number of components which are presented to the customer thereby reducing or eliminating any potential intimidation associated with first time performance of a self-service checkout transaction.

Yet further, facing the display monitor 76*a* and the keypad 76*b* of the personnel interface terminal 76 toward the personnel side 42 of the checkout system 10 when the scanner 24 is positioned in both its assisted scanner position and its self-service scanner position allows a surface 80*a* of the terminal support member 80 to face the customer side 40 of the checkout system 10. The surface 80*a* may be utilized to display messages to the customer. More specifically, as shown in FIG. 24, a laminated sign 80*b* or the like may be secured to the surface 80*a* of the terminal support member 80 with fasteners or the like (not shown) in order for the message printed on the sign 80*b* to be displayed to the customer. Such a message may include an advertisement for a product or service offered by the retailer. Moreover, the retailer may sell the space on the laminated sign 80*b* to an outside company or business (e.g. a real estate agent or mortgage broker) in order to generate additional revenue. The message printed on the sign 80*b* may alternatively, or in conjunction, include instructions which instruct the customer on operation of the checkout system 10.

Figure 21:
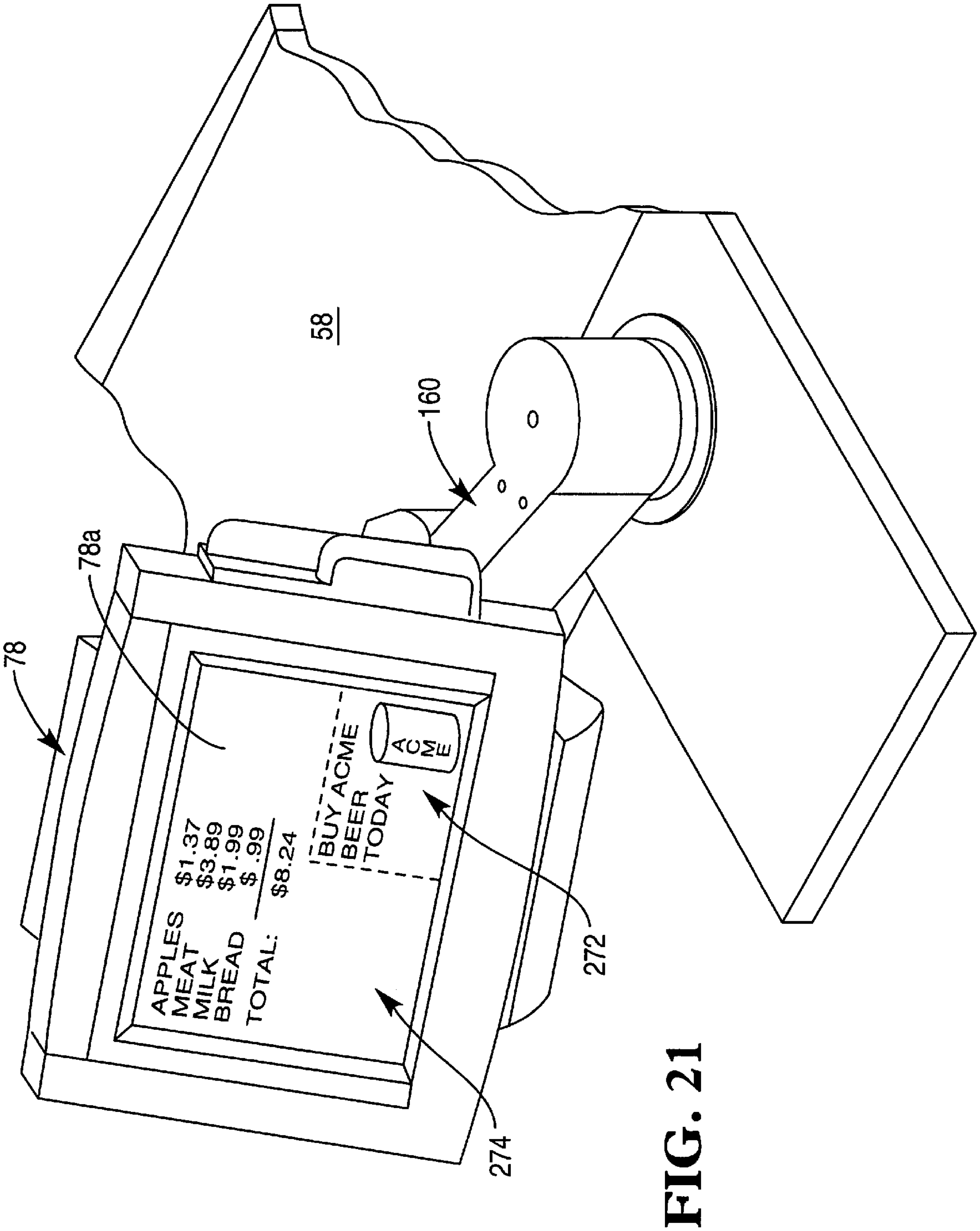
FIG. 21 is an enlarged perspective view of the interactive customer interface terminal of the checkout system of FIGS. 1–8.

As shown in FIG. 21, the interactive customer interface terminal 78 includes a display monitor 78*a* which is provided to display retail information to the customer during operation of the checkout system 10. For example, transaction information such as item price, item description, total amount of the transaction, instructions, etcetera is displayed to the customer via the display monitor 78*a* during operation of the checkout system 10 in either its assisted mode of operation or its self-service mode of operation. Moreover, instructions are displayed on the display monitor 78*a* which assist or otherwise guide the customer through operation of the checkout system 10. Such instructions are particularly useful when the checkout system 10 is being operated in its self-service mode of operation.

Moreover, customer-specific messages may be displayed to the customer on the display monitor 78*a* at certain times during a checkout transaction. What is meant herein by the term "customer-specific" in regard to messages is a retail message that is customized for a given customer based on the purchasing habits or other information that is unique to the customer. For example, a customer-specific message may include a customer-specific advertisement which advertises a product that was purchased by the customer during a previous visit to the retailer's store. As shall be discussed below in greater detail, the checkout system 10 of the present invention is configured to retrieve information from a customer profile database which contains such information (e.g. previous purchases) about each of the retailer's customers. Moreover, a customer-specific message may include a customer-specific advertisement that advertises a product which may be used in conjunction with a product that was previously scanned or otherwise entered into the checkout system 10 during the current checkout transaction. For example, if the checkout clerk scans a case of beer that is included in the customer's items for purchase, an advertisement relating to pretzels may be displayed to the customer on the display monitor 78*b* since pretzels are commonly consumed with beer.

It should be appreciated that such customer-specific messages may also be communicated by other components associated with the checkout system 10. For example, customer-specific messages may be displayed to the checkout clerk via the display monitor 76*a* of the personnel interactive terminal 76. For instance, if the checkout clerk scans a case of beer or other type of alcohol, a customer-specific message may displayed on the display monitor 76*a* which informs the checkout clerk that the customer is not old enough to purchase the beer or other type of alcohol. Similarly, customer-specific advertisement messages could be displayed on the display monitor 76*a* in order to be verbally relayed or otherwise communicated to the customer in a personal manner by the checkout clerk.

Referring back to the discussion regarding the interactive customer interface terminal 78, the display monitor 78*a* is preferably a known touch screen monitor which can generate data signals when certain areas of the screen are touched by a customer. Hence, the display monitor 78*a* may be utilized by the customer to input information into the checkout system 10. For example, the customer may manually enter retail information such as item codes and quantities into the checkout system 10 by use of the touch screen associated with the display monitor 78*a*. The customer may indicate his or her preferred method of payment (e.g. cash, credit, or debit card) by touching the appropriate area of the touch screen associated with the display monitor 78*a*. A portion of the touch screen associated with the display monitor 78*a* may also be utilized as a "help button" such that assistance is provided to the customer when it is touched by the customer.

Moreover, the interactive customer interface terminal 78 is preferably embodied as a stand-alone, kiosk-type device which is, in essence, a modified flat panel personal computer (PC) which includes a number of components commonly associated therewith such as a processing unit 78*b* having a microprocessor 78*c* (see FIG. 9) and a number of memory modules 78*d* (see FIG. 9) associated therewith, along with other commonly utilized PC components such as an Ethernet controller, a number of video and audio control devices, a storage memory device such as a hard drive device, and a number of connector ports for coupling the interface terminal 78 to a number of retail peripheral devices such as the scanner 24 and the product scale 26. Hence, in addition to displaying transaction information to the customer, the interactive customer interface terminal 78 functions as the main processing device or controller for controlling operation of the checkout system 10. It should be appreciated that the interactive customer interface terminal 78 may be embodied as any stand-alone, kiosk-type device which includes the aforedescribed components (e.g. a display monitor, PC, etcetera). One such stand-alone, kiosk-type device which is particularly useful as the interactive customer interface terminal of the present invention is an Informa model information terminal which is commercially available from NCR Corporation.

Figure 18:
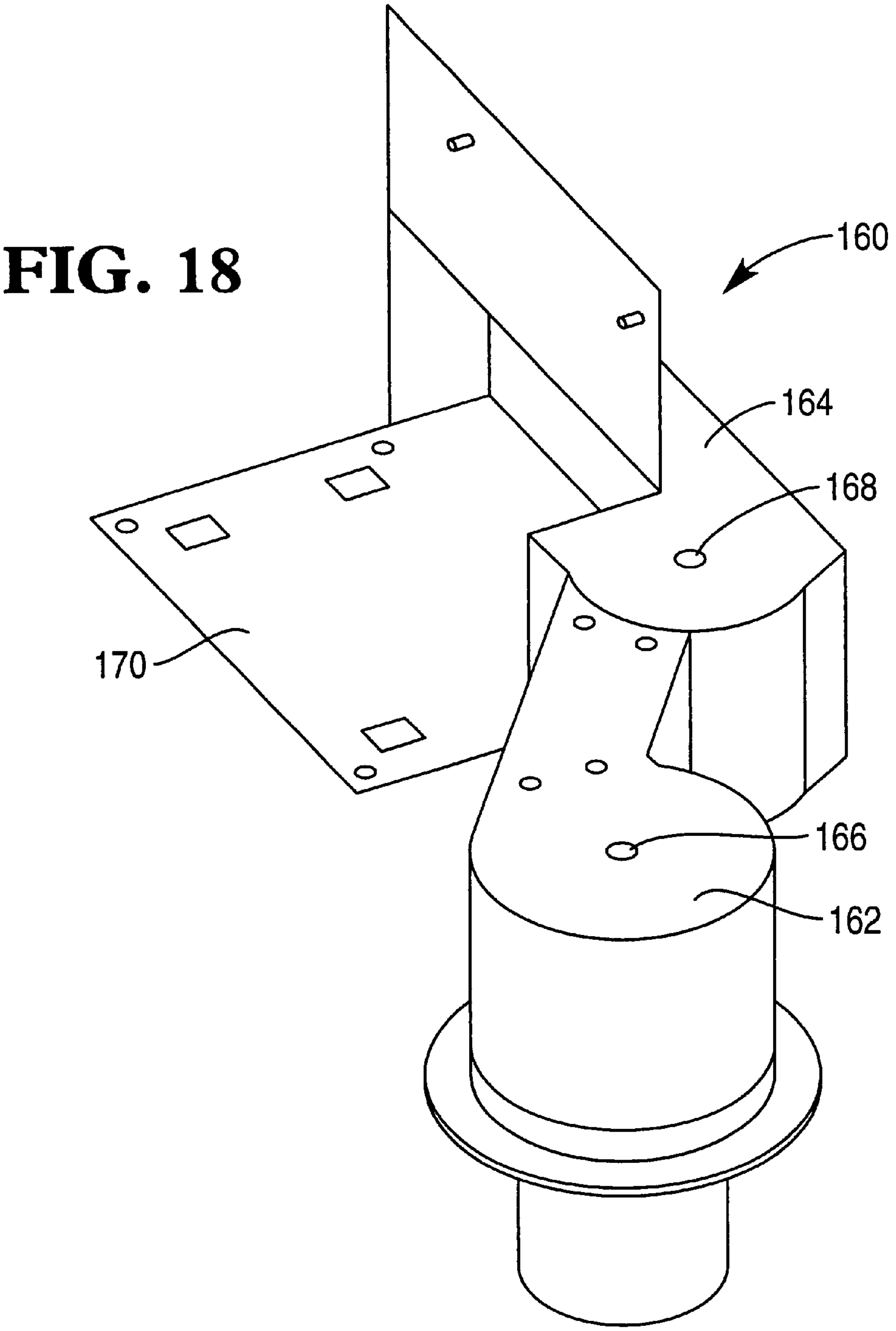
FIG. 18 is a perspective view of the support arm assembly which is utilized to support the interactive customer interface terminal of the checkout system of FIGS. 1–8.
Figure 19:
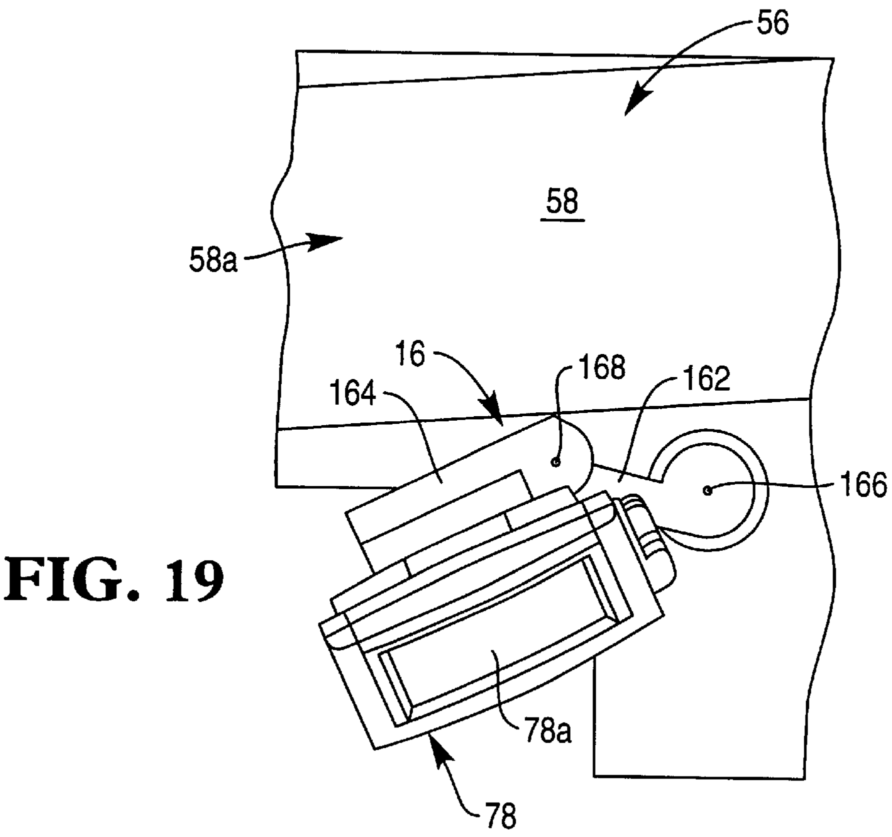
FIG. 19 is a plan view which shows the interactive customer interface terminal positioned in its assisted position.
Figure 20:
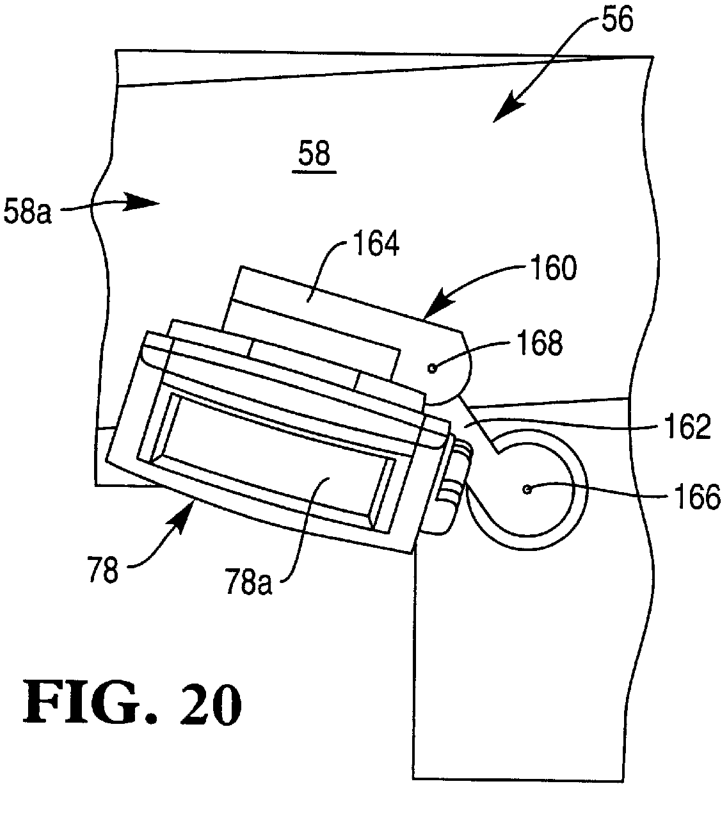
FIG. 20 is a view similar to FIG. 19, but showing the interactive customer interface terminal positioned in its self-service position.

As shown in FIGS. 18–20, the interactive customer interface terminal 78 is movably secured to the upper surface 36 of the terminal base 34 by a support arm assembly 160. As shown in FIG. 18, the support arm assembly 160 includes a first support arm 162 and a second support arm 164. The support arm assembly 160 is configured to allow the interactive customer interface terminal 78 to be pivoted relative to the upper surface 36 of the terminal base 34 along a pair of substantially-vertical pivot axes. In particular, the support arm 162 is pivotally secured to the upper surface 36 of the terminal base 34 by a pivot joint 166, whereas the second support arm 164 is pivotally secured to the first support arm 162 by a pivot joint 168.

The housing of the interactive customer interface terminal 78 is secured to an end portion of the second support arm 164. In particular, the end portion of the second support arm 164 opposite the pivot joint 168 has a mounting structure 170 secured thereto. The housing of the interactive customer interface terminal 78 is bolted or otherwise fastened to the mounting structure 170 so as to secure the interactive customer interface terminal 78 to the support arm assembly 160.

Such a configuration of the support arm assembly 160 allows the interactive customer interface terminal 78 to be moved relative to the terminal base 34 in a manner which maintains the display monitor 78*b* at a relatively constant distance from the upper surface 34 of the terminal base. Moreover, such a configuration allows the interactive customer interface terminal 78 to be moved between a self-service position and an assisted position. In particular, as shown in FIGS. 1 and 19, during operation of the checkout system 10 in its assisted mode of operation, the support arm assembly 160 is manipulated so as to cause the interactive customer interface terminal 78 to assume an assisted terminal position in which the display monitor 78*a* faces the general direction of the payment area 16. It should be appreciated that during an assisted checkout transaction, the customer is generally positioned in the proximity of the payment area 16. Hence, by positioning the display monitor 78*a* in the position shown in FIG. 19 (i.e. an assisted monitor position), retail information, along with other messages such as customer-specific advertisements, may be displayed on the display monitor 78*a* for viewing by the customer while the checkout clerk enters the customer's items for purchase with the scanner 24.

However, as shown in FIGS. 5 and 20, during operation of the checkout system 10 in its self-service mode of operation, the support arm assembly 160 is manipulated so as to cause the interactive customer interface terminal 78 to assume a self-service terminal position in which the display monitor 78*a* faces the general direction of the area located in front of the self-service bagwell 60. It should be appreciated that during a self-service checkout transaction, the customer is generally positioned in the proximity of the area located in front of the bagwell 60 in order to scan items with the scanner 24 and thereafter place the items in grocery bags positioned in the self-service bagwell 60. Hence, by positioning the display monitor 78*a* in the position shown in FIG. 20 (i.e. a self-service monitor position), retail information such as transaction information (e.g. product prices and descriptions), along with other messages such as instructional messages, may be displayed on the display monitor 78*a* for viewing by the customer while the customer enters his or her items for purchase with the scanner 24.

As shown in FIG. 1, the checkout system 10 also includes a status light device 84 and a paging device 86. The status light device 84 and the paging device 86 are provided in order to notify store personnel, such as a customer service manager, if intervention into the current checkout transaction is needed. In particular, if during operation of the checkout system 10, an intervention-needed activity is detected, the status light device 84 and the paging device 86 are operated so as to summon retail personnel such as a customer service manager. What is meant herein by the term "intervention-needed activity" is (1) activity by the customer or retail personnel in which the checkout system 10 is unintentionally operated improperly, (2) activity by the customer or retail personnel in which it can be inferred with a high degree of confidence that the checkout system 10 is intentionally operated improperly for illicit purposes such as theft, (3) activity by the customer or retail personnel in which the customer or retail personnel operates an input device associated with the checkout system 10 in a manner which indicates that he or she is in need of assistance, and (4) activity by the components associated with the checkout system 10 which has rendered the system in need of maintenance or other type of service.

Hence, an intervention-needed activity may take the form of a security-breach activity in which the checkout system 10 is being operated in a manner which is placing the retailer in a position of potential financial loss due to goods being taken from the store without having first been paid for (either intentionally or unintentionally), or a non-security-breach activity in which the customer or checkout clerk is in need of assistance or the checkout system 10 is in need of maintenance, but the retailer is not at risk of financial loss due to goods being taken from the store without having first been paid for. For example, if the customer attempted to scan an item a number of times with the scanner 24, but the product identification code associated with the item was not read by the scanner 24, the processing unit 78*b* concludes that an intervention-needed activity has occurred. Moreover, it should be appreciated that even if the product identification code associated with the item is entered, the processing unit 78*b* may determine that an intervention-needed activity has occurred. For example, if the customer scanned a first item, but then placed a second item of greater value into a grocery bag (as detected by, for example, the security scale 68), the processing unit 78*b* concludes that an intervention-needed activity has occurred. For further example, if the customer or checkout clerk attempts to weigh an item such as produce with the product scale 26, but does not properly position the item on the product scale 26 or has not properly 'zeroed' the product scale 26, the processing unit 78*b* concludes that an intervention-needed activity has occurred.

Yet further examples of intervention-needed activities may include (1) failure to surrender an item after the item has been voided, (2) weighing only a portion of an item (i.e. weighing only one banana, but placing four bananas into a grocery bag), and (3) placing an item into a grocery bag or onto the set-aside shelf 70 without first attempting to scan or otherwise enter the item. Moreover, if the checkout clerk operating the system 10 touches a particular key on the keypad 76*b* associated with the personnel interface terminal 76 (see FIG. 23), or the customer touches a particular portion of the touch screen associated with the display monitor 78*a*, thereby indicating that he or she is in need of assistance, the processing unit 78*b* concludes that an intervention-needed activity has occurred.

In addition, the processing unit 78*b* may monitor the status of the retail peripheral devices associated with the checkout system 10 in order to determine if an intervention-needed activity has occurred. For example, the processing unit 78*b* preferably monitors the currency level within the coin dispenser 48 and the bill dispenser 52 in order to determine if either currency dispenser 48, 52 is in need of restocking. Moreover, the processing unit 78*b* preferably monitors the paper supply level within the receipt printer 54 and a journal printer 88 (see FIG. 9) in order to determine if either printer 54, 88 is in need of restocking. It should be appreciated that if any one of the currency dispensers 48, 52 or the printers 54, 88 is in need of restocking, the processing unit 78*b* concludes that an intervention-needed activity has occurred.

It should be appreciated that although numerous examples of intervention-needed activities have herein been described, numerous other types of intervention-needed activities may exist, as defined by a particular retailer or provided by a particular design of the checkout system 10. Further examples of intervention-needed activities, along with a number of mechanisms and methods for detecting occurrence thereof, are disclosed in U.S. Pat. No. 5,952,642 entitled "Method and Apparatus for Detecting Item Substitutions During Entry of an Item into a Self-Service Checkout Terminal" by Dusty Lutz, which was issued on Sep. 14, 1999, and U.S. Pat. No. 5,747,784 entitled "Method and Apparatus for Providing Security for a Self-Service Checkout Station" by Joanne Walter and Tracy Flynn, which was issued on May 5, 1998; along with copending U.S. patent applications Ser. No. 08/895,084 entitled "Method and Apparatus for Verifying Identity of an Item Being Checked Out Through a Retail Checkout Terminal" which was filed on Jul. 16, 1997, by Joanne Walter; Ser. No. 08/910,702 entitled "Method and Apparatus for Resetting a Product Scale of a Retail Checkout Terminal" which was filed on Aug. 13, 1997, by Dusty Lutz; Ser. No. 08/939,868 entitled "Method and Apparatus for Providing Security to a Self-Service Checkout Terminal" which was filed on Sep. 29, 1997, by John Addy and Jim Morrison; Ser. No. 08/991,060 entitled "Method and Apparatus for Reducing Shrinkage During Operation of a Self-Service Checkout Terminal" which was filed on Dec. 15, 1997, by Jim Morrison and Joanne Walter; Ser. No. 08/990,241 entitled "Method and Apparatus for Detecting Item Placement and Item Removal During Operation of a Self-Service Checkout Terminal" which was filed on Dec. 15, 1997, by Jim Morrison and Dusty Lutz; Ser. No. 09/020,057 entitled "Method for Enhancing Security and Providing Assistance in the Operation of a Self-Service Checkout Terminal" which was filed on Feb. 06, 1998, by Ali Vassigh and Joanne Walter; Ser. No. 09/020,056 entitled "Self-Service Checkout Terminal" which was filed on Feb. 06, 1998, by Stephen Swaine, Ali Vassigh, and Grant Paton; and Ser. No. 09/019,880 entitled "Method of Enhancing Security in a Self-Service Checkout Terminal" which was filed on Feb. 06, 1998, by John Addy and Marc Lynn. The disclosures of each of the above-identified issued patents and patent applications are hereby incorporated by reference, and are assigned to the same assignee as the present invention.

As described above, once an intervention-needed activity has been detected, the status light device 84 is operated to summon retail personnel. For example, the status light device 84 may display a first colored light in order to notify retail personnel that intervention is needed prior to the end of the current checkout transaction. Alternatively, the status light device 84 may display a second colored light in order to notify retail personnel that intervention is needed immediately.

As with the status light device 84, the paging device 86 is utilized to page or otherwise summon retail personnel to the checkout system 10 once an intervention-needed activity has be detected. The paging device 86 is particularly useful since, it is operable to communicate with retail personnel who may be positioned at locations within or outside of the store which are out of the view of the status light device 84. In particular, the paging device 86 includes a signal transmitter 86*a* which may include any one of numerous known signal transmitters or transceivers such as a radio frequency (RF) signal transmitter. One such signal transmitter which is particularly useful as the signal transmitter 86*a* of the present invention is a model number 1200B Transmitter which is commercially available from Scope, Incorporated of Great Britain.

Figure 22:
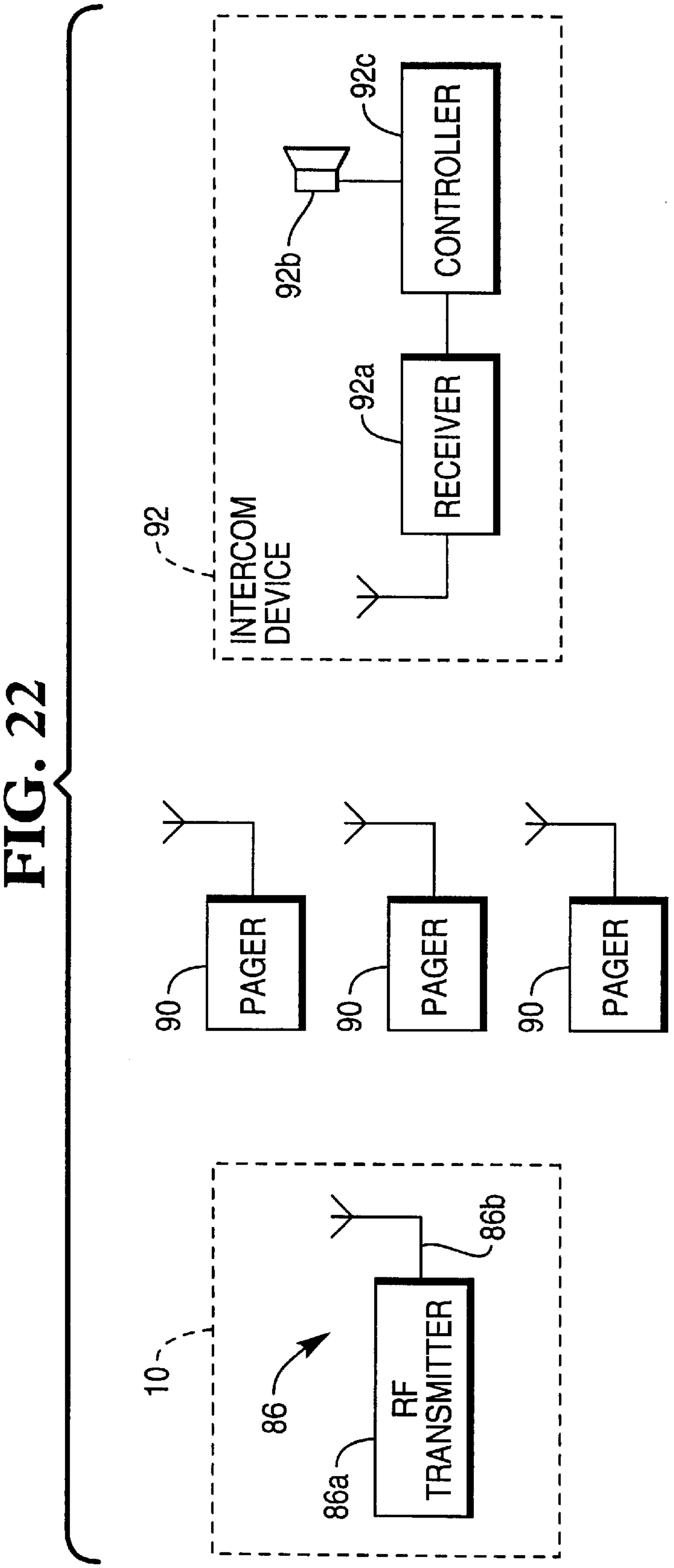
FIG. 22 is a simplified block diagram of the paging system of the checkout system of FIGS. 1–8.

As shown in FIG. 22, the signal transmitter 86*a* is configured to communicate with a number of portable communication devices such as wireless alphanumeric pagers 90. In particular, the signal transmitter 86*a* is configured to communicate to the pagers 90 at a predetermined frequency (e.g. 450 MHz) in order to transmit alphanumeric messages to retail personnel wearing the pagers 90. Hence, upon detection of an intervention-needed activity by the processing unit 78*b*, an intervention-needed control signal is generated. Generation of an intervention-needed control signal causes the signal transmitter 86*a* to generate an RF personnel-request signal which is received by the pagers 90. The personnel-request signal includes a specific alphanumeric message that includes such information as the nature of the intervention which is needed and the identity of the particular checkout system 10 which requires assistance. For example, if one of the currency dispensers 48, 52 needs to be restocked, the signal transmitter 86*a* generates an RF personnel-request signal which causes a message to be displayed on one of the pagers 90 which informs the customer service manager wearing the pager 90 that a particular checkout system 10 is, for example, running low on dimes.

Moreover, as shown in FIG. 22, the signal transmitter 86*a* is configured to communicate with an audible message generating device such as an intercom device 92 having an RF signal receiver 92*a*, a number of speakers 92*b*, and a controller 92*c* associated therewith. The speakers 92*b* associated with the intercom device 92 are located within the ceilings or other locations throughout the retailer's store. The signal transmitter 86*a* of the paging device 86 is also configured to communicate with the signal receiver 92*a* associated with the intercom device 92 at a predetermined frequency (e.g. 450 MHz) in order to generate audible messages which are broadcast to retail personnel within the store with the speakers 92*b*. In particular, upon detection of an intervention-needed activity by the processing unit 78*b*, an intervention-needed control signal is generated. Generation of an intervention-needed control signal causes the signal transmitter 86*a* to generate an RF personnel-request signal which is received by the signal receiver 92*a* associated with the intercom device 92. The personnel-request signal includes a specific code which corresponds to a number of specific, prerecorded audible messages stored in, or otherwise maintained by, the controller 92*c* of the intercom device 92. For example, each of the prerecorded messages may include such information as the nature of the intervention which is needed and the identity of the particular checkout system 10 which requires assistance. The controller 92*c* causes such prerecorded audible messages to be broadcast with the speakers 92*b* so as to be audibly detected by retail personnel such as a customer service manager within the retailer's store. For example, if one of the currency dispensers 48, 52 needs to be restocked, the signal transmitter 86*a* generates an RF personnel-request signal which, once received by the signal receiver 92*a*, causes an audible message to be broadcast on the speakers 92*b* which informs the customer service manager that a particular checkout system 10 is, for example, running low on dimes.

It should be appreciated that use of the signal transmitter 86*a* in conjunction with the intercom device 92 provides the checkout system 10 of the present invention with numerous advantages over heretofore designed checkout systems. For example, a number of retail stores currently include an intercom device similar to the intercom device 92 of the present invention. In particular, intercom devices having a controller for playing a number of specific, prerecorded messages are installed in a number of retail stores. However, in order to broadcast a specific message with the speakers associated with the intercom device, the specific code corresponding to the audible message must be manually entered by retail personnel or the customer by use of a dedicated keypad or the like. Hence, by providing for the input of the specific codes corresponding to the various audible messages by use of the signal transmitter 86*a* and the signal receiver 92*a*, the checkout system 10 itself can actuate the intercom device 92 without manual entry of the specific code by the customer or retail personnel. Utilization and/or retrofit of an existing intercom device reduces the costs associated with implementation of the checkout system 10 thereby increasing the appeal of the system 10 to retailers.

The RF transmitter 86*a* of the paging device 86 has a broadcast antenna 86*b* associated therewith. The broadcast antenna 86*b* is secured to a support structure associated with the status light device 84. In particular, as shown in FIG. 1, the status light device 84 includes a lamp assembly 84*a* secured atop a pole 84*b*. The broadcast antenna 86*b* is fastened or otherwise secured to the pole 84*b*. Alternatively, the pole 84*b* may be constructed of a material which would allow the pole 84*b* itself to function as the broadcast antenna 86*b*. It should be appreciated that securing the broadcast antenna 86*b* to the pole 84*b* (or integrating the antenna 86*b* with the pole 84*b*, as described above) provides numerous advantages. For example, by securing the broadcast antenna 86*b* to the pole 84*b*, a relatively long antenna may be utilized without the risk of the antenna 86*b* being accidentally damaged by, for example, retail personnel or the customer. It should be appreciated that utilization of a relatively long antenna is useful for increasing the transmission range of the RF transmitter 86*a*.

The checkout system 10 also has a video system 94. The video system 94 includes a video camera such as a digital video camera 94*a* (see FIG. 1). The video system is included to provide security during operation of the checkout system

10. In particular, at the commencement of a checkout transaction, the video camera 94*a* is operated so as to capture a video image of the user (e.g. the customer or the checkout clerk) who is operating the checkout system 10. In a known manner, the captured video image of the customer is then stored in an electronic video file by the processing unit 78*b*. A subsequent video image (which is representative of the captured video image) may then be extracted from the electronic video file for use by the checkout system 10. For example, in the case of when the checkout system 10 is being operated in its self-service mode of operation, the extracted video image of the customer may be displayed on a portion of the display monitor 78*a* associated with the interactive customer interface terminal 78. Hence, as the customer is entering his or her items for purchase with the scanner 24, a video image of himself or herself is displayed on the display monitor 78*a*. It should be appreciated that displaying a video image of the customer serves as a psychological deterrent to the customer in regard to the commission of an impropriety such as theft. In particular, the customer is less likely to commit an impropriety such as theft once the customer realizes that the checkout system 10 has captured a video image himself or herself. Similarly, a video image of the checkout clerk could be displayed on the display monitor 76*a* of the personnel interface terminal 76 in order to serve as a psychological deterrent to the checkout clerk against "sweethearting" or other improprieties.

Figure 14:
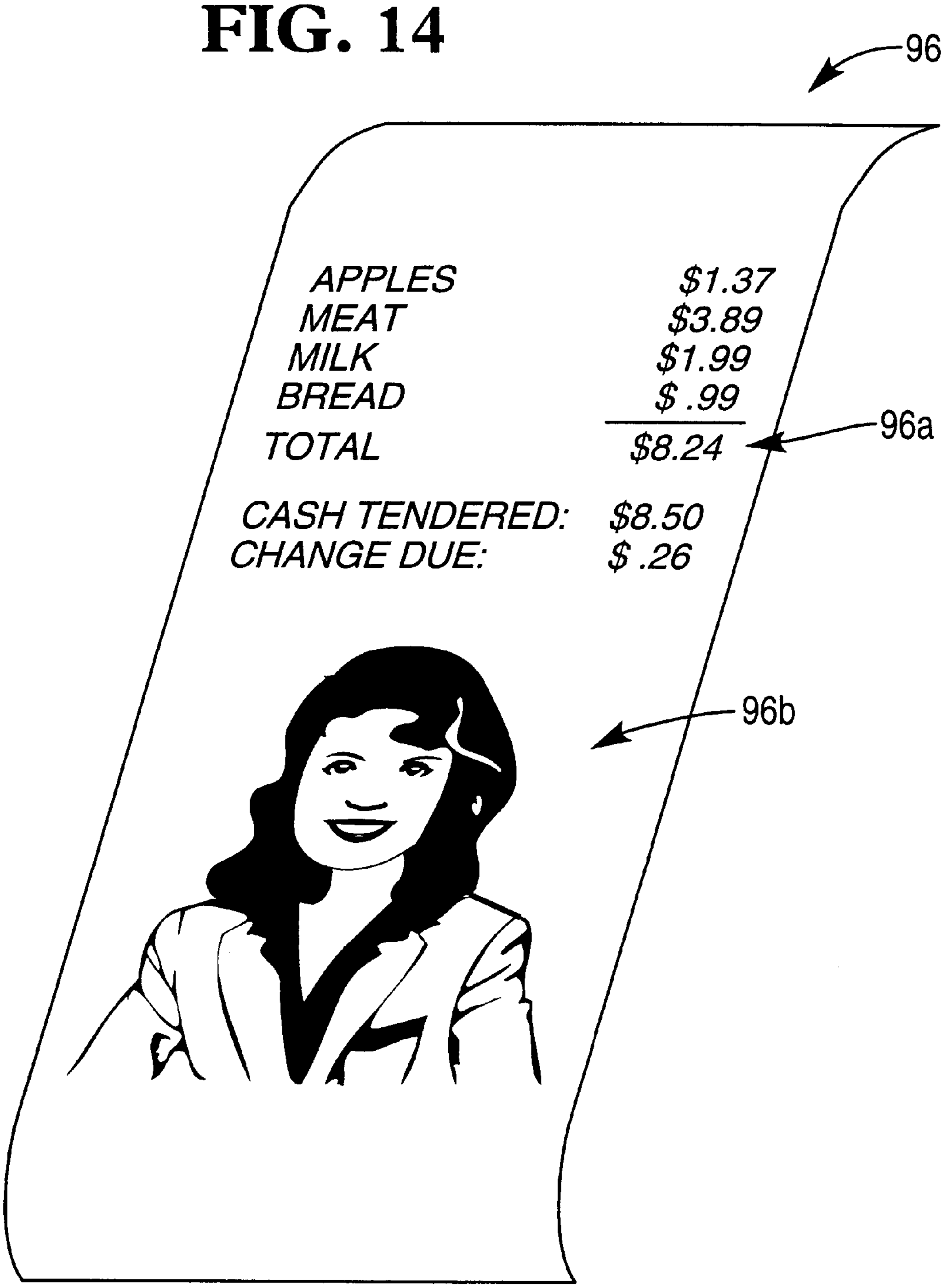
FIG. 14 is a perspective view of a transaction receipt that is printed by the checkout system of FIGS. 1–8.

Moreover, in the case of when the checkout system 10 is being operated in its self-service mode of operation, the extracted video image of the customer may be printed with the receipt printer 54. In particular, once the customer has tendered payment for his or her items for purchase, a transaction receipt 96 is printed for the customer with the receipt printer 54. As shown in FIG. 14, the transaction receipt 96 printed by the receipt printer 54 preferably includes transaction information 96*a* associated with the customer's checkout transaction such as a list including the description and price of each item purchased along with the total cost of the transaction. Moreover, a rendition of the extracted video image 96*b* of the customer is also printed on the bottom portion of the transaction receipt. Hence, as the customer is entering his or her items for purchase with the scanner 24, a video image of the customer is captured and then later printed on the bottom portion of the customer's transaction receipt 96. It should be appreciated that printing an image of the customer serves as a psychological deterrent to the customer in regard to the commission of an impropriety such as theft. In particular, the customer is less likely to commit an impropriety such as theft once the customer realizes that the checkout system 10 has captured a video image himself or herself. Similarly, a video image of the checkout clerk could be printed with the receipt printer 54 in order to serve as a psychological deterrent against "sweethearting" or other improprieties.

Moreover, the video system 94 may be utilized to capture and thereafter store video images associated with other portions of the checkout system 10. For example, the video camera 94*a* of the video system 94 may be utilized to capture video images associated with one or more of the grocery bags within the bagwells 60, 62. The video images associated with the grocery bags may then be displayed on the display monitor 78*a*. Displaying the contents of the customer's grocery bag also serves as a psychological deterrent to the customer since the customer is less likely to insert unscanned or otherwise unentered items (or substituted items) once the customer realizes that the checkout system 10 has captured a video image or the customer's grocery bags.

Figure 16:
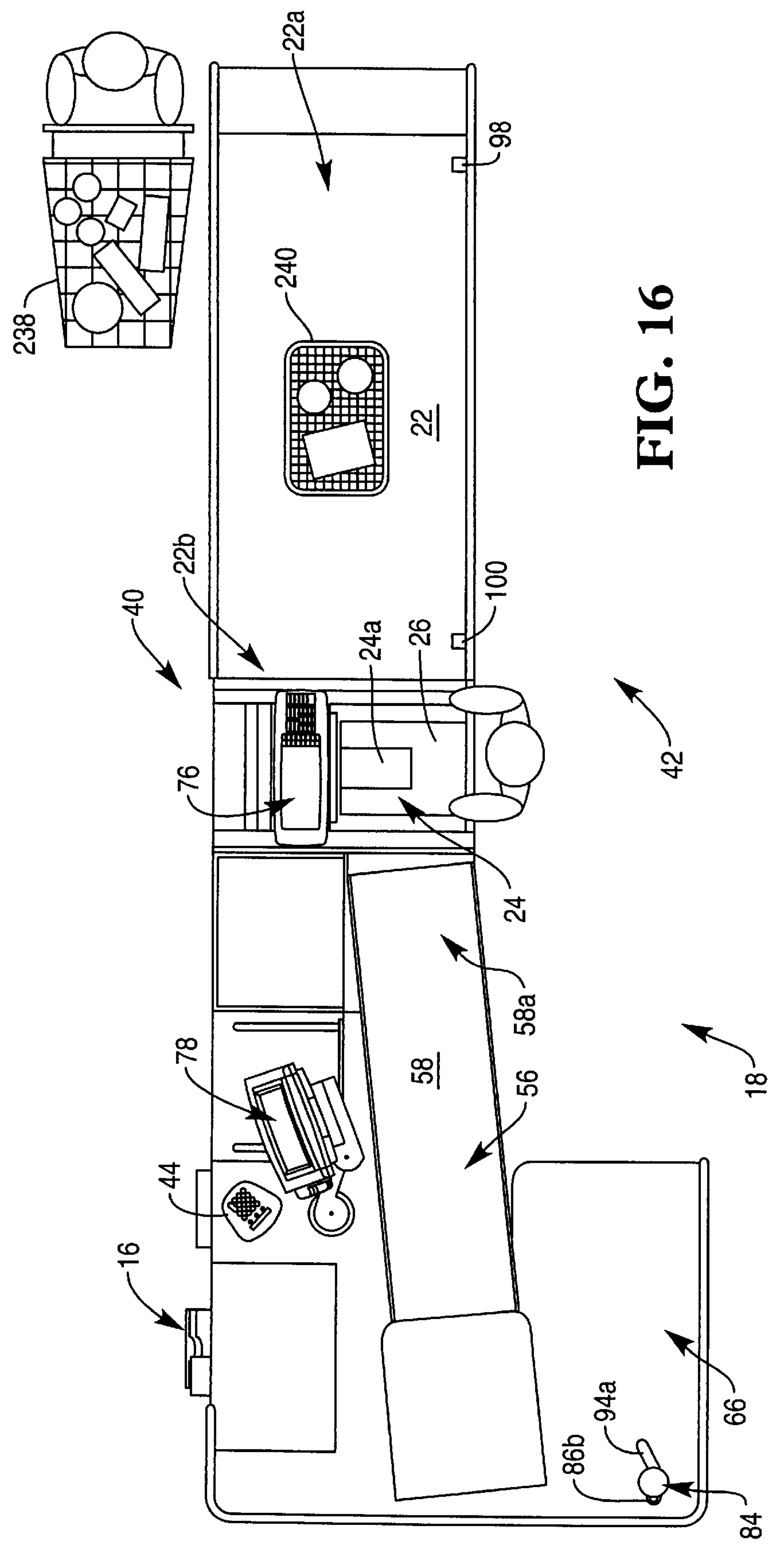
FIG. 16 is a plan view similar to FIG. 4 which shows a shopping cart and basket positioned proximate to the checkout system.

Yet further, the video system 94 may be utilized to capture and thereafter store video images associated with a shopping receptacle in order to reduce the number of items which are intentionally or unintentionally taken from the retailer's store without having first been entered into the checkout system 10 (and hence paid for). In particular, as shown in FIG. 16, the video camera 94*a* of the video system 94 may be utilized to capture a video image of a shopping cart 238 or a shopping basket 240. In a known manner, the captured video image of the shopping cart 238 or shopping basket 240 is then stored in an electronic video file by the processing unit 78*b*.

The electronic video file of the shopping cart 238 or shopping basket 240 is then compared to a reference electronic video file in order to determine if the shopping cart 238 or shopping basket 240 is devoid of items (i.e. empty). In particular, a reference video image of an empty shopping cart or shopping basket is stored as a reference electronic video file in either a local memory device associated with the checkout system (e.g. memory modules or a hard drive) or on a network memory device associated with the retailer's network. In any event, the electronic video file associated with the captured image of the shopping cart 238 or shopping basket 240 is compared to the reference electronic video file associated with an empty shopping cart or shopping basket. If the electronic video file associated with the captured image of the shopping cart 238 or shopping basket 240 matches the reference electronic video file associated with an empty shopping cart or shopping basket, then the checkout system 10 concludes that the customer's shopping cart 238 or shopping basket 240 is devoid of items (i.e. empty). However, if the electronic video file associated with the captured image of the shopping cart 238 or shopping basket 240 does not match the reference electronic video file associated with an empty shopping cart or shopping basket, then the checkout system 10 concludes that the customer's shopping cart 238 or shopping basket 240 has items remaining therein.

What is meant herein by the terms "match", "matches", or "matching" in regard to electronic video files is that a first electronic video file is determined to be the same as or within a predetermined tolerance range of a second electronic video file. Hence, the electronic video files associated with the captured images of the shopping cart 238 or shopping basket 240 match the respective reference electronic video file if they are determined to be the same or within a predetermined tolerance range of the reference electronic video file associated with an empty shopping cart or shopping basket.

Figure 9A:
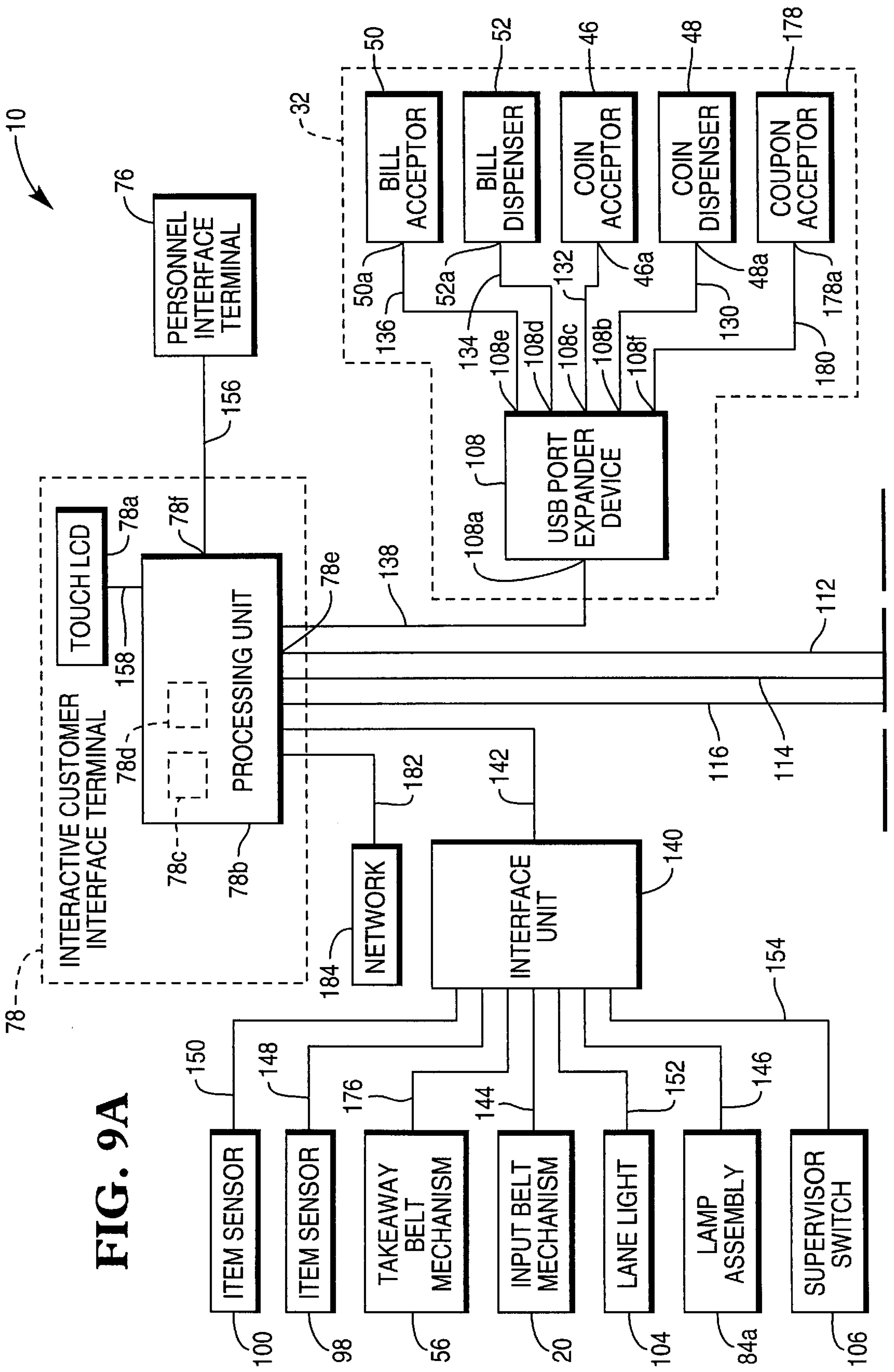
FIG. 9 is a simplified block diagram of the checkout system of FIGS. 1–8.
Figure 9:
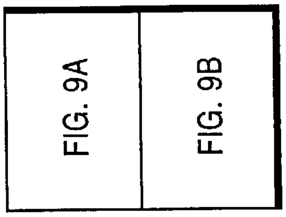
Figure 9B:
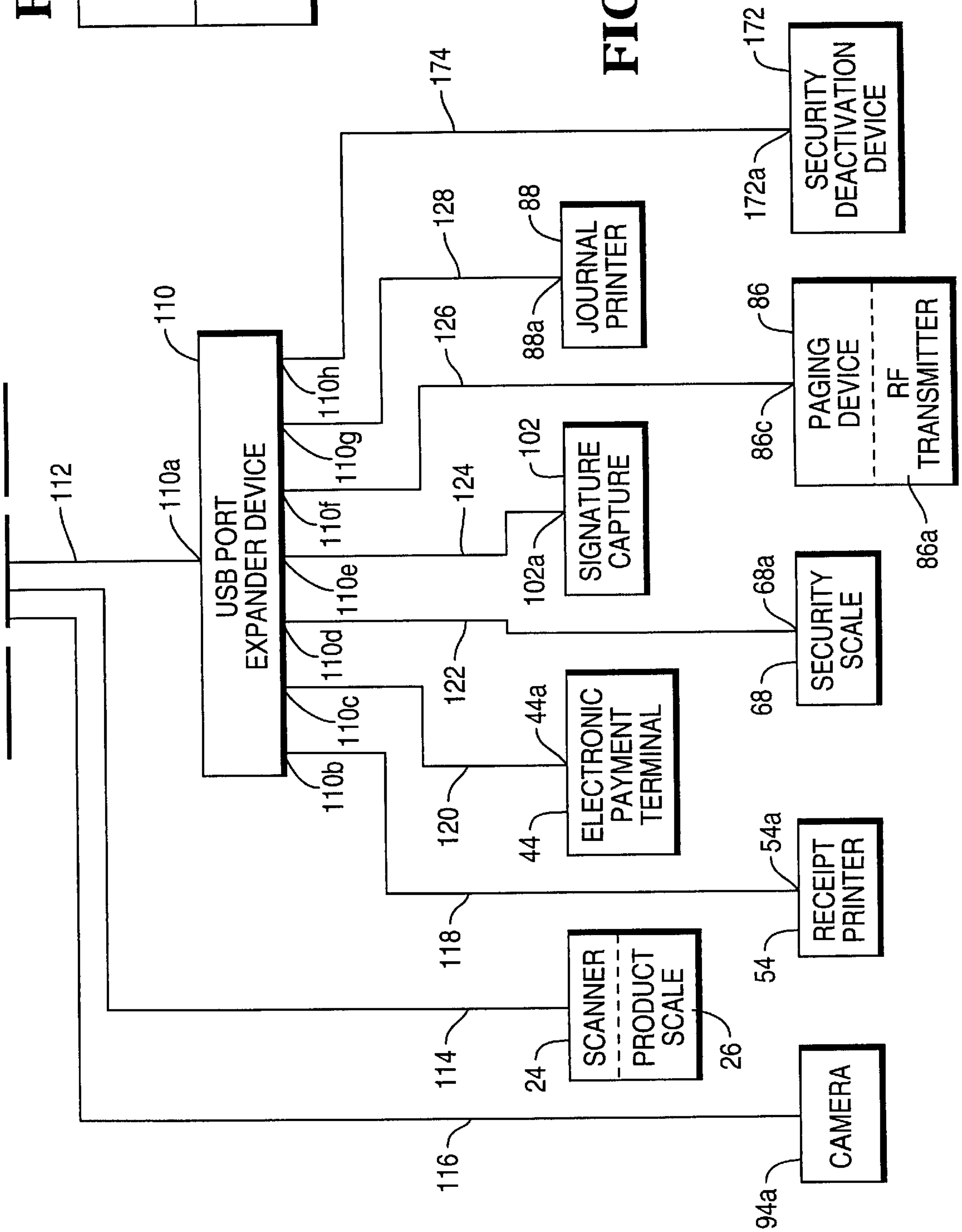

Referring now to FIG. 9, there is shown a simplified block diagram of the checkout system 10. In addition to the display monitor 78*a*, the processing unit 78*b* of the interactive customer interface terminal 78 is electrically coupled to the scanner 24, the product scale 26, the electronic payment terminal 44, the coin acceptor 46, the bill acceptor 50, the coin dispenser 48, the bill dispenser 52, the receipt printer 54, the security scale 68, the personnel interface terminal 76, the status light device 84, the paging device 86, the journal printer 88, the item sensors 98, 100, the input belt mechanism 20, and the security deactivation device 172. The processing unit 78*b* is also electrically coupled to a signature capture device 102, a lane light 104, and a supervisor switch 106.

The processing unit 78*b* monitors output signals generated by the assembly of the scanner 24 and product scale 26 via a serial data communication line 114 (e.g. an RS-232 serial data cable). In particular, when the customer scans an item which includes a product identification code across the scanning windows 24*a*, 24*b*, an output signal indicative of the product identification code is generated on the data communication line 114. Similarly, when a customer places an item on the product scale 26, the product scale 26 generates an output signal on the data communication line 114 which is indicative of the weight of the item.

The processing unit 78*b* is electrically coupled to the digital video camera 94*a* via a parallel data communication line 116 (e.g. a parallel data cable). The processing unit 78*b* generates control signals on the communication line 116 which cause the digital video camera 94*a* to capture video images of the customer, the checkout clerk, a portion of the checkout system 10, the shopping cart 238 or basket 240, etcetera, in order to enhance security during operation of the system 10. A data stream representative of such captured video images is then communicated to the processing unit 78*b* via the communication line 116 for processing thereof. In particular, such captured video images may be stored in the memory devices associated with the processing unit 78*b* for future use by, as described above, printing a rendition of a captured video image of the customer on the customer's transaction receipt 96 (see FIG. 14) or displaying a video image of the customer or the customer's grocery bags on the display monitors 78*a* or 76*a*.

The checkout system 10 also includes a number of port expander devices 108, 110. The port expander devices 108, 110 may be any known port expander device which enables a number of communication lines (e.g. data cables) to be connected to a single port of a controller (e.g. the connector ports associated with the interactive customer interface terminal 78). Moreover, the port expander devices 108, 110 of the present invention preferably allow more than one interface type. For example, the port expander devices 108, 110 of the present invention are preferably coupled to the processing unit 78*b* of the interactive customer interface terminal 78 via a Universal Serial Bus (USB) interface, but are coupled to certain retail peripheral devices (e.g. the electronic payment terminal 44, the cash dispenser 52, or the security scale 68) via an RS-232 serial interface. Such a configuration is particularly useful since commercially available retail devices are typically configured to communicate with a controller via an RS-232 serial interface thereby allowing the checkout system 10 to be configured with "industry standard" retail peripheral devices as opposed to more expensive, proprietary devices. It should be appreciated that in addition to USB/RS-232 port expander devices, other types of port expander devices may also be utilized in the present invention. For example, port expander devices which are coupled to the processing unit 78*b* via an Ethernet interface (i.e. an Ethernet/RS-232 port expander device) may also be utilized in the present invention.

As utilized in construction of the checkout system 10, the port expander devices 108, 110 facilitate the coupling of a number of retail peripheral devices associated with the system 10 to the processing unit 78*b* of the interactive customer interface terminal 78. In particular, a USB port 110*a* of the port expander device 110 is coupled to a first USB data port 78*e* of the processing unit 78*b* via a USB communication line 112 (e.g. a USB data cable).

A serial port 54*a* of the receipt printer 54 is coupled to a first serial port 110*b* of the port expander device 110 via a serial communication line 118 (e.g. an RS-232 serial data cable). Hence, the processing unit 78*b* communicates with the receipt printer 54 via a data path that includes the USB communication line 112, the port expander device 110, and the serial communication line 118. In such a manner, the processing unit 78*b* communicates with the receipt printer 54 in order to generate transaction receipts at the completion of a checkout transaction. The receipt printer 54 may be embodied as any type of ink-jet, laser, dot-matrix, LED, or thermal printer which is capable of printing the alphanumeric characters associated with transaction information 96*a* on the transaction receipt 96 (see FIG. 14), along with certain graphical representations associated with the rendition of the extracted video image 96*b* of the customer (see FIG. 14) when the checkout system 10 is configured to print such a rendition on the transaction receipt 96.

A serial port 44*a* of the electronic payment terminal 44 is coupled to a second serial port 110*c* of the port expander device 110 via a serial communication line 120 (e.g. an RS-232 serial data cable). Hence, the processing unit 78*b* communicates with the electronic payment terminal 44 via a data path that includes the USB communication line 112, the port expander device 110, and the serial communication line 120. In such a manner, the processing unit 78*b* communicates with the electronic payment terminal 44 in order to allow a customer to electronically tender payment for his or her items for purchase via, for example, a debit, credit, or smart card. In particular, as described above, the electronic payment terminal 44 includes a card reader and an input device such as a keypad. The keypad associated with the electronic payment terminal 44 may include one or more of a known keypad or a touch pad, whereas the card reader may include a known credit, debit, loyalty, and/or smart card reader which is capable of reading information stored on the customer's card. Hence, the processing unit 78*b* communicates with the electronic payment terminal in order to receive data read from the customer's card or codes such as PIN numbers which are input by the customer via use of the keypad.

A serial port 68*a* of the security scale 68 is coupled to a third serial port 110*d* of the port expander device 110 via a serial communication line 122 (e.g. an RS-232 serial data cable). Hence, the processing unit 78*b* communicates with the security scale 68 via a data path that includes the USB communication line 112, the port expander device 110, and the serial communication line 122. In such a manner, the processing unit 78*b* communicates with the security scale 68 in order to (1) monitor the placement of items into, or the removal of items from, the self-service bagwell 60 and the assisted bagwell 62, and (2) the placement of items onto, and the removal of items off of, the set-aside shelf 70. In particular, when an item is placed into one of the grocery bags within the bagwells 60, 62 or onto the set-aside shelf 70, the security scale 68 generates an output signal indicative of the weight of the item which is communicated to the processing unit 78*b*. Similarly, when an item is removed from one of the grocery bags within the bagwells 60, 62 or from the set-aside shelf 70, the security scale 68 generates an output signal indicative of the weight of the removed item which is communicated to the processing unit 78*b*.

A serial port 102*a* of the signature capture device 102 is coupled to a fourth serial port 110*e* of the port expander device 110 via a serial communication line 124 (e.g. an RS-232 serial data cable). Hence, the processing unit 78*b* communicates with the signature capture device 102 via a data path that includes the USB communication line 112, the port expander device 110, and the serial communication line 124. In such a manner, the processing unit 78*b* communicates with the signature capture device 102 in order to create an electronic record of a customer's signature during a credit transaction. In particular, the signature capture device 102 may include any known signature capture device which is capable of generating an electronic representation of a customer's signature when the customer signs his or her name with a pen, stylus, or other writing instrument associated with the signature capture device 102. Capturing a customer's signature with a signature capture device 102 generally causes the retailer to be charged a smaller transaction fee for the credit card transaction from the bank or other financial institution which issued the customer's card. Such lower transaction fees are particularly beneficial in the retail grocery business due to the relatively small profit margins associated with such a business.

A serial port 86*c* of the paging device 86 is coupled to a fifth serial port 110*f* of the port expander device 110 via a serial communication line 126 (e.g. an RS-232 serial data cable). Hence, the processing unit 78*b* communicates with the paging device 86 via a data path that includes the USB communication line 112, the port expander device 110, and the serial communication line 126. In such a manner, the processing unit 78*b* communicates with the paging device 86 in order to generate RF signals which are received by either the wireless alphanumeric pagers 90 or the RF signal receiver 92 associated with the store's intercom device 92. As described above, such RF communications allows retail personnel to be summoned to the checkout system 10 in order to provide assistance and/or security during operation of the checkout system 10.

A serial port 88*a* of the journal printer 88 is coupled to a sixth serial port 110*g* of the port expander device 110 via a serial communication line 128 (e.g. an RS-232 serial data cable). Hence, the processing unit 78*b* communicates with the journal printer 88 via a data path that includes the USB communication line 112, the port expander device 110, and the serial communication line 128. In such a manner, the processing unit 78*b* communicates with the journal printer 88 in order to generate a journal or printed record of each checkout transaction performed by the checkout system 10. The journal printer 88 may be embodied as any type of ink-jet, laser, dot-matrix, LED, or thermal printer which is capable of printing a record of the checkout transactions performed on the system 10. Preferably, the journal printer 88 is configured to print such a record on "roll-type" paper so as to facilitate collection of the record.

A serial port 172*a* of the security deactivation device 172 is coupled to a seventh serial port 110*h* of the port expander device 110 via a serial communication line 174 (e.g. an RS-232 serial data cable). Hence, the processing unit 78*b* communicates with the security deactivation device 172 via a data path that includes the USB communication line 112, the port expander device 110, and the serial communication line 174. In such a manner, the processing unit 78*b* communicates with the security deactivation device 172 in order to generate a deactivation field (e.g. a magnetic or electromagnetic field) which deactivates electronic security tags associated with an EAS system. As described above, the security deactivation device 172 may be configured to continuously generate a deactivation field, or alternatively, the processing unit 78*b* may communicate with the security deactivation device 172 to selectively generate the deactivation field in response to capture of the product code associated with an item being scanned or otherwise entered into the checkout system 10.

Similarly to the port expander device 110, the port expander device 108 is utilized to facilitate communication between the processing unit 78*b* and a number of retail peripheral devices. In particular, a USB port 108*a* of the port expander device 108 is coupled to a second USB data port 78*f* of the processing unit 78*b* via a USB communication line 138 (e.g. a USB data cable).

A serial port 48*a* of the coin dispenser 48 is coupled to a first serial port 108*b* of the port expander device 108 via a serial communication line 130 (e.g. an RS-232 serial data cable). Hence, the processing unit 78*b* communicates with the coin dispenser 48 via a data path that includes the USB communication line 138, the port expander device 108, and the serial communication line 130. In such a manner, the processing unit 78*b* communicates with the coin dispenser 48 in order to dispense change in the form of coins to a customer during finalization of a checkout transaction. In particular, when a customer is owed change in the form of coins during finalization of a checkout transaction, the processing unit 78*b* generates an output signal indicative of the amount of change in the form of coins that is owed the customer. Such an output signal is communicated to the coin dispenser 48 thereby causing the coin dispenser 48 to dispense the correct amount of change in the form of coins to the customer.

A serial port 46*a* of the coin acceptor 46 is coupled to a second serial port 108*c* of the port expander device 108 via a serial communication line 132 (e.g. an RS-232 serial data cable). Hence, the processing unit 78*b* communicates with the coin acceptor 46 via a data path that includes the USB communication line 138, the port expander device 108, and the serial communication line 132. In such a manner, the processing unit 78*b* communicates with the coin acceptor 46 in order to accept coins from a customer during finalization of a checkout transaction. In particular, when a customer inserts coins into the coin acceptor 46 during finalization of a checkout transaction, the coin acceptor 46 generates an output signal indicative of the value of each coin which is inserted into the coin acceptor 46. Such an output signal is communicated to the processing unit 78*b* in order to determine if the customer has inserted the requisite amount of currency to tender payment for his or her items for purchase.

A serial port 52*a* of the bill dispenser 52 is coupled to a third serial port 108*d* of the port expander device 108 via a serial communication line 134 (e.g. an RS-232 serial data cable). Hence, the processing unit 78*b* communicates with the bill dispenser 52 via a data path that includes the USB communication line 138, the port expander device 108, and the serial communication line 134. In such a manner, the processing unit 78*b* communicates with the bill dispenser 52 in order to dispense change in the form of bills to a customer during finalization of a checkout transaction. In particular, when a customer is owed change in the form of bills during finalization of a checkout transaction, the processing unit 78*b* generates an output signal indicative of the amount of change in the form of bills that is owed the customer. Such an output signal is communicated to the bill dispenser 52 thereby causing the bill dispenser 52 to dispense the correct amount of change in the form of bills to the customer.

A serial port 50*a* of the bill acceptor 50 is coupled to a fourth serial port 108*e* of the port expander device 108 via a serial communication line 136 (e.g. an RS-232 serial data cable). Hence, the processing unit 78*b* communicates with the bill acceptor 50 via a data path that includes the USB communication line 138, the port expander device 108, and the serial communication line 136. In such a manner, the processing unit 78*b* communicates with the bill acceptor 50 in order to accept bills from a customer during finalization of a checkout transaction. In particular, when a customer inserts bills into the bill acceptor 50 during finalization of a checkout transaction, the bill acceptor 50 generates an output signal indicative of the value of each bill that is inserted into the bill acceptor 50. Such an output signal is communicated to the processing unit 78*b* in order to determine if the customer has inserted the requisite amount of currency to tender payment for his or her items for purchase.

It should be appreciated that use of the port expander devices 108, 110 provides the checkout system 10 of the present invention with numerous advantages over heretofore checkout systems. For example, use of the port expander devices 108, 110 allows the processing unit 78*b* associated with the interactive customer interface terminal 78 to be configured with a relatively small number of output connectors. For example, if not for use of the port expander devices 108, 110, a connector would have to be provided on the processing unit 78*b* for each of the components which are coupled to the port expander devices 108, 110 in FIG. 9 in order to couple the components directly to the output connectors of the processing unit 78*b*. Such a requirement for additional connector/port capacity would undesirably increase the size and cost of the interactive customer interface terminal 78.

In addition to reducing the number of output connectors that must be provided on the processing unit 78*b*, use of the port expander devices 108, 110 also simplifies or otherwise enhances the cable management of the checkout system 10. In particular, the port expander devices 108, 110 are preferably located in relatively close proximity to the retail peripheral devices to which port expander devices 108, 110 are coupled thereby reducing the distance across which the individual serial cables associated with each peripheral device must be routed. For instance, it is preferable to mount the port expander device 108, 110 within the same terminal cabinet 28, 30, 32 in which the retail peripheral devices coupled to the port expander devices 108, 110 are disposed.

In a specific example, as shown in FIGS. 1 and 9, the port expander device 108 is secured within the terminal cabinet 32 so as to be located in relatively close proximity to the coin dispenser 48, the coin acceptor 46, the bill dispenser 52, and the bill acceptor 50. In such a configuration, the serial cables respectively associated with each of the currency devices 46, 48, 50, 52 (i.e. the serial communication lines 130, 132, 134, 136, respectively) are completely contained within the terminal cabinet 32. What is meant herein by the term "completely contained" in regard to cables is that the entire cable is positioned within a structure (e.g. one of the terminal cabinets 28, 30, 32) such that no portion of cable extends out of the structure. Hence, in regard to the port expander device 108, only the USB cable (i.e. the USB communication line 138) must be routed outside of the terminal cabinet 32. In particular, a first end connector of the cable associated with the USB communication line 138 is secured to the second USB port 78*f* of the processing unit 78*b*, whereas a second end connector of the cable associated with the USB communication line 138 is secured to the USB port 108*a* of the port expander device 108. Hence, a central portion of the cable associated with the USB communication line 138 is routed or otherwise extends between the terminal cabinet 30 and the terminal cabinet 32. However, the USB cable associated with the USB communication line 138 is the only cable associated with the currency devices 46, 48, 50, 52 that extends out of the terminal cabinet 32.

It should be appreciated that the port expander device 110 may positioned in a similar manner. For example, the port expander device 110 may be positioned within the terminal cabinet 30 in order to be located in relatively close proximity to the retail peripheral devices to which the port expander device 110 is coupled (e.g. the security scale 68 or the electronic payment device 44).

Moreover, it should also be appreciated that any number of port expander devices, or configurations thereof, may be utilized in conjunction with the concepts of the present invention in order to provide for use of additional retail peripheral devices or to further enhance the cable management of the checkout system 10. For example, although the assembly of the scanner 24 and the product scale 26 is shown in FIG. 9 and described herein as being directly coupled to a serial port of the processing unit 78*b*, the assembly of the scanner 24 and the product scale 26 could alternatively be coupled to an available serial port associated with the port expander device 110 thereby eliminating the need to route the serial cable associated with the assembly of the scanner 24 and the product scale 26 (i.e. the serial communication line 114) all the way back to the processing unit 78*b*.

The processing unit 78*b* of the interactive customer interface terminal 78 also controls operation of a number of components associated with the checkout system 10 which are not controlled via use of a standard communication protocol (e.g. RS-232). In particular, a number of components associated with the checkout system 10 are "on-off" devices such as the lane light 104, the lamp assembly 84*a* associated with the status light device 84, and the motor (not shown) associated with the input belt mechanism 20. The checkout system 10 further includes an interface unit 140 for interfacing with such devices. In particular, the interface unit 140 interfaces with the input belt mechanism 20, the lamp assembly 84*a* of the status light device 84, the item sensors 98, 100, the lane light 104, and the supervisor switch 106. As shown in FIG. 9, the interface unit 140 is coupled to a serial port associated with the processing unit 78*b* via a serial communication line 142 (e.g. a serial cable).

The input belt mechanism 20 is coupled to the interface unit 140 via a control line 144. Hence, the processing unit 78*b* controls operation of the input belt mechanism 20 via a data path that includes the serial communication line 142, the interface unit 140, and the control line 144. In such a manner, the processing unit 78*b* controls actuation of the motor (not shown) associated with the input belt mechanism 20 so as to control advancement of the input belt 22. In particular, as described above, the input belt mechanism 20 may be actuated when placement of an item onto the input belt 22 is detected by the upstream item sensor 98 thereby causing the item to be moved in a downstream direction toward the scanner 24. Thereafter, the input belt mechanism 20 is deactuated when arrival of the item at a predetermined location at the downstream end portion 22*b* of the input belt 22 is detected by the downstream item sensor 100. Moreover, advancement of the input belt 22 may be manually controlled by retail personnel or a customer via use of the key pad associated with the personnel interface terminal 76 (in the case of control by retail personnel) or the touch screen associated with the display monitor 78*a* of the interactive customer interface terminal 78 (in the case of control by the customer). In the case of such manual advancement of the input belt 22, the processing unit 78*b* selectively generates output signals which selectively cause actuation and deactuation of the input belt mechanism 20.

The input belt mechanism 20 is coupled to the interface unit 140 via a control line 144. Hence, the processing unit 78*b* controls operation of the input belt mechanism 20 via a data path that includes the serial communication line 142, the interface unit 140, and the control line 144. In such a manner, the processing unit 78*b* controls actuation of the motor (not shown) associated with the input belt mechanism 20 so as to control advancement of the input belt 22. In particular, as described above, the input belt mechanism 20 may be actuated when placement of an item onto the input belt 22 is detected by the upstream item sensor 98 thereby causing the item to be moved in a downstream direction toward the scanner 24. Thereafter, the input belt mechanism 20 is deactuated when arrival of the item at a predetermined location at the downstream end portion 22*b* of the input belt 22 is detected by the downstream item sensor 100. Moreover, advancement of the input belt 22 may be manually controlled by retail personnel or a customer via use of the key pad associated with the personnel interface terminal 76 (in the case of control by retail personnel) or the touch screen associated with the display monitor 78*a* of the interactive customer interface terminal 78 (in the case of control by the customer). In the case of such manual advancement of the input belt 22, the processing unit 78*b* selectively generates output signals which selectively cause actuation and deactuation of the input belt mechanism 20.

The lamp assembly 84*a* of the status light device 84 is coupled to the interface unit 140 via a control line 146. Hence, the processing unit 78*b* controls operation of the input belt mechanism 20 via a data path that includes the serial communication line 142, the interface unit 140, and the control line 146. In such a manner, the processing unit 78*b* controls actuation of the lamps associated with the lamp assembly 84*a*. In particular, as described above, the lamp assembly 84*a* is utilized to summon retail personnel to the checkout system 10 in order to provide assistance and/or security during operation of the system 10. Accordingly, the processing unit 78*b* may cause a red lamp associated with the lamp assembly 84*a* to be illuminated when intervention by retail personnel is needed immediately, whereas a yellow lamp may be illuminated when intervention is not needed until the end of the customer's transaction. Similarly, a green lamp may be illuminated when the checkout system 10 is being operated properly without the need for intervention by retail personnel.

The upstream item sensor 98 is coupled to the interface unit 140 via a signal line 148. Hence, the processing unit 78*b* communicates with the upstream item sensor 98 via a data path that includes the serial communication line 142, the interface unit 140, and the signal line 148. In such a manner, the processing unit 78*b* determines when the customer places an item for purchase on the input belt 22. In particular, as described above, the upstream item sensor 98 is preferably embodied as a photodetector device which generates a light beam which is emitted across the upstream end portion 22*a* of the input belt 22. The upstream item sensor 98 generates an output signal which is sent to the processing unit 78*b* when the light beam is interrupted by an item being placed on the input belt 22 by a customer.

The downstream item sensor 100 is coupled to the interface unit 140 via a signal line 150. Hence, the processing unit 78*b* communicates with the downstream item sensor 100 via a data path that includes the serial communication line 142, the interface unit 140, and the signal line 150. In such a manner, the processing unit 78*b* determines when an item that is being advanced toward the scanner 24 by the input belt mechanism 22 has been advanced to a predetermined location on the downstream end portion 22*b* of the input belt 22. In particular, as described above, the downstream item sensor 98 is preferably embodied as a photodetector device which generates a light beam which is emitted across the downstream end portion 22*b* of the input belt 22. The downstream item sensor 100 generates an output signal which is sent to the processing unit 78*b* when the light beam is interrupted by an item being advanced on the input belt 22 once the item has been advanced to the predetermined location on the downstream end portion 22*b* of the input belt 22.

The lane light 104 is coupled to the interface unit 140 via a control line 152. Hence, the processing unit 78*b* controls operation of the lane light 104 via a data path that includes the serial communication line 142, the interface unit 140, and the control line 152. In such a manner, the processing unit 78*b* controls actuation of the lamps associated with the lane light 104. The lane light 104 is utilized to communicate the lane number associated with a given checkout system 10 to retail personnel or customers. In particular, when a particular lamp associated with the lane light 104 is illuminated, the lane number associated with the given checkout system 10 is displayed. Such illumination also communicates that the checkout system 10 is "open" (i.e. available for use by the customer). Moreover, the lane light 104 is also configured to have lamp assemblies which, when illuminated, display a message such as "SELF-SERVICE" if the checkout system 10 is configured in its self-service mode of operation, or alternatively, to display a message such as "ASSISTED" or "FULL-SERVICE" if the checkout system 10 is configured in its assisted mode of operation.

The supervisor switch 106 is coupled to the interface unit 140 via a signal line 154. Hence, the processing unit 78*b* monitors output from the supervisor switch 106 via a data path that includes the serial communication line 142, the interface unit 140, and the signal line 154. In such a manner, the processing unit 78*b* determines whether to operate the checkout system 10 in its self-service mode of operation or its assisted mode of operation. In particular, retail personnel such as a customer service manager toggles the supervisor switch 106 during a changeover procedure associated with changing the checkout system 10 between its self-service mode of operation and its assisted mode of operation. It should be appreciated that the operating system software executed by the processing unit 78*b* may have certain features which are selectively enabled or disabled based on whether the checkout system 10 is being operated in its self-service mode of operation or its assisted mode of operation.

The processing unit 78*b* communicates with the personnel interface terminal 76 through a data communication line 156 (i.e. a data cable). The processing unit 78*b* generates output signals on the data communication line 156 which cause instructional messages and transaction information to be displayed on the display monitor 76*a* (see FIG. 23) of the personnel interface terminal 76. Moreover, data signals generated by the keypad 76*b* associated with the personnel interface terminal 76 are transmitted to the processing unit 78*b* via the communication line 156 when retail personnel touches a particular key associated with the keypad 76*b*.

The processing unit 78*b* communicates with the display monitor 78*a* associated with the interactive customer interface terminal 78 through an internal data bus 158. The processing unit 78*b* generates output signals on the data bus 158 which cause various messages such as transaction information, instructions, or advertisements to be displayed on the display monitor 78*a*. As alluded to above, the display monitor 78*a* may include known touch screen technology which can generate output signals when the customer touches a particular area of the display screen associated with the display monitor 78*a*. The signals generated by the display monitor 78*a* are transmitted to the processing unit 78*b* via the data bus 158.

The processing unit 78*b* may also be utilized to control additional system components associated with various configurations of the checkout system 10. For example, the motor (not shown) associated with the takeaway belt mechanism 56 may be controlled by the processing unit 78*b* in a similar manner similar to the motor (not shown) associated with the input belt mechanism 20. In particular, the takeaway belt mechanism 56 is coupled to the interface unit 140 via a control line 176. Hence, the processing unit 78*b* controls operation of the takeaway belt mechanism 56 via a data path that includes the serial communication line 142, the interface unit 140, and the control line 176. In such a manner, the processing unit 78*b* controls actuation of the motor (not shown) associated with the takeaway belt mechanism 56 so as to control advancement of the takeaway belt 58. In particular, as described above, the takeaway belt mechanism 56 may be actuated in order to advance items which have been scanned or otherwise entered from the itemization area 14 to the bagging counter 66.

Moreover, the payment area 16 of the checkout system 10 may be configured with a coupon acceptor 178 (see FIGS. 1, 5, and 9). The coupon acceptor 178 is provided to allow a customer to tender coupons, vouchers, or the like during operation of the checkout system 10. As shown in FIG. 9, a serial port 178*a* of the coupon acceptor 178 is coupled to a fifth serial port 108*f* of the port expander device 108 via a serial communication line 180 (e.g. an RS-232 serial data cable). Hence, the processing unit 78*b* communicates with the coupon acceptor 178 via a data path that includes the USB communication line 138, the port expander device 108, and the serial communication line 180. In such a manner, the processing unit 78*b* communicates with the coupon acceptor 178 in order to accept coupons from a customer during finalization of a checkout transaction. In particular, when a customer inserts coupons into the coupon acceptor 178 during finalization of a checkout transaction, the coupon acceptor 178 generates an output signal indicative of the presence of the tendered coupon. Such an output signal is communicated to the processing unit 78*b* in order to confirm that the coupon has been tendered. It should be appreciated that the coupon acceptor 178 may be equipped with a bar code reader or the like to capture machine readable indicia that is printed on certain coupons.

Moreover, the checkout system 10 may also be configured to include a cash drawer for allowing the checkout clerk to receive payment from the customer. In such a configuration, the cash drawer would also be under control of the processing unit 78*b* such that the solenoids and the like utilized to open the cash drawer are actuated by control signals from the processing unit 78*b*.

The processing unit 78*b* includes network interface circuitry (not shown) which conventionally permits the checkout system 10 to communicate with the retailer's network 184 such as a LAN or WAN through a wired connection 182 (see FIG. 9). The processing unit 78*b* communicates with the retailer's network 184 during the checkout procedure in order to obtain information, such as pricing information, associated with an item being scanned or otherwise entered, and also to verify customer credit approval when appropriate. The network interface circuitry associated with the checkout system 10 may include a known Ethernet expansion card, and the wired connection 182 may include a known twisted-pair communication line. Alternatively, the network interface circuitry may support wireless communications with the retailer's network 184.

The processing unit 78*b* also communicates with the retailer's network 184 in order to access a customer profile database maintained in a network memory device such as a network mass storage device (not shown) associated with a network central server (not shown). The customer profile database includes unique, customer-specific retail information associated with each of the retailer's customers. For example, when a customer initially applies or otherwise registers for his or her loyalty card, customer-specific retail information such as name, address, gender, age, account numbers, or other demographic information is generally collected on the customer's application. Such customer-specific retail information is included in the customer's profile within the customer profile database. Moreover, the customer's profile within the customer profile database may also include customer-specific retail information such as the customer's shopping or purchasing history. For example, a record of the items purchased during recent visits to the retailer's store may be included in the customer's profile. Moreover, a record may also be made in the customer's profile if the customer redeems a certain type of voucher or coupons or responds to a certain type of promotion.

As discussed above, contents of the customer profile database are utilized in order to generate customer-specific messages to the customer during a checkout transaction. In particular, while the checkout clerk is entering the customer's items for purchase during an assisted checkout transaction, transaction information such as item price and total dollar amount are displayed on the display monitor 78*a*. In addition to such transaction information, customer-specific advertisements may be displayed on a portion of the display monitor 78*a* in order to influence the customer to buy additional items. For example, the customer profile associated with a given customer may be initially retrieved from the customer profile database. Thereafter, the processing unit 78*b* causes customer-specific advertisements to be displayed on the display monitor 78*b* based on the contents of the customer's profile. For example, if the customer profile of a given customer indicates that the customer buys a certain type of beer during each of his or her visits to the retailer's store, the processing unit 78*b* may cause an advertisement for the certain type of beer to be displayed on the display monitor 78*b* in order to entice the customer to buy beer if the checkout clerk has not yet entered beer into the checkout system 10. It should be appreciated that any type of criteria may be established to fit the needs of given retailer in regard to analyzing the contents of the customer profile database for the purposes of selecting an appropriate customer-specific advertisement message. Moreover, as discussed above, the customer-specific message may also be displayed on the display monitor 76*a* of the personnel interface terminal 76 so that such a message may be viewed by the checkout clerk.

As discussed above, the processing unit 78*b* preferably includes a number of local memory devices such as the memory modules 78*d* (see FIG. 9) and a hard drive. The local memory devices are provided to maintain the operating system software needed to operate the checkout system 10. In addition, the local memory devices are provided to maintain an electronic transaction table which includes a record of the product information associated with each item that is scanned, weighed, or otherwise entered during the user's operation of the checkout system 10. For example, if the user scans a can of soup, the description of the soup and the pricing information associated therewith is recorded in the transaction table in the local memory devices. Similarly, if the user weighs a watermelon with the product scale 26 and then enters a product lookup code associated with watermelon via a data input device such as the terminals 76, 78, product information associated with the watermelon is recorded in the transaction table. Moreover, if a user entered a coupon or voucher, the information associated therewith would also be recorded in the transaction table.

It should therefore be appreciated that the sum of each of the items recorded in the transaction table (1) minus any reductions (e.g. coupons), and (2) plus any applicable taxes is the amount that the customer pays for his or her transaction. Moreover, data stored in the transaction table is printed out on the receipt printer 54 thereby generating a receipt for the customer at the end of his or her transaction.

The local memory devices are also provided to maintain a number of electronic logs associated with operation of the checkout system 10. More specifically, the local memory devices electronically maintain a number of event logs each of which respectively tracks or otherwise tallies the number of occasions in which the user operates the checkout system 10 in a particular manner. An event log may be provided to track those occasions in which the user unintentionally operated the checkout system 10 improperly, along with those occasions in which it can be inferred with a high degree of confidence that the user intentionally operated the checkout system 10 improperly for illicit purposes such as theft. For example, if the processing unit 78*b* determines that the user placed an item into the post-scan area 18 without having previously scanned or otherwise entered the item into the system 10, an entry is made in an event log corresponding to such activity. This is true since the user may have unintentionally operated the scanner 24 incorrectly thereby preventing the scanner 24 from reading the bar code printed on the item. However, the possibility does exist that the user may have intentionally prevented the scanner 24 from reading the bar code printed on the item (e.g. the user may have placed his or her thumb over the bar code during the scanning attempt). Therefore, an entry is made in an event log corresponding to such activity (i.e. placing an item in the post-scan area 18 without having first entered the item into the system 10).

Moreover, a separate event log may be maintained to track those occasions in which a user does not properly correct a prior misuse of the system 10. For example, if the processing unit 78*b* determines that the user placed an item into the post-scan area 18 without having previously scanned or otherwise entered the item into the system 10 in the manner discussed above, the processing unit 78*b* causes a message to be displayed on the display monitor 76*a* of the personnel interface terminal 76 (in the case of operation of the system 10 by a checkout clerk) or the display monitor 78*a* of the interactive customer interface terminal 78 (in the case of operation of the system 10 by a customer) which instructs the user (i.e. the checkout clerk or the customer) to remove the item from the post-scan area 18 and thereafter properly enter the item. A separate event log is maintained in order to track the number of occasions in which the user does not follow such instruction or performs an additional improper operation. For example, if subsequent to such instruction the user removes a different item, or no item at all, from the post-scan area 18, an entry is made into the event log associated with such activity.

Additional examples of event logs which may be maintained include an event log which tracks the number of occasions in which the user weighs an item, such as produce, with the product scale 26, but then places an item of a different weight in the post-scan area 18. Moreover, a separate event log may be provided to track the number of occasions in which a user voids a first item from a transaction, but then removes a second item of lesser value from the post-scan area 18. A separate event log may be maintained to track the dollar amount of the coupons which are entered by a given user. Yet further, a separate event log may be provided to track the amount of time which elapses from the point in time at which the customer removes his or her items from the post-scan area 18 until the point in time at which the customer tenders payment for his or her items.

Moreover, the local memory devices maintain an electronic aggregate log. The aggregate log tracks the total of each of the various event logs. It should be appreciated that such an aggregate log is particularly useful for monitoring a user's "overall" operation of the checkout system 10. In particular, while the occurrence of certain individual activities by a given user may not separately rise to a level of concern, the aggregate of such activities may be of concern to the retailer.

It should be appreciated that a separate, predetermined threshold value may be established for each of the numerous event logs and also the aggregate log. More specifically, a retailer may establish a threshold value for each of the logs that once equaled or exceeded causes the processing unit 78*b* to communicate with certain system components in order to request intervention by retail personnel. In particular, when a threshold value associated with one of the event logs or the aggregate log is equaled or exceeded, the processing unit 78*b* may communicate with the paging device 86 in order to page or otherwise alert retail personnel as to certain events surrounding the operation of the checkout system 10 by a given user. After being alerted in such a manner, retail personnel will typically intervene into the transaction in order to either assist the user (in the case of inadvertent misuse of the system 10) or audit and/or discontinue the transaction (in the case of intentional misuse or theft). It should be appreciated that the processing unit 78*b* may also communicate with retail personnel via the status light device 84.

Figure 10A:
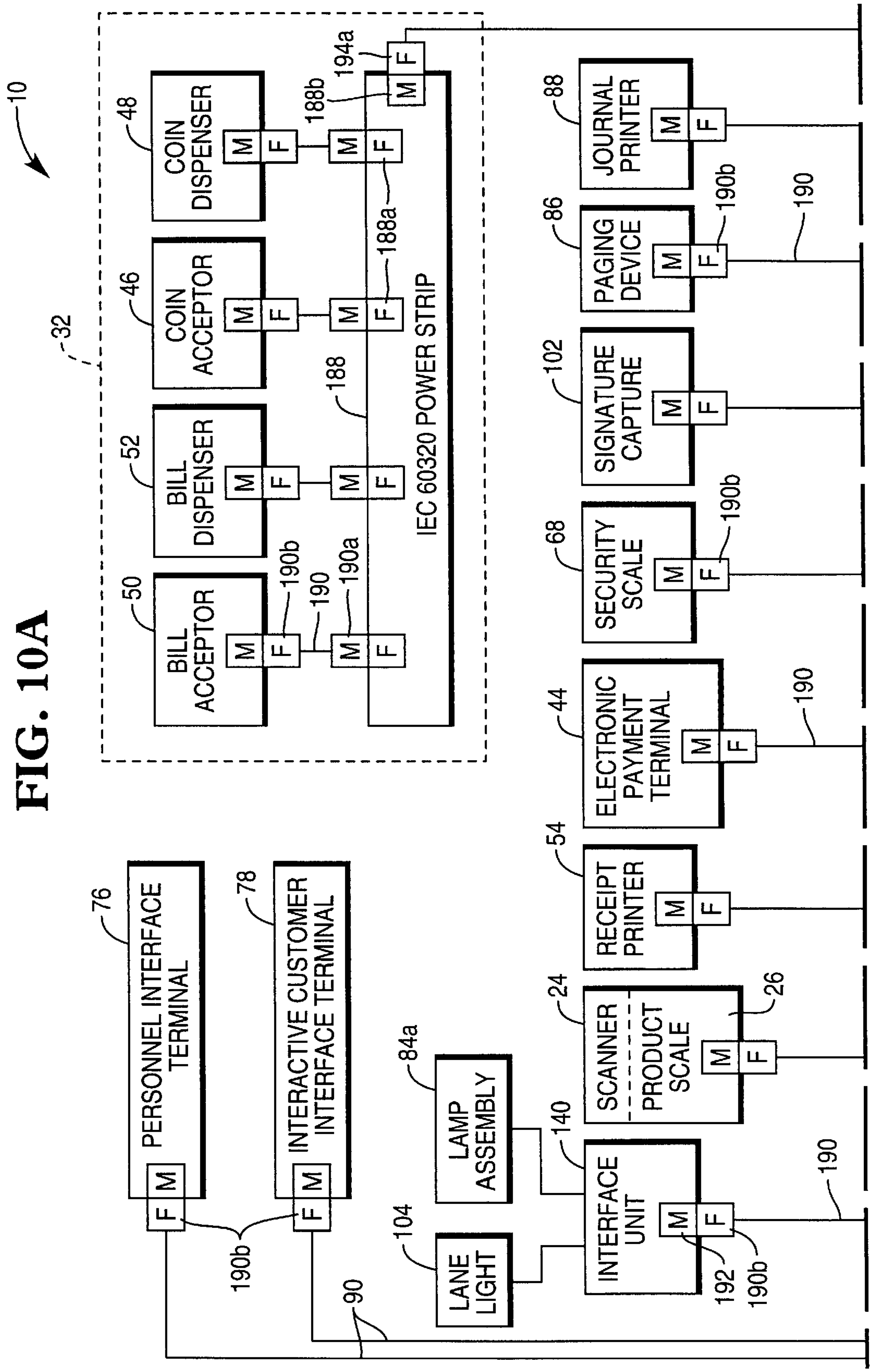
FIG. 10 is a view similar to FIG. 9, but showing the power distribution architecture of the checkout system of FIGS. 1–8.
Figure 10B:
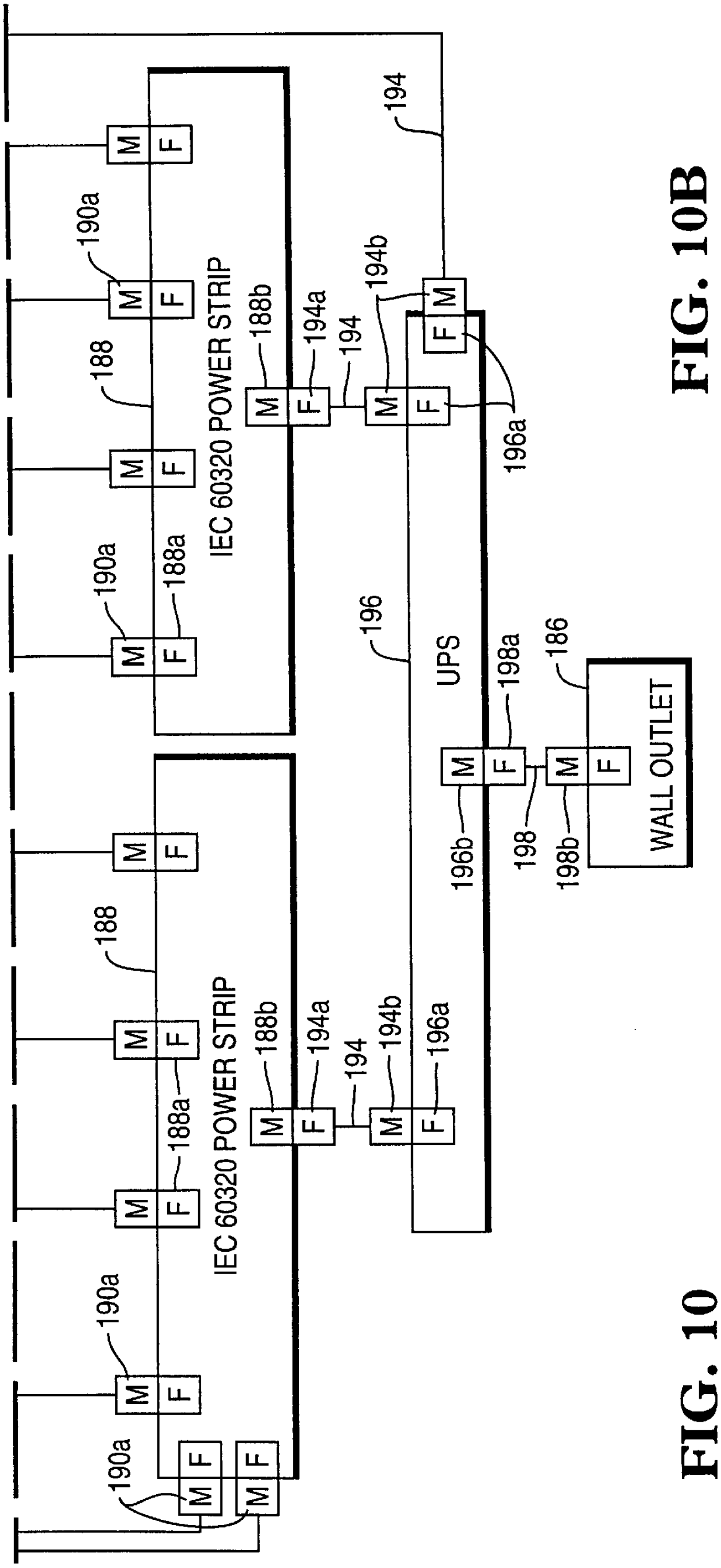
Figure 10:
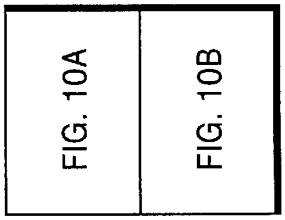

Referring now to FIG. 10, there is shown the power distribution scheme of the checkout system 10. Power is distributed from a wall outlet 186 to the system components associated with the checkout system 10 by use of a number of power strips 188. In particular, each of the power strips 188 is coupled to the wall outlet 186 via an uninterruptible power supply (UPS) 196, whereas each of the system components is electrically coupled to the power strips 188. Although not all of the system components shown in FIG. 9 are shown in FIG. 10 for purposes of clarity of description, it should be appreciated that such omitted system components (e.g. the belt mechanisms 20, 56, the digital camera 94*a*, etcetera) are coupled to the power strips 188 in a similar manner as described below.

Use of the power strips 188 simplifies or otherwise enhances the cable management of the checkout system 10. In particular, the power strips 188 are preferably located in relatively close proximity to the retail peripheral devices to which the power strips 188 are respectively coupled thereby reducing the distance across which the individual power cables associated with each peripheral device must be routed. For instance, it is preferable to mount one of the power strips 188 within the same terminal cabinet 28, 30, 32 in which the retail peripheral devices coupled to the particular power strip 188 are disposed.

In a specific example, as shown in FIG. 10, one of the power strips 188 is secured within the terminal cabinet 32 so as to be located in relatively close proximity to the coin dispenser 48, the coin acceptor 46, the bill dispenser 52, and the bill acceptor 50. In such a configuration, the power cables respectively associated with each of the currency devices 46, 48, 50, 52 (i.e. the serial communication lines 130, 132, 134, 136, respectively) are completely contained within the terminal cabinet 32. Hence, in regard to the power strip 188 located in the terminal cabinet 32, only the power cable which couples the power strip 188 located in the terminal cabinet 32 to the UPS 196 must be routed outside of the terminal cabinet 32.

It should be appreciated that the other power strips 188 may positioned in a similar manner. For example, one of the power strips 188 may be positioned within the terminal cabinet 30 in order to be located in relatively close proximity to the retail peripheral devices to which the particular power strip 188 is coupled (e.g. the security scale 68 or the signature capture device 102).

Moreover, the power strips 188 include a number of female power connectors 188*a* which are configured to receive a corresponding male connector 190*a* associated with a first end of a peripheral power cable 190. A second end of the peripheral power cable 190 includes a female connector 190*b* which is configured to be received into a male power connector 192 associated with each of the system components such as the interactive customer interface terminal 78, the personnel interface terminal 76, the interface unit 140, the assembly of the scanner 24 and the product scale 26, the receipt printer 54, the electronic payment terminal 44, the security scale 68, the signature capture device 102, the journal printer 88, the coin dispenser 48, the coin acceptor 46, the cash dispenser 52, and the bill acceptor 50.

Each of the female connectors 188*a*, the male connectors 190*a*, the female connectors 190*b*, and the male connectors 192 is configured in accordance with an accepted international standard for power connectors. What is meant herein by the term "accepted international standard for power connectors" is a power connector standard which is promulgated by an international standards organization for use in substantially all countries. One such accepted international standard for power connectors includes an IEC 60320 international standard for power connectors (including all variations and iterations thereof) which is promulgated by the International Electrotechnical Commission (IEC).

Similarly, each of the power strips 188 includes a number of male power connectors 188*b* which are configured to receive a corresponding female connector 194*a* associated with a first end of a UPS power cable 194. A second end of the UPS power cable 194 includes a male connector 194*b* which is configured to be received into a female power connector 196*a* associated with the UPS 196. The male power connectors 188*b*, the female connectors 194*a*, the male connectors 194*b*, and the female power connectors 196*a* are each configured in accordance with an accepted international standard for power connectors such as the IEC 60320 international standard for power connectors.

Moreover, the UPS 196 includes a male power connector 196*b* which is configured to receive a corresponding female connector 198*a* associated with a first end of an outlet power cable 198. A second end of the outlet power cable 198 includes a male connector 198*b* which is configured to be received into a power outlet such as the wall outlet 186. The male power connector 196*b* and the female connector 198*a* are both configured in accordance with an accepted international standard for power connectors such as the IEC 60320 international standard for power connectors. However, the male power connector 196*b* is configured in accordance with an accepted country-specific standard for power connectors. What is meant herein by the term "accepted country-specific standard for power connectors" is a power connector standard which is promulgated by a national standards organization or a de facto standard which is otherwise in use within a particular country which may or may not conform to an accepted international standard for power connectors. One such accepted country-specific standard for power connectors includes a standard promulgated by the American National Standards Institute (ANSI) or the National Electrical Manufacturers Association (NEMA) for use in conjunction with the three-prong connector configuration widely utilized throughout the United States (e.g. NEMA 5-15P for plug connectors and NEMA 5-15R for the associated receptacle connectors).

Such use of power connectors which conform to the IEC 60320 international standard for power connectors provides the checkout system 10 with numerous advantages over heretofore designed checkout systems. For example, use of power connectors which conform to the IEC 60320 international standard for power connectors facilitates the importation process of the checkout system 10 into foreign countries. In particular, heretofore designed checkout systems utilize power strips and power cables which have numerous connectors which conform to an accepted country-specific standard for power connectors. For example, checkout systems designed and/or manufactured for use the United States typically have receptacles that have female connectors which conform to U.S. standards (e.g. an applicable ANSI and/or NEMA standard) for receiving a male connector associated with a power cord of a peripheral device which also conforms to U.S. standards (e.g. an applicable ANSI and/or NEMA standard). The female connector of the peripheral power cord (i.e. the connector secured to the end of the power cable which connects to the male connector of the peripheral device) may or may not be configured in accordance with an international standard for power connectors. For example, a number of peripheral devices include male power connectors which conform to the IEC 60320 international standard for power connectors. Hence, the power cable associated with such a peripheral device typically has a female power connector which conforms to the IEC 60320 international standard for power connectors for coupling with the male connector of the peripheral device at one end, and a standard U.S. male power connector (e.g. a male connector that conforms to an applicable ANSI and/or NEMA standard) on the other end for coupling with a standard U.S. outlet such as the standard U.S. female power connectors associated with a power receptacle.

However, when such use of standard U.S. power connectors is discovered by an inspection officer or the like during importation of the checkout system into a foreign country, the checkout system may be denied immediate entry into the foreign country. In particular, importation of the checkout system into the foreign country may be delayed until a certificate of conformance or the like is presented to the inspection officer. Such delays can often take weeks thereby significantly slowing the delivery process of the checkout system to a retailer located in a foreign country.

However, the checkout system 10 of the present invention avoids such delays. In particular, when the inspection officer inspects the checkout system 10 during importation thereof into a foreign country, all of the power connectors associated with the checkout system 10 conform to the IEC 60320 international standard for power connectors thereby eliminating the need for a certificate of conformance or other documentation in regard to the power distribution architecture of the system 10.

Moreover, only the outlet power cable 198 needs to be swapped in order to operate the checkout system 10 in various foreign countries. In particular, a different outlet power cable 198 having a male connector 198*b* which is configured to be received into the country-specific wall outlet of each foreign country may be utilized to couple the UPS 196 (and hence the power strips 188) to the wall outlet 186. In such a manner, power may be supplied to each of the system components associated with the checkout system.

More specifically, each of the system components associated with the checkout system 10 includes an auto-ranging power supply (not shown) which is capable of converting a wide variety of AC input voltages into the regulated, predetermined DC voltage needed to operate the particular system component. For example, the individual power supplies respectively associated with each of the system components are configured to convert input power provided in either a European standard (e.g. 240V AC at 50 Hz), a U.S. standard (e.g. 110V AC at 60 Hz), or any other standard into the regulated, predetermined DC voltage needed to operate the particular system component. Hence, by swapping the outlet power cable 198 to fit into the country-specific wall outlet 186 of a given foreign country, power may be supplied to the system components without the need to also change any of the internal cable connections (i.e. the power cables 190 and 194) or power supplies within the checkout system 10.

It should be appreciated that the use of the power strips 188 and the port expander devices 108, 110 provides for "modular construction" of the checkout system 10 by simplifying or otherwise enhancing the cable management of the checkout system 10. In particular, the port expander device 108, 110 and the power strips 188 are preferably located in relatively close proximity to the retail peripheral devices to which the port expander devices 108, 110 and the power strips 188 are respectively coupled thereby reducing the distance across which the individual data and power cables associated with each peripheral device must be routed. For instance, it is preferable to mount one or more of the port expander devices 108, 110 and one or more of the power strips 188 within the same terminal cabinet 28, 30, 32 in which the retail peripheral devices coupled to the particular port expander devices 108, 110 or the particular power strips 188 are disposed.

Figure 29:
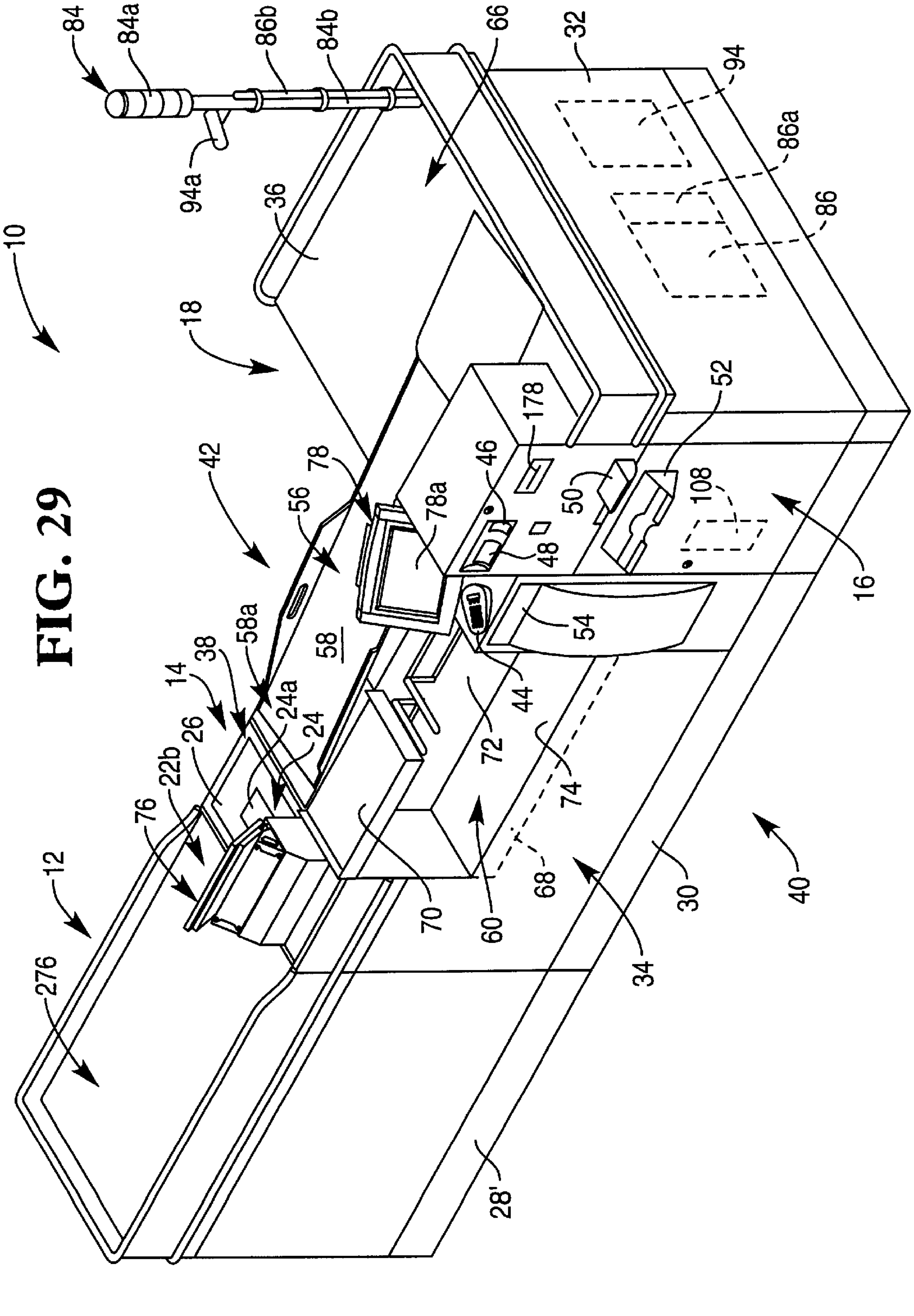
FIG. 29 is view similar to FIG. 1, but showing an alternative embodiment of a terminal cabinet which may be utilized in certain configurations of the checkout system of the present invention.

In such a manner, as described above, each of the data and power cables associated with the retail peripheral devices are completely contained within the respective terminal cabinets 28, 30, 32. This allows the system configuration of the checkout system 10 to be quickly and easily changed to fit the needs of a given retailer. For example, as shown in FIG. 29, in certain retail applications it may be desirable to configure the checkout system 10 without the input belt mechanism 20. In such a configuration, a terminal cabinet 28' having a flat surface or counter 276 secured thereto may be utilized in lieu of the terminal cabinet 28. Such a change in the configuration of the checkout system 10 is relatively easy to perform since the terminal cabinet 28 does not have data or power cables routed therethrough, except for the cables necessary for operation of the components associated with the terminal cabinet 28 (e.g. the item sensors 98, 100 and the input belt mechanism 20).

It should be appreciated that other terminal cabinet substitutions may also be quickly and easily performed due to such modular construction of the checkout system 10. For example, if a certain retailer does not desire a takeaway belt mechanism 56 and bagging counter 66, the terminal cabinet 32 may be removed and substituted for a cabinet having a configuration which meets the retailer's requirements.

Figure 30:
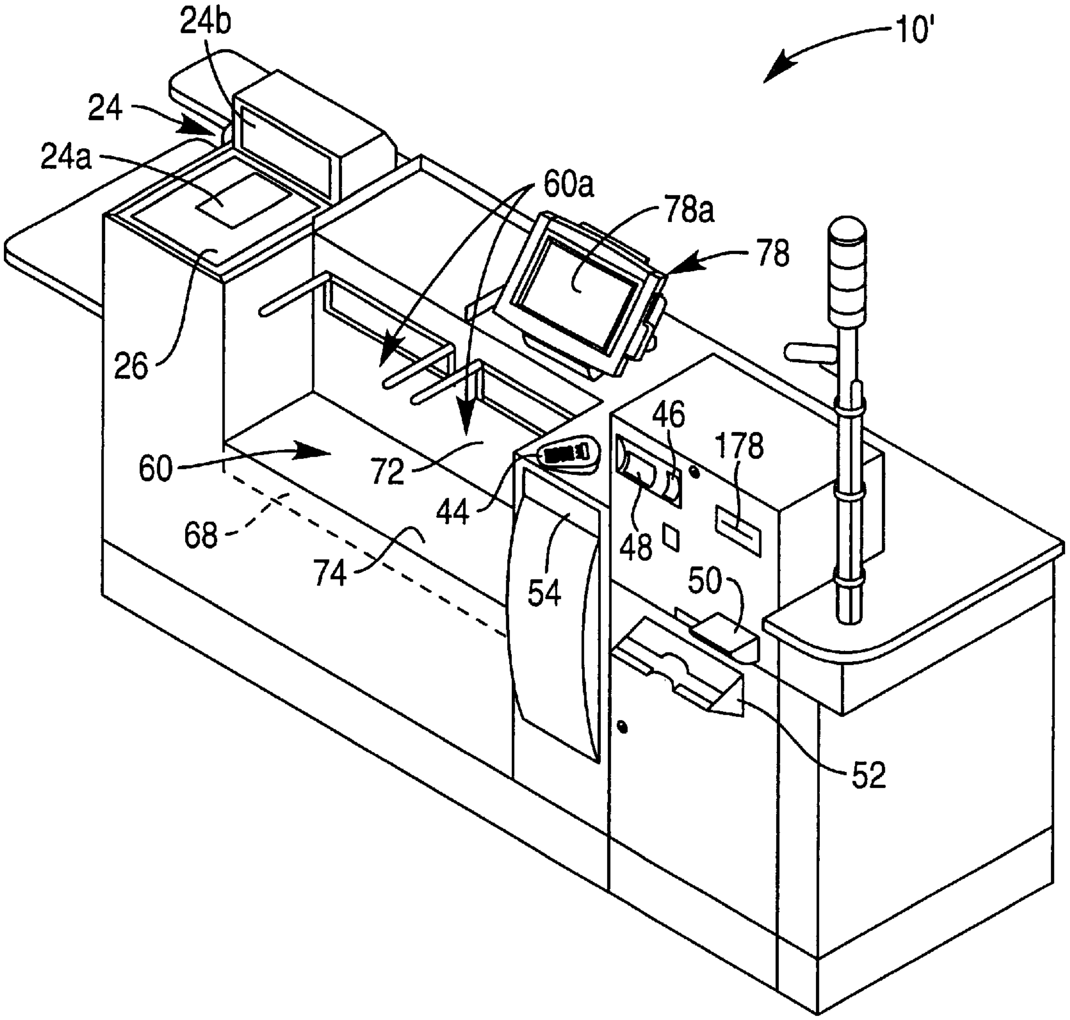
FIG. 30 is a perspective view of a first embodiment of a self-service checkout system which incorporates the features of the present invention therein.

Moreover, such modular construction of the checkout system 10 also allows the core design of the system to be utilized in the construction of other types of checkout systems. For example, as shown in FIG. 30, the modular construction of the checkout system 10 allows the core components of the system to be utilized in the design of a dedicated self-service checkout system 10'. The self-service checkout system 10' utilizes a similar design concept as the checkout system 10, but is not convertible into an assisted checkout system. Such a configuration is useful for retailers which desire a full-time self-service solution.

Figure 31:
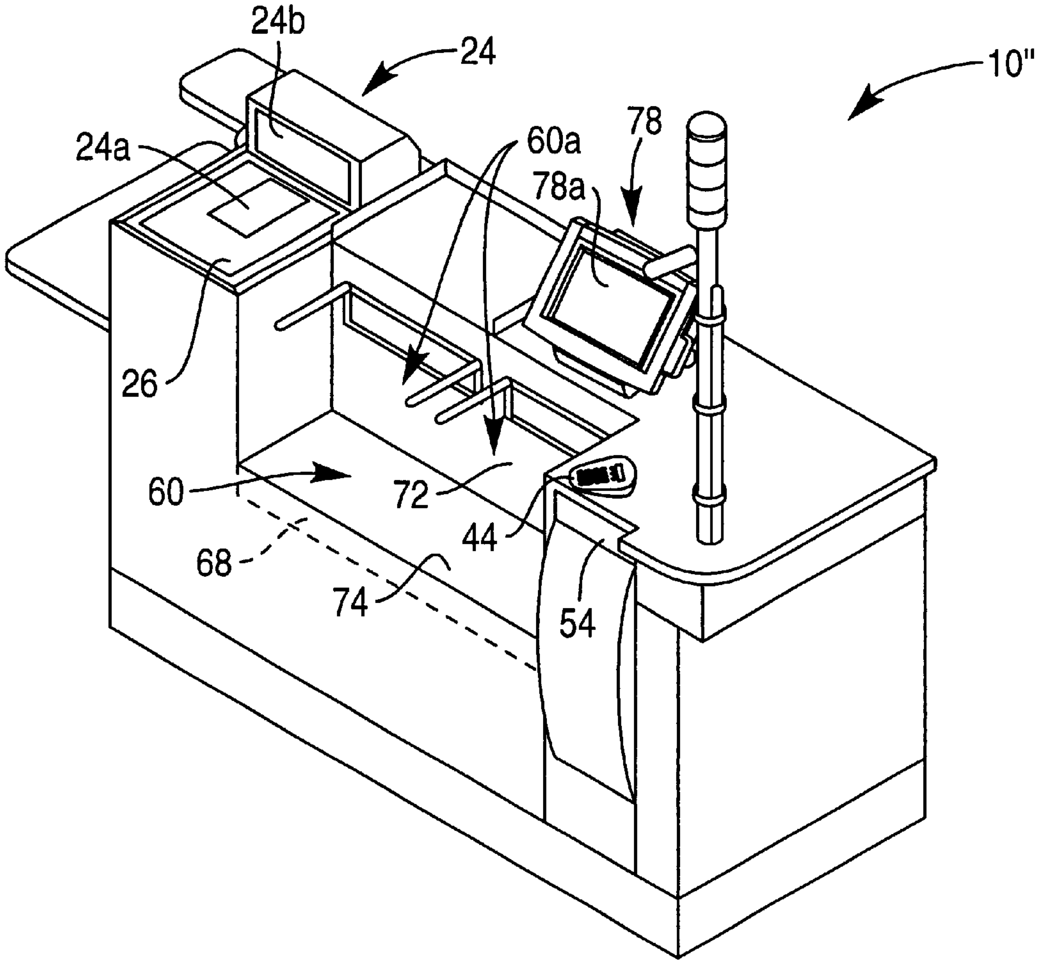
FIG. 31 is a view similar to FIG. 30, but showing a second embodiment of a self-service checkout system which incorporates the features of the present invention therein.

Moreover, as shown in FIG. 31, the modular construction of the checkout system 10 allows the core components of the system to be utilized in the design of a second type of dedicated self-service checkout system 10". The self-service checkout system 10" is substantially the same as the self-service checkout system 10', but the cash payment devices 46, 48, 50, and 52 and the coupon acceptor 178 have been removed. Such a configuration further reduces costs associated with manufacture of the system 10" by providing a system which accepts payment via debit, credit, or smart card only.

Operation of the Present Invention

In operation, the checkout system 10 may be operated to perform an assisted checkout transaction or a self-service checkout transaction. In particular, the checkout system 10 may be operated to perform an assisted checkout transaction in which retail personnel such as a checkout clerk assists the customer during the transaction. Prior to performing an assisted checkout transaction, system components associated with the checkout system 10 are first positioned in their respective assisted positions. In particular, the scanner 24 is first rotated into its assisted scanner position by, as shown in FIG. 11, sliding the sliding drawer assembly 38 into its extended position such that the scanner 24 (and hence the product scale 26) may be rotated to its assisted scanner position in which the vertical scanning window **24*b* faces the personnel side 42 of the checkout system 10. Thereafter, the sliding drawer assembly is slid back into its retracted position within the interior of the terminal base 34 such that operation of the scanner 24 by the checkout clerk may be commenced (see FIGS. 1–4**).

Moreover, the personnel interface terminal 76 is rotated to its operative position in which the display monitor **76*a* associated therewith faces the personnel side 42 of the checkout system 10. In particular, as shown in FIGS. 1–4 and 23, the terminal support member 80 (and hence the personnel interface terminal 76) may be rotated relative to the housing 82 which houses the vertical scanning window 24*b* of the scanner 24 such that the display monitor 76*a* and the keypad 76*b* face the personnel side 42 of the checkout system 10**.

Yet further, the set-aside item shelf 70 is moved relative to the terminal base 34 so as to be positioned in its assisted shelf position. In particular, as shown in FIGS. 1–4, 12, and 13, the set-aside item shelf 70 may be slid or pivoted (depending on the type of mounting configuration utilized to secure the shelf 70 to the terminal base 34) to its assisted shelf position such that items may be positioned thereon by the checkout clerk during an assisted checkout transaction.

Moreover, as shown in FIGS. 1 and 19, prior to operation of the checkout system 10 in its assisted mode of operation, the support arm assembly 160 is manipulated so as to cause the interactive customer interface terminal 78 to assume its assisted terminal position in which the display monitor **78*a* faces the general direction of the payment area 16. It should be appreciated that during an assisted checkout transaction, the customer is generally positioned in the proximity of the payment area 16. Hence, by positioning the display monitor 78*a* in the position shown in FIG. 19 (i.e. an assisted monitor position), retail information, along with other messages such as customer-specific advertisements, may be displayed on the display monitor 78*a* for viewing by the customer while the checkout clerk enters the customer's items for purchase with the scanner 24**.

In addition, the takeaway belt 58 associated with the takeaway belt mechanism 56 may be positioned to allow the checkout clerk to selectively advance items to either the assisted bagwell 62 or the bagging counter 66. In particular, the takeaway belt 58 may be slid between an extended position (see FIG. 12) and a retracted position (see FIG. 13). As shown in FIG. 13, when the takeaway belt 58 is positioned in its retracted position, an end portion 58*a* of the takeaway belt 58 is spaced apart from the scanner 24 so as to expose the overhead access opening 62*a* associated with the assisted bagwell 62 in order to allow the checkout clerk operating the scanner 24 to place an item into a grocery bag within the assisted bagwell 62 once the item has been scanned. Conversely, as shown in FIG. 12, when the takeaway belt 58 is positioned in its extended position, the end portion 58*a* of the takeaway belt 58 is positioned proximate to the scanner 24 so as to cover the overhead access opening 62*a* associated with the assisted bagwell 62 in order to allow the checkout clerk operating the scanner 24 to place an item onto the takeaway belt 58 once the item has been scanned in order to allow the item to be transported to the bagging counter 66 by the takeaway belt mechanism 56.

It should be appreciated that once the system components associated with checkout system 10 have been positioned in the manner described above, retail personnel actuates the system 10. For example, the checkout clerk toggles the supervisor switch 106 (see FIG. 9) so as to cause the processing unit 78*b* to execute an assisted version of the operating system software associated with the checkout system 10. In particular, although the operating system software is essentially the same for checkout system 10 irrespective of whether or not the system 10 is being operated in its self-service mode of operation or its assisted mode of operation, certain system functions may be enabled or disabled as the system 10 is switched between its two modes of operation based on a particular system configuration. Moreover, prior to operation of the checkout system 10 in its assisted mode of operation, the checkout clerk preferably actuates the lane light 104 (see FIG. 9) so as to cause the lane light 104 to illuminate a "FULL-SERVICE" message so as to indicate to customers that the particular checkout system is being operated as an assisted checkout system in which a checkout clerk is available to assist the customer.

Figure 25:
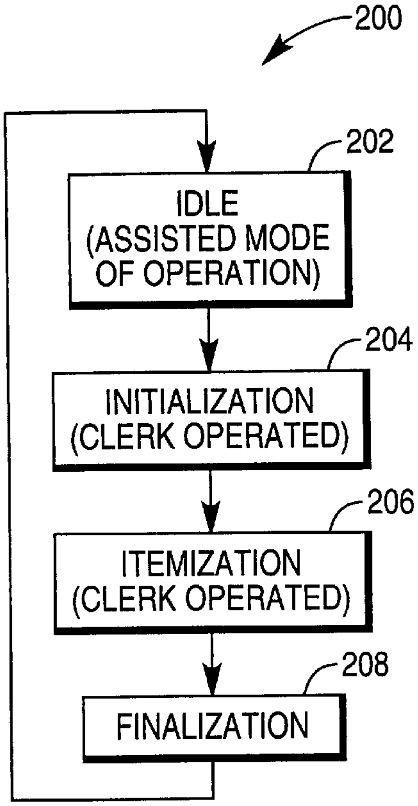
FIG. 25 is a flowchart which shows a general procedure or routine for operating the checkout system of the present invention in its assisted mode of operation.

Referring now to FIG. 25, there is shown a flowchart which sets forth a general procedure 200 for checking out items through the checkout system 10 when the system 10 is being operated in its assisted mode of operation. It should be appreciated that when the customer arrives at the checkout system 10, the system 10 is in an idle state (step 202). An initialization step 204 is executed prior to checking out items for purchase. In particular, the checkout clerk operating the system 10 enters certain information about the transaction such as pressing a particular button on the keypad 76*b* associated with the personnel interface terminal 76 in order to select a desired method of payment, and/or (2) identifying the customer by having the customer swipe his or her loyalty card, debit card, credit card, or smart card through the card reader associated with the electronic payment terminal 44.

At the completion of the initialization step 204, the routine 200 advances to an itemization step 206 where the checkout clerk enters the customer's individual items for purchase by scanning the items across the scanner 24. Moreover, in step 206, the checkout clerk may enter items, such as produce items or the like, by weighing the items with the product scale 26, and thereafter entering a product lookup code associated with the item via the keypad 76*b* associated with the personnel interface terminal 76. Further, in step 206 the customer may enter an item by manually entering the product identification code associated with the item via use of the keypad 76*b* associated with the personnel interface terminal 76. Such manual entry of an item may be necessary for items (which would otherwise be entered via the scanner 24) if the product identification code printed on the item is not readable by the scanner 24 or if the item is too large or bulky to be scanned with the scanner 24. It should be appreciated that the checkout system 10 may be alternatively configured such that the routine 200 allows the checkout clerk to bypass the initialization step 204 thereby advancing directly to the itemization step 206. In such a configuration, the checkout clerk would begin the transaction by scanning or otherwise entering the customer's first item for purchase.

At the completion of the itemization step 206, an end-of-itemization control signal is generated and the routine 200 advances to a finalization step 208 in which (1) a transaction receipt is printed by the receipt printer 54, (2) a record of the transaction is printed on the journal printer 88, and (3) payment is tendered by either inserting currency into a currency acceptor (i.e. the coin acceptor 46 and/or the bill acceptor 50), charging a credit card or debit card account, or decreasing a value amount stored on a smart card via the electronic payment terminal 44. In the case of when a customer inserts currency into the coin acceptor 46 and/or the bill acceptor 50, the checkout system 10 may provide change via a currency dispenser (i.e. the coin dispenser 48 and/or the bill dispenser 52). After completion of the finalization step 208, the routine 200 returns to step 202 in which the checkout system 10 remains in the idle condition until subsequent initiation thereof.

As described, execution of such a procedure provides numerous advantages to the checkout system 10 of the present invention. For example, by operating the checkout system 10 such that payment is tendered by the customer by use of the currency acceptors (i.e. the coin acceptor 46 and/or the bill acceptor 50) or the electronic payment device 44 without the assistance of the checkout clerk allows the checkout clerk to begin a subsequent transaction while the customer completes the current transaction thereby enhancing the efficiency and throughput associated with the checkout system 10. Similarly, operation of the electronic payment terminal 44 and generation of the transaction receipt on the customer side 40 of the checkout system 10 allows the customer to complete his or her transaction without further assistance from the checkout clerk thereby further enhancing the efficiency and throughput associated with the checkout system 10.

Figure 26:
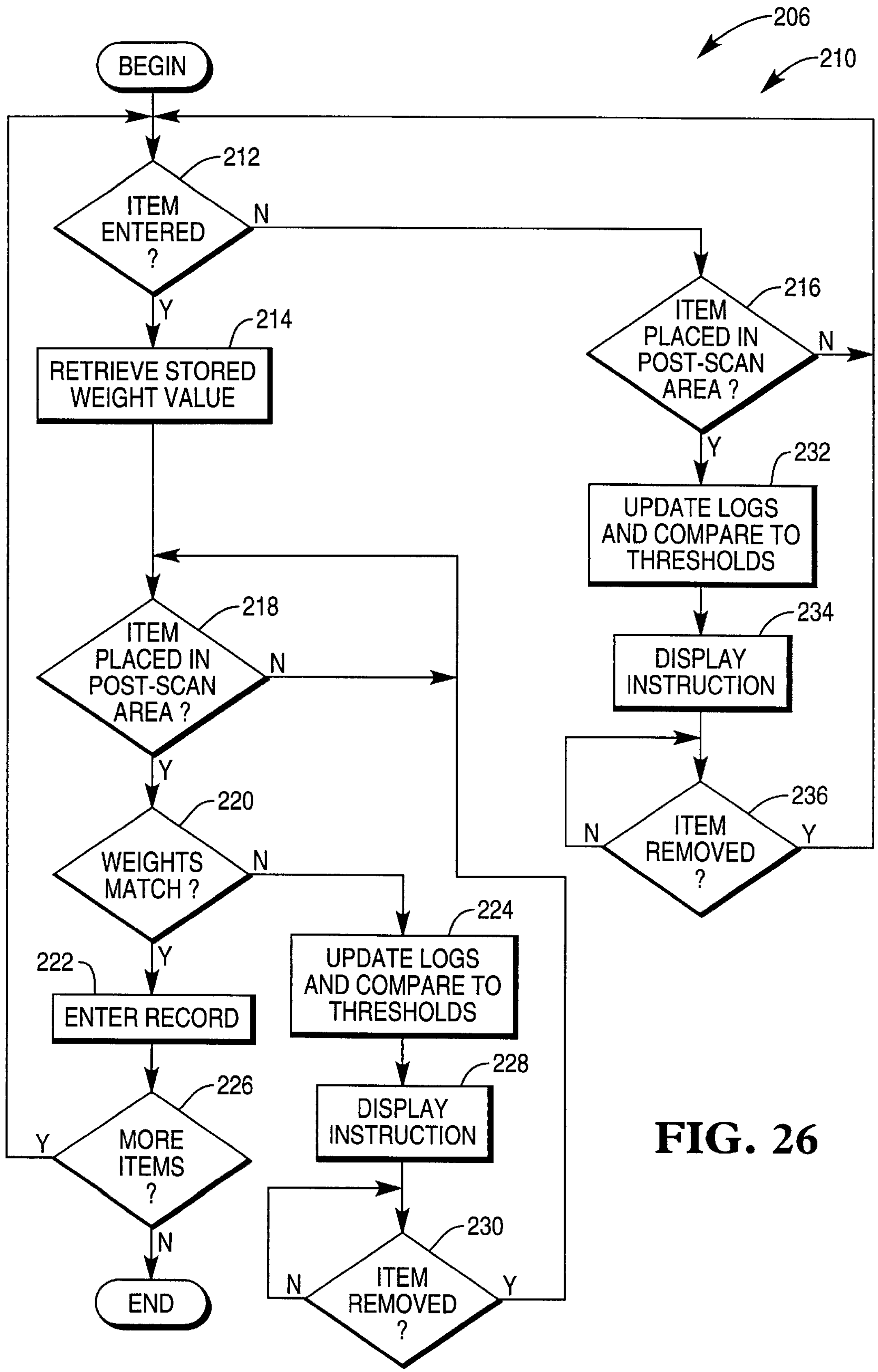
FIG. 26 is a flowchart which shows the scale security routine for providing security during operation of the checkout system of the present invention.

During operation of the checkout system 10 in its assisted mode of operation, a number of software routines are executed to provide security from improprieties such as theft. For example, as shown in FIG. 26, a scale security routine 210 is executed during the itemization step 206 (see FIG. 25) when the checkout system 10 is being operated with the takeaway belt 58 positioned in its retracted belt position (see FIG. 13) in which the checkout clerk is himself or herself bagging the customer's items for purchase. The scale security routine 210 monitors output from the security scale 68 thereby monitoring the movement of items into and out of the post-scan area 18 in an effort to prevent "sweet-hearting" (e.g. a situation in which the checkout clerk scans a first item, but then places a second, more expensive item, or even an item that the clerk never even attempted to scan, into the customer's bag in order to provide an improper benefit to the customer who is typically an acquaintance of the checkout clerk).

The scale security routine 210 begins with step 212 in which the processing unit 78*b* determines if an item has been entered into the checkout system 10 by the checkout clerk. In particular, the processing unit 78*b* scans or reads the output from the scanner 24 in order to determine if the scanner 24 has successfully read or otherwise captured the product identification code associated with an item. More specifically, the scanner 24 generates an output signal which is sent to the processing unit 78*b* once the scanner 24 successfully reads the product identification code associated with the item. Similarly, the processing unit 78*b* scans or reads the output from the product scale 26 and the keypad 76*b* associated with the personnel interface terminal 76 to determine if the checkout clerk weighed an item such as produce with the product scale 26 and thereafter entered a product lookup code associated with the item via the keypad 76*b*. Moreover, the processing unit 78*b* also monitors output from the keypad 76*b* associated with the personnel interface terminal 76 in order to determine if the checkout clerk manually entered a product identification code associated with an item that was unable to be scanned with the scanner 24. Hence in step 212, if an item is entered into the checkout system 10, an item-entered control signal is generated and the scale security routine 210 advances to step 214. If an item has not been entered into the checkout system 10 by the checkout clerk, the scale security routine 210 advances to step 216.

In step 214, the processing unit 78*b* retrieves a stored weight value of the entered item from a weight database. In particular, the processing unit 78*b* communicates with either a local memory device (e.g. the memory modules 78*d* or the hard drive) or a network memory device associated with the retailer's network 184 in order to retrieve the stored weight value associated with the entered item from the weight database. As discussed above, the weight database may be in the form of a master database which includes every item sold by the retailer, or may be a "transaction level" database which is constructed locally at the checkout system 10 during operation thereof. In either event, once the stored weight value of the entered item has been retrieved from the weight database, the scale security routine 210 advances to step 218.

In step 218, the processing unit 78*b* determines if the entered item is placed in the post-scan area 18. More specifically, the security scale 68 generates an output or detection signal which is sent to the processing unit 78*b* once the security scale 68 has detected placement of an item (1) into one of the grocery bags within the assisted bagwell 62, or (2) onto the set-aside item shelf 70. If the security scale 68 detects placement of an item into the post-scan area 18, the scale security routine 210 is advanced to step 220. If the security scale does not detect placement of the item into the post-scan area 18, the scale security routine 210 loops back to step 218 to monitor for subsequent placement of the item into the post-scan area 18. It should be appreciated that the checkout system 10 may be configured to allow for the entry of items without the item being subsequently placed in the post-scan area 18. For example, if the checkout clerk scans a pack of gum, the gum may be handed directly to the customer so that the customer may place the gum into his or her pocket instead of a grocery bag. In such a situation, the scale security routine 210 would be configured to loop back to step 212 to monitor entry of subsequent items if a previously entered item is not placed into the post-scan area 18 within a predetermined time.

As described above, if the security scale 68 detects placement of an item into the post-scan area 18, the scale security routine 210 is advanced to step 220. In step 220, the processing unit 78*b* determines if the measured weight value of the item placed in the post-scan area 18 (as detected by the security scale 68 in step 218) matches the stored weight value of the entered item that was retrieved from the weight database in step 214. What is meant herein by the terms "match", "matches", or "matching" in regard to weight values is that the magnitude of a first weight value is either equal to, or within a predetermined tolerance range of, the magnitude of a second weight value. For example, two weight values "match" if they are identical weight values. Moreover, a first weight value "matches" a second weight value if the first weight value is within 2% of the second weight value (assuming a 3% tolerance range). Yet further, a first weight value "matches" a second weight value if the first weight value is within 0.05 pounds of the second weight value (assuming a tolerance range of 0.10 pounds).

Hence, in step 220, the processing unit 78*b* compares the weight value of the item placed (1) into one of the grocery bags in the assisted bagwell 62, or (2) onto the set-aside item shelf 70 (as measured by the security scale 68) with the stored weight value of the entered item that was retrieved from the weight database in step 214. If the measured weight value of the item placed into the post-scan area 18 matches the stored weight value of the item retrieved from the weight database, the scale security routine 210 advances to step 222. If the measured weight value of the item placed into the post-scan area 18 does not match the stored weight value of the item retrieved from the weight database, the scale security routine 210 advances to step 224.

In step 222, the processing unit 78*b* determines that a successful checkout operation has been completed for the particular item selected for purchase. More specifically, the processing unit 78*b* concludes that (1) the checkout clerk apparently scanned or otherwise entered the item since a code associated with the item was detected in step 212, and (2) the same item was placed in the post-scan area 18 since the weight values matched in step 220. Hence, the processing unit 78*b* adds a record of the properly entered item into the transaction table. In particular, the processing unit 78*b* communicates with the network 25 to obtain product information (e.g. description and price) associated with the entered item. Thereafter, the processing unit 78*b* updates the transaction table. More specifically, the processing unit 78*b* generates an output signal which is sent to the local memory devices (e.g. the memory modules 78*d* or the hard drive) which causes the transaction table to be updated in the local memory devices to include the product information associated with the scanned item. As described above, the sum of each of the items recorded in the transaction table (1) minus any reductions (e.g. coupons), and (2) plus any applicable taxes is the amount that the customer pays for his or her transaction. Moreover, data stored in the transaction table is printed out on the receipt printer 54 thereby generating a receipt for the customer at the end of his or her transaction. Once the transaction table has been updated, a valid-use control signal is generated, and the scale security routine 210 advances to step 226.

In step 226, the processing unit 78*b* monitors the output from the keypad 76*b* associated with the personnel interface terminal 76. In particular, the checkout clerk touches a particular key of the keypad 76*b* when the checkout clerk has completed scanning or otherwise entering all of the customer's items for purchase. If a particular signal is generated by the keypad 76*b*, the processing unit 78*b* determines that the itemization procedure 206 is complete and the scale security routine 210 ends thereby advancing the general routine 200 (see FIG. 25) to the finalization step 208. If a particular signal is not generated by the keypad 76*b*, the processing unit 78*b* determines that the checkout clerk has additional items to enter, and the scale security routine 210 loops back to step 212 to monitor subsequent item entry.

Returning now to step 220, if the measured weight value of the item placed into the post-scan area 18 does not match the stored weight value of the entered item retrieved from the weight database, the scale security routine advances to step 224. In step 224, the processing unit 78*b* increments the aggregate log and a particular event log associated with item substitutions by a predetermined value. More specifically, the processing unit 78*b* generates an output signal which is sent to the local memory devices (e.g. the memory modules 78*d* or the hard drive) which causes the event log and the aggregate log to be incremented in the local memory devices by a value of one.

Thereafter, the processing unit 78*b* determines if the total value of either the event log associated with item substitutions or the aggregate log exceeds the respective predetermined threshold value for each log. More specifically, if the event log associated with item substitutions exceeds its predetermined threshold value, the processing unit 78*b* causes an output signal to be generated which causes the paging device 86 and the status light device 84 to be operated to page or otherwise summon retail personnel such as a manager in order to assist and/or investigate the checkout clerk to determine if the checkout clerk is attempting to provide improper benefits to the customer such as by "sweethearting". In addition, if the aggregate log exceeds its predetermined threshold value, the processing unit 78*b* generates an output signal which causes the paging device 86 and the status light device 84 to be operated to page or otherwise summon retail personnel such as a manager in order to assist and/or investigate the checkout clerk in a similar manner. The scale security routine 210 then advances to step 228.

In step 228, the processing unit 78*b* causes a message to be displayed on the display monitor 76*a* associated with the personnel interface terminal 76 which instructs the checkout clerk to remove the item from the post-scan area 18 and thereafter place the proper item into the post-scan area. The scale security routine 210 then advances to step 230.

In step 230, the processing unit 78*b* communicates with the security scale 68 in order to determine if the substituted item is removed from the post-scan area 18 by the checkout clerk, as instructed. In particular, the security scale 68 generates an output signal which is sent to the processing unit 78*b* when the checkout clerk (1) removes the substituted item from one of the grocery bags in the assisted bagwell 62, or (2) takes the substituted item off of the set-aside item shelf 70. It should be appreciated that the processing unit 78*b* compares the weight value of the removed item to the weight value of the substituted item that was determined when it was placed in the post-scan area 18 (as detected in step 218) in order to ensure that the proper item is removed. If the proper item is removed from the post-scan area 18, an item-removed control signal is generated and the scale security routine 210 loops back to step 218 to monitor subsequent placement of the correct item into the post-scan area 18. If the proper item has not yet been removed from the post-scan area 18, the scale security routine 210 loops back to step 230 to monitor subsequent removal of the proper item from the post-scan area 18.

Returning now to step 212, if an item was not scanned or otherwise entered into the checkout system 10, the scale security routine 210 advances to step 216. In step 216, the processing unit 78*b* determines if an unentered item is placed in the post-scan area 18. More specifically, the security scale 68 generates an output or detection signal which is sent to the processing unit 78*b* once the security scale 68 has detected placement of an item (1) into the assisted bagwell 62, or (2) onto the set-aside item shelf 70. If the security scale 68 detects placement of an unentered item into the post-scan area 18, an invalid-use control signal is generated, and the scale security routine 210 is advanced to step 232. If the security scale 68 does not detect placement of an unentered item into the post-scan area 18, the processing unit 78*b* concludes that there is no present item entry attempt being made by the checkout clerk, and the scale security routine 210 loops back to step 212 to monitor for subsequent item entry.

In step 232, the processing unit 78*b* increments the aggregate log and a particular event log associated with unentered item placement (i.e. placement of an unentered item into the post-scan area 18) by a predetermined value. More specifically, the processing unit 78*b* generates an output signal which is sent to the local memory devices (e.g. the memory modules 78*d* or the hard drive) which causes the event log associated with unentered item placement and the aggregate log to be incremented in the local memory devices by a value of one.

Thereafter, the processing unit 78*b* determines if the total value of either the event log associated with unentered item placement or the aggregate log exceeds the respective predetermined threshold value for each log. More specifically, if the event log associated with unentered item placement exceeds its predetermined threshold value, the processing unit 78*b* causes an output signal to be generated which causes the paging device 86 and the status light device 84 to be operated to page or otherwise summon retail personnel such as a manager in order to assist and/or investigate the checkout clerk to determine if the checkout clerk is attempting to provide improper benefits to the customer such as by "sweethearting". In addition, if the aggregate log exceeds its predetermined threshold value, the processing unit 78*b* generates an output signal which causes the paging device 86 and the status light device 84 to be operated to page or otherwise summon retail personnel such as a manager in order to assist and/or investigate the checkout clerk in a similar manner. The scale security routine 210 then advances to step 234.

In step 234, the processing unit 78*b* causes a message to be displayed on the display monitor 76*a* associated with the personnel interface terminal 76 which instructs the checkout clerk to remove the unentered item from the post-scan area 18 and thereafter properly scan or otherwise enter the item into the checkout system 10. The scale security routine 210 then advances to step 236.

In step 236, the processing unit 78*b* communicates with the security scale 68 in order to determine if the unentered item is removed from the post-scan area 18 by the checkout clerk, as instructed. In particular, the security scale 68 generates a removal output signal which is sent to the processing unit 78*b* when the checkout clerk (1) removes the unentered item from one of the grocery bags in the assisted bagwell 62, or (2) takes the unentered item off of the set-aside item shelf 70. It should be appreciated that the processing unit 78*b* compares the weight value of the removed item to the weight value of the unentered item that was determined when it was placed in the post-scan area 18 (as detected in step 216) in order to ensure that the proper item is removed. In particular, the processing unit 78*b* generates a match control signal if the weight value of the removed item matches the weight value of the unentered item that was placed in the post-scan area 18. In response to generation of the match control signal, the processing unit 78*b* causes a message to be displayed on the display monitor 76*a* which instructs the checkout clerk to re-enter the item. Hence, in step 236, if the proper item is removed from the post-scan area 18, an item-removed control signal is generated and the scale security routine 210 loops back to step 212 to monitor subsequent entry of the item. If the proper item has not yet been removed from the post-scan area 18, or a different item is removed, an instruction is displayed on the display monitor 76*a* which instructs the checkout clerk to remove the proper item, and the scale security routine 210 loops back to step 236 to monitor subsequent removal of the proper item from the post-scan area 18.

As described above, use of the scale security routine 210 provides the checkout system 10 with numerous advantages over heretofore designed checkout systems. For example, as described in detail above, use of the scale security routine 210 provides security from improprieties such as "sweethearting" during operation of the checkout system 10 by a checkout clerk. Such capabilities are not possible with heretofore designed assisted checkout systems. This is true since heretofore designed assisted checkout systems have not been configured with a security scale due to, amongst other reasons, cost of the scale. However, since the design of the checkout system 10 of the present invention includes a security scale (i.e. the security scale 68) for operation of the checkout system 10 in its self-service mode of operation, novel additions, manipulations, and modifications to the operating system software allows the security scale 68 to be utilized to provide security against improprieties on the part of the checkout clerk during operation of the checkout system 10 in its assisted mode of operation without adding additional costs to manufacture of the system 10.

It should be appreciated that other security mechanisms may also be operated during operation of the checkout system 10 in its assisted mode of operation. For example, the security deactivation device 172 of the present invention is operated to generate a deactivation field in the form of a magnetic field or electromagnetic field during operation of the checkout system 10 so as to deactivate electronic tags associated with items for purchase as the items are scanned by the checkout clerk with the scanner 24. In particular, as described above, the security deactivation device 172 generates a deactivation field (e.g. a magnetic and/or electromagnetic field) proximate to a scanner detection zone associated with the scanner 24. By generating the deactivation field proximate to the scanner detection zone, a scanning motion utilized by the checkout clerk to scan an item with the scanner 24 causes the item to be advanced through the deactivation field thereby deactivating the electronic security tag secured to the item in the same scanning motion.

Figure 27:
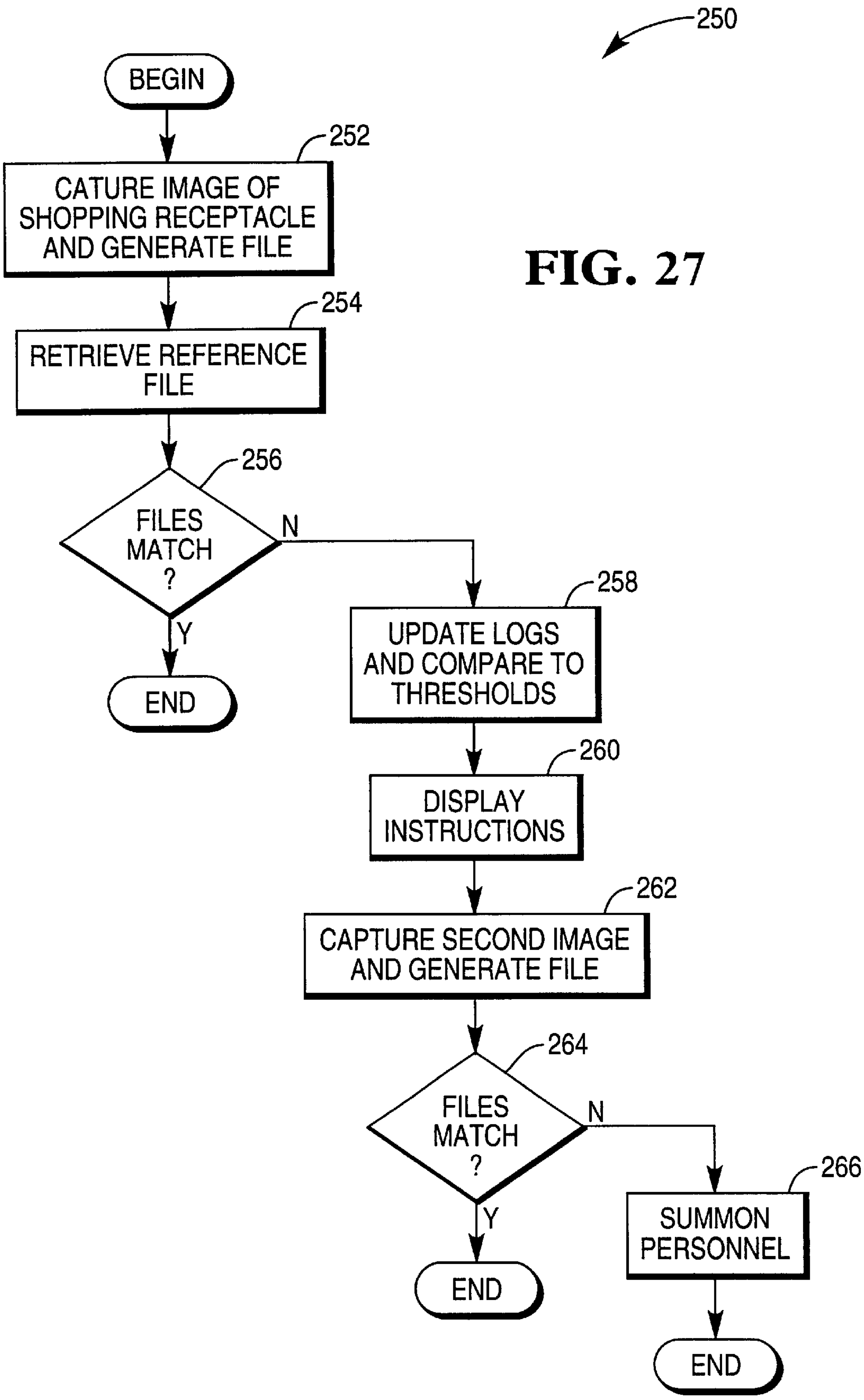
FIG. 27 is a flowchart which shows the video security routine for providing security during operation of the checkout system of the present invention.

Moreover, the video system 94 (see FIG. 9) may also be utilized to provide security from improprieties such as theft when the checkout system 10 is being operated in its assisted mode of operation. In particular, referring now to FIG. 27, a video security routine 250 is executed, for example, at the end of the itemization step 206 (see FIG. 25), prior to the beginning of the finalization step 208. The video security routine 250 monitors video images captured by the video camera 94*a* in order to determine if the customer's shopping receptacle (e.g. the shopping cart 238 or the shopping basket 240) is devoid of items.

The video security routine 250 begins with step 252 in which the processing unit 78*b* communicates with the video system 94 in order to capture and thereafter store video images associated with a shopping receptacle. In particular, the processing unit 78*b* operates the video system 94 so as to cause the video camera 94*a* to capture a video image of the shopping cart 238 or the shopping basket 240 (see FIG. 16) thereby creating an electronic video file of the captured video image of the shopping cart 238 or shopping basket 240. The video security routine 250 then advances to step 254.

In step 254, the processing unit 78*b* retrieves a reference electronic video file. In particular, the processing unit 78*b* communicates with either a local memory device (e.g. the memory modules 78*d* or the hard drive) or a network memory device associated with the retailer's network 184 in order to retrieve the reference electronic video file therefrom. As discussed above, a reference video image of an empty shopping cart or shopping basket is stored as a reference electronic video file in either a local memory device associated with the checkout system (e.g. the memory modules 78*d* or a hard drive) or on a network memory device associated with the retailer's network 184. Once the reference electronic video file of the empty shopping cart or shopping basket has been retrieved from the memory device, the video security routine 250 advances to step 256.

In step 256, the processing unit 78*b* compares the electronic video files in order to determine if the customer's shopping cart 238 or shopping basket 240 is devoid of items (i.e. empty). In particular, the electronic video file associated with the captured image of the shopping cart 238 or shopping basket 240 is compared to the reference electronic video file associated with an empty shopping cart or shopping basket. If the electronic video file associated with the captured image of the shopping cart 238 or shopping basket 240 matches the reference electronic video file associated with an empty shopping cart or shopping basket, a receptacle-empty control signal is generated and the scale security routine 250 ends thereby advancing the general routine 200 to the finalization step (see FIG. 25). However, if the electronic video file associated with the captured image of the shopping cart 238 or shopping basket 240 does not match the reference electronic video file associated with an empty shopping cart or shopping basket, an item-remaining control signal is generated and the video security routine 250 advances to step 258.

In step 258, the processing unit 78*b* increments by a predetermined value both the aggregate log and a particular event log associated with items remaining in a shopping receptacle. More specifically, the processing unit 78*b* generates an output signal which is sent to the local memory devices (e.g. the memory modules 78*d* or the hard drive) which causes the event log and the aggregate log to be incremented in the local memory devices by a value of one.

Thereafter, the processing unit 78*b* determines if the total value of either the event log associated with items remaining in a shopping receptacle or the aggregate log exceeds the respective predetermined threshold value for each log. More specifically, if the event log associated with items remaining in a shopping receptacle exceeds its predetermined threshold value, the processing unit 78*b* causes an output signal to be generated which causes the paging device 86 and the status light device 84 to be operated to page or otherwise summon retail personnel such as a manager in order to assist the checkout clerk in order to determine if the customer is attempting to commit an impropriety such as theft. In addition, if the aggregate log exceeds its predetermined threshold value, the processing unit 78*b* generates an output signal which causes the paging device 86 and the status light device 84 to be operated to page or otherwise summon retail personnel such as a manager in order to assist the checkout clerk in a similar manner. The video security routine 250 then advances to step 260.

In step 260, the processing unit 78*b* causes a message to be displayed on the display monitor 76*a* associated with the personnel interface terminal 76 which instructs the checkout clerk to inform the customer that he or she has items remaining in his or her shopping cart 238 or shopping basket 240. The video security routine 250 then advances to step 262.

In step 262, the processing unit 78*b* communicates with the video system 94 in order to capture and thereafter store a second video image associated with the shopping receptacle in order to determine if the customer removed the remaining item or items as instructed. In particular, the processing unit 78*b* operates the video system 94 so as to cause the video camera 94*a* to capture a second video image of the shopping cart 238 or the shopping basket 240 thereby creating a second electronic video file having the second captured video image of the shopping cart 238 or shopping basket 240. The video security routine 250 then advances to step 264.

In step 264, the processing unit 78*b* compares the electronic video files in order to determine if the customer removed the item or items from his or her shopping cart 238 or shopping basket 240 as instructed. In particular, the electronic video file associated with the second captured image of the shopping cart 238 or shopping basket 240 is compared to the reference electronic video file associated with an empty shopping cart or shopping basket. If the electronic video file associated with the second captured image of the shopping cart 238 or shopping basket 240 matches the reference electronic video file associated with an empty shopping cart or shopping basket, a receptacle-empty control signal is generated and the scale security routine 250 ends thereby advancing the general routine 200 to the finalization step (see FIG. 25). However, if the electronic video file associated with the second captured image of the shopping cart 238 or shopping basket 240 does not match the reference electronic video file associated with an empty shopping cart or shopping basket, an item-remaining control signal is generated and the video security routine 250 advances to step 266.

In step 266, the processing unit 78*b* generates a personnel-needed control signal in response to generation of the second item-remaining control signal. In particular, the processing unit 78*b* causes a message to be displayed on the display monitor 76*a* of the personnel interface terminal 76 which informs the checkout clerk of the item or items remaining in the customer's shopping cart 238 of shopping basket 240. Moreover, the processing unit 78*b* may also communicate with the paging device 86 and the status light device 84 in order to summon additional retail personnel such as a customer service manager.

As described above, use of the video security routine 250 provides the checkout system 10 with numerous advantages over heretofore designed checkout systems. For example, as described in detail above, use of the video security routine 250 provides security from unintentional or intentional improprieties such as theft in regard to items remaining in the customer's shopping receptacle. Such remaining items might otherwise be allowed to leave the retailer's store without having first been paid for.

Moreover, the video camera 94*a* may also be operated to capture a video image of the checkout clerk operating the checkout system 10. In a known manner, the captured video image of the checkout clerk is then stored in the form of an electronic video file by the processing unit 78*b*. A subsequent video image (which is representative of the captured video image) may then be extracted from the electronic video file for use by the checkout system 10. For example, an extracted video image of the checkout clerk (i.e. a video image extracted from the stored electronic file) could be displayed on the display monitor 76*a* of the personnel interface terminal 76 in order to serve as a psychological deterrent against "sweethearting" or other improprieties. Moreover, the extracted video image of the checkout clerk could be printed with the receipt printer 54 in order to serve as an additional psychological deterrent against "sweethearting" or other improprieties.

As alluded to above, the status light device 84 and the paging device 86 may be utilized during operation of the checkout system 10 in its assisted mode of operation in order to page or otherwise summon retail personnel to the checkout system 10. In particular, if during operation of the checkout system 10 in its assisted mode of operation, an intervention-needed activity is detected, the status light device 84 and the paging device 86 are operated so as to summon retail personnel such as a customer service manager in order to provide assistance to the checkout clerk. As described in detail above, such an intervention-needed activity may take the form of a security-breach activity in which the checkout system 10 is being operated in a manner which is placing the retailer in a position of potential financial loss due to goods being taken from the store without having first been paid for (either intentionally or unintentionally). An intervention-needed activity may also take the form of a non-security-breach activity in which the checkout clerk is in need of assistance or the checkout system 10 is in need of maintenance, but the retailer is not at risk of financial loss due to goods being taken from the store without having first been paid for. For example, if the checkout clerk scanned a first item, but then placed a second item of greater value into a grocery bag as detected by, for example, the security scale 68 (e.g. "sweethearting"), the processing unit 78*b* concludes that an intervention-needed activity has occurred. Moreover, if the checkout clerk operating the system 10 touches a particular key on the keypad 76*b* associated with the personnel interface terminal 76 (see FIG. 23), thereby indicating that he or she is in need of assistance, the processing unit 78*b* concludes that an intervention-needed activity has occurred.

In addition, the processing unit 78*b* may monitor the status of the retail peripheral devices associated with the checkout system 10 in order to determine if an intervention-needed activity has occurred. For example, the processing unit 78*b* preferably monitors the currency level within the coin dispenser 48 and the bill dispenser 52 in order to determine if either currency dispenser 48, 52 is in need of restocking. Moreover, the processing unit 78*b* preferably monitors the paper supply level within the receipt printer 54 and a journal printer 88 (see FIG. 9) in order to determine if either printer 54, 88 is in need of restocking. It should be appreciated that if any one of the currency dispensers 48, 52 or the printers 54, 88 is in need of restocking, the processing unit 78*b* concludes that an intervention-needed activity has occurred.

As described above, once an intervention-needed activity has been detected, the status light device 84 is operated to summon retail personnel. For example, the status light device 84 may display a first colored light (e.g. yellow) in order to notify retail personnel that intervention is needed prior to the end of the current checkout transaction. Alternatively, the status light device 84 may display a second colored light (e.g. red) in order to notify retail personnel that intervention is needed immediately.

As with the status light device 84, the paging device 86 is utilized to page or otherwise summon retail personnel to the checkout system 10 once an intervention-needed activity has been detected. The paging device 86 is particularly useful since it is operable to communicate with retail personnel who are positioned at locations within or outside of the store which are out of the view of the status light device 84. In particular, the signal transmitter 86*a* of the paging device 86 communicates with a number of portable communication devices such as wireless alphanumeric pagers 90. Hence, upon detection of an intervention-needed activity by the processing unit 78*b*, an intervention-needed control signal is generated. Upon generation of an intervention-needed control signal, the signal transmitter 86*a* generates an RF personnel-request signal which is received by the pagers 90. The personnel-request signal includes a specific alphanumeric message which includes such information as the nature of the intervention which is needed and the identity of the particular checkout system 10 which requires assistance. For example, if one of the currency dispensers 48, 52 needs to be restocked, the signal transmitter 86*a* generates an RF personnel-request signal which causes a message to be displayed on one of the pagers 90 which informs the customer service manager wearing the pager 90 that a particular checkout system 10 is, for example, running low on dimes.

Moreover, as shown in FIG. 22 and discussed above, the signal transmitter 86*a* may communicate with the signal receiver 92*a* associated with the intercom device 92 in order to generate audible messages which are broadcast to retail personnel within the store with the speakers 92*b*. In particular, upon detection of an intervention-needed activity by the processing unit 78*b*, an intervention-needed control signal is generated. Generation of an intervention-needed control signal causes the signal transmitter 86*a* to generate an RF personnel-request signal which is received by the signal receiver 92*a* associated with the intercom device 92. The personnel-request signal includes a specific code which corresponds to a number of specific, prerecorded audible messages stored in, or otherwise maintained by, the controller 92*c* of the intercom device 92. For example, each of the prerecorded messages may include such information as the nature of the intervention which is needed and the identity of the particular checkout system 10 which requires assistance. The controller 92*c* causes such prerecorded audible messages to be broadcast with the speakers 92*b* so as to be audibly detected by retail personnel such as a customer service manager within the retailer's store. For example, if one of the currency dispensers 48, 52 needs to be restocked, the signal transmitter 86*a* generates an RF personnel-request signal which, once received by the signal receiver 92*a*, causes an audible message to be broadcast on the speakers 92*b* which informs the customer service manager that a particular checkout system 10 is, for example, running low on dimes.

Additionally, during operation of the checkout system 10 in its assisted mode of operation, the display monitor 78*a* of the interactive customer interface terminal 78 may be utilized to display certain information to the customer while the checkout clerk is entering the customer's items for purchase. For example, a customer-specific message such as a customer-specific advertisement which advertises a product that was purchased by the customer during a previous visit to the retailer's store may be displayed on a first portion 272 of the display monitor 78*a*, as shown in FIG. 21, while transaction information such as item description and price is displayed on a second portion 274 of the display monitor 78*a*. In particular, during an assisted checkout transaction, the processing unit 78*b* retrieves information from a customer profile database which contains customer-specific information (e.g. previous purchases) about each of the retailer's customers. Hence, as shown in FIG. 21, if the customer routinely purchases "ACME BEER", an advertisement for "ACME BEER" may be displayed on the first portion 272 of the display monitor 78*a* while the checkout clerk is entering the customer's items for purchase.

Moreover, such a customer-specific message may include a customer-specific advertisement which advertises a product that may be used in conjunction with a product which was previously scanned or otherwise entered into the checkout system 10 during the current checkout transaction. For example, if the checkout clerk scans a case of beer included in the customer's items for purchase, an advertisement relating to pretzels may be displayed to the customer on the first portion 272 if the display monitor 78*b* since pretzels are commonly consumed with beer.

It should be appreciated that such customer-specific messages may also be communicated by other components associated with the checkout system 10. For example, customer-specific messages may be displayed to the checkout clerk with the display monitor 76*a* of the personnel interactive terminal 76. For instance, if the checkout clerk scans a case of beer or other type of alcohol, a customer-specific message may displayed on the display monitor 76*a* which informs the checkout clerk that the customer is not old enough to purchase the beer or other type of alcohol. Similarly, customer-specific advertisement messages could be displayed on the display monitor 76*a* in order to be verbally relayed or otherwise communicated to the customer in a personal manner by the checkout clerk.

As described above, the checkout system 10 may also be operated to perform a self-service checkout transaction in which the customer completes his or her checkout transaction without the assistance of retail personnel such as a checkout clerk. Prior to performing a self-service checkout transaction, system components associated with the checkout system 10 are first positioned in their respective self-service positions. In particular, the scanner 24 must be rotated from its assisted scanner position (as shown in FIGS. 1–4) to its self-service scanner position (as shown in FIGS. 5–8). As shown in FIG. 11, the sliding drawer assembly 38 is first slid into its extended position such that the scanner 24 (and hence the product scale 26) may be rotated from its assisted scanner position to its self-service scanner position in which the vertical scanning window 24*b* faces the customer side 40 of the checkout system 10. Thereafter, the sliding drawer assembly is slid back into its retracted position within the interior of the terminal base 34 such that operation of the scanner 24 by the customer may be commenced (see FIGS. 5–8).

Figure 17:
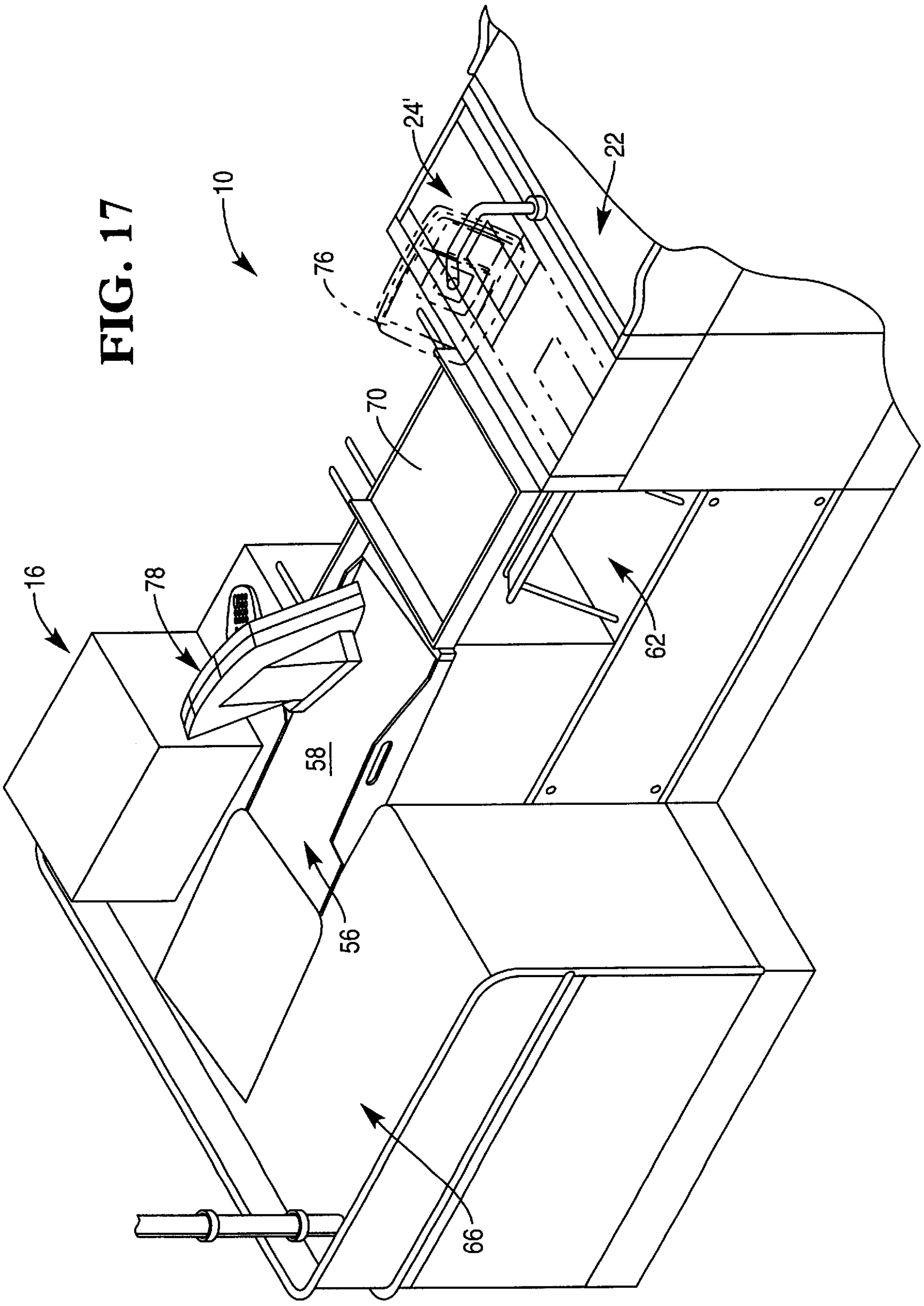
FIG. 17 is a fragmentary perspective view of the checkout system of FIG. 1 which shows a "flatbed" scanner which may be utilized in the construction of the checkout system.

It should be appreciated that the scanner 24 may be moved from its assisted scanner position to its self-service scanner position in other manners. In particular, as shown in FIG. 17, the scanner 24 may be embodied as a known "flatbed" scanner (hereinafter designated as scanner 24') which contains a single, horizontal scanning aperture similar to the horizontal scanning window 24*a*. In such a configuration, it is not necessary to rotate the scanner 24' between its assisted and self-service positions due to the absence of the vertical scanning window 24*b*. Hence, the scanner 24' may be slidably secured to the terminal base 34 in order to be slid between its assisted scanner position (as shown in phantom lines in FIG. 17) and its self-service scanner position (as shown in solid lines in FIG. 17). It should be appreciated that, as shown in phantom lines in FIG. 17, the personnel interface terminal 76 is mounted on a support such as a pole or the like in conjunction with use of the scanner 24' due to the absence of the housing 82.

Moreover, prior to operation of the checkout system 10 in its self-service mode of operation, the personnel interface terminal 76 is rotated to its operative position in which the display monitor 76*a* associated therewith faces the personnel side 42 of the checkout system 10. In particular, when the scanner 24 is rotated to its self-service scanner position as described above, the personnel interface terminal 76 (being mounted on the housing 82 which houses the vertical scanning window 24*b*) is likewise rotated thereby causing the display monitor 76*a* and the keypad 76*b* to face the customer side 40 of the checkout system 10. However, as described above, the personnel interface terminal 76 is not utilized by the customer when the checkout system 10 is being operated in its self-service mode of operation. Accordingly, it is desirable to position the personnel interface terminal 76 such that the display monitor 76*a* and the keypad 76*b* face away from the customer. As shown in FIGS. 5–8 and 24, the terminal support member 80 (and hence the personnel interface terminal 76) may be rotated relative to the housing 82 which houses the vertical scanning window 24*b* of the scanner 24 such that the display monitor 76*a* and the keypad 76*b* face the personnel side 42 of the checkout system 10 when the checkout system 10 is operated in its self-service mode of operation.

It should be appreciated that such positioning of the personnel interface terminal 76 (i.e. facing it away from the customer) provides numerous advantages to the design of the checkout system 10 when it is being operated in its self-service mode of operation. For example, such positioning of the personnel interface terminal 76 reduces or potentially eliminates the possibility that the keypad 76*b* is accidentally operated by the customer. Moreover, by facing the keypad 76*b* and the display monitor 76*a* away from the customer, the customer is confronted with fewer system components when approaching the checkout system 10 which reduces the “intimidation effect” on new or inexperienced customers thereby rendering the new or inexperienced customer more likely to utilize the checkout system 10 as a self-service solution. Moreover, as shown in FIG. 24, such positioning of the personnel interface terminal 76 allows the laminated sign 80*b* secured to the surface 80*a* of the terminal support member 80 to be viewed by the customer. As described above, the message printed on the sign 80*b* is displayed to the customer in order present an advertisement for a product or service offered by the retailer. Moreover, the retailer may sell the space on the laminated sign 80*b* to an outside company or business (e.g. a real estate agent or mortgage broker) in order to generate additional revenue. The message printed on the sign 80*b* may alternatively include instructions which instruct the customer on operation of the checkout system 10.

Yet further, the set-aside item shelf 70 is moved relative to the terminal base 34 so as to be positioned in its self-service shelf position. In particular, as shown in FIGS. 5–8 and 15, the set-aside item shelf 70 may be slid or pivoted (depending on the type of mounting configuration utilized to secure the shelf 70 to the terminal base 34) to its self-service shelf position such that items may be positioned thereon by the customer during a self-service checkout transaction. As shown in FIG. 5, by positioning the set-aside item shelf 70 in its self-service position, the self-service bagwell 60 is exposed thereby allowing the customer to advance items into the grocery bags (not shown) located therein.

Moreover, as shown in FIGS. 5 and 20, prior to operation of the checkout system 10 in its self-service mode of operation, the support arm assembly 160 is manipulated so as to cause the interactive customer interface terminal 78 to assume its self-service terminal position in which the display monitor 78*a* faces the general direction of the area located in front of the self-service bagwell 60. It should be appreciated that during a self-service checkout transaction, the customer is generally positioned in the proximity of the area located in front of the self-service bagwell 60 in order to scan items with the scanner 24 and thereafter place the items in grocery bags positioned in the self-service bagwell 60. Moreover, by positioning the display monitor 78*a* in the position shown in FIG. 20 (i.e. a self-service monitor position), retail information such as transaction information (e.g. product prices and descriptions), along with other messages such as instructional and advertisement messages, may be displayed on the display monitor 78*a* for viewing by the customer while the customer enters his or her items for purchase with the scanner 24.

It should be appreciated that once the system components associated with checkout system 10 have been positioned in the manner described above, retail personnel actuates the system 10 prior to allowing the first customer to operate the system 10. For example, the customer service manager toggles the supervisor switch 106 (see FIG. 9) so as to cause the processing unit 78*b* to execute a self-service version of the operating system software associated with the checkout system 10. In particular, although the operating system software is essentially the same for checkout system 10 irrespective of whether or not the system 10 is being operated in its assisted mode of operation or its self-service mode of operation, certain system functions may be enabled or disabled as the system 10 is switched between its two modes of operations based on a particular system configuration. Moreover, prior to operation of the checkout system 10 in its self-service mode of operation, the customer service manager preferably actuates the lane light 104 (see FIG. 9) so as to cause the lane light 104 to illuminate a “SELF-SERVICE” message in order to indicate to customers that the particular checkout system 10 is being operated as a self-service checkout system.

Figure 28:
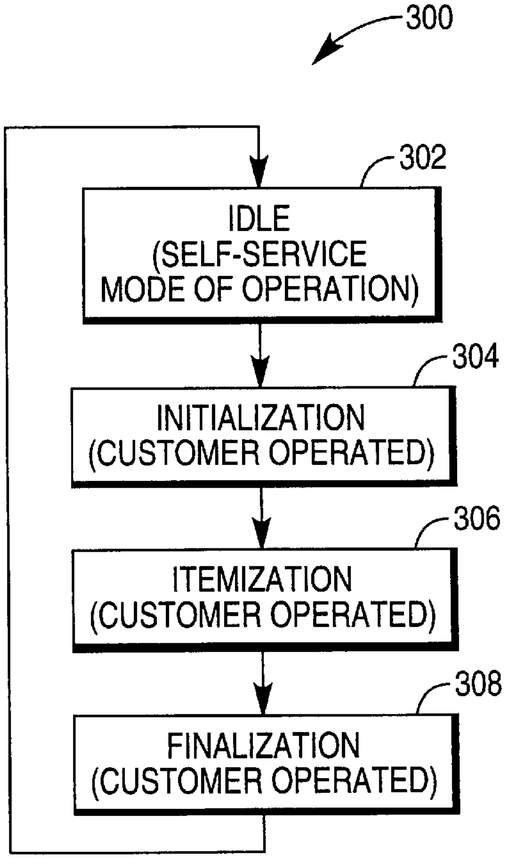
FIG. 28 is a flowchart which shows a general procedure or routine for operating the checkout system of the present invention in its self-service mode of operation.

Referring now to FIG. 28, there is shown a flowchart which sets forth a general procedure 300 for checking out items through the checkout system 10 when the system 10 is being operated in its self-service mode of operation. It should be appreciated that when the customer arrives at the checkout system 10, the system 10 is in an idle state (step 302). An initialization step 304 is executed prior to checking out items for purchase. In particular, a message is displayed on the display monitor 78*a* associated with the interactive customer interface terminal 78 which instructs the customer to (1) to select a desired method of payment by touching a particular portion of the touch screen associated with the display monitor 78*a*, and/or (2) identify himself or herself by swiping his or her loyalty card, debit card, credit card, or smart card through the card reader associated with the electronic payment terminal 44.

At the completion of the initialization step 304, the routine 300 advances to an itemization step 306 where the customer enters the customer’s individual items for purchase by scanning the items across the scanner 24. Moreover, in step 306, the customer may enter items, such as produce items or the like, by weighing the items with the product scale 26, and thereafter entering a product lookup code associated with the item via the touch screen associated with the display monitor 78*a*. Further, in step 306 the customer may enter an item by manually entering the product identification code associated with the item via use of the touch screen associated with the display monitor 78*a*. Such manual entry of an item may be necessary for items (which would otherwise be entered via the scanner 24) if the product identification code printed on the item is not readable by the scanner 24 or if the item is too large or bulky to be scanned with the scanner 24. It should be appreciated that the checkout system 10 may be configured such that the routine 300 allows more experienced customers to bypass the initialization step 304 thereby advancing directly to the itemization step 306. In such a configuration, the customer would begin the transaction by scanning or otherwise entering his or her first item for purchase.

At the completion of the itemization step 306, an end-of-itemization control signal is generated and the routine 300 advances to a finalization step 308 in which (1) a transaction receipt is printed by the receipt printer 54, (2) a record of the transaction is printed on the journal printer 88, and (3) payment is tendered by either inserting currency into the currency acceptors (i.e. the coin acceptor 46 and/or the bill acceptor 50), charging a credit card or debit card account or decreasing a value amount stored on a smart card via the electronic payment terminal 44. In the case of when a customer inserts currency into the coin acceptor 46 and/or the bill acceptor 50, the checkout system 10 may provide change via a currency dispenser (i.e. the coin dispenser 48 and/or the bill dispenser 52). After completion of the finalization step 308, the routine 300 returns to step 302 in which the checkout system 10 remains in the idle condition until a subsequent customer initializes the system 10.

During operation of the checkout system 10 in its self-service mode of operation, a number of software routines are executed to provide security from improprieties such as theft. For example, a scale security routine similar to the scale security routine 210 (see FIG. 26) is executed in order to monitor the movement of items into and out of the post-scan area 18. More specifically, during operation of the checkout system 10 in its self-service mode of operation, a scale security routine is executed which monitors (1) the movement of items into and out of the self-service bagwell 60, and (2) onto and off of the set-aside item shelf 70 in order to reduce the number of occasions in which the customer commits an impropriety such as theft. Since the scale security routine executed when the checkout system 10 is being operated in its self-service mode of operation is somewhat similar to the scale security routine executed when the checkout system 10 is being operated in its assisted mode of operation, further discussion thereof is not warranted.

It should be appreciated that other security mechanisms may also be operated during operation of the checkout system 10 in its self-service mode of operation. For example, the security deactivation device 172 of the present invention is operated to generate a deactivation field in the form of a magnetic field or electromagnetic field during operation of the checkout system 10 in its self-service mode of operation so as to deactivate electronic tags associated with items for purchase as the items are scanned by the customer with the scanner 24. In particular, as described above, the security deactivation device 172 generates a deactivation field (e.g. a magnetic and/or electromagnetic field) proximate to a scanner detection zone associated with the scanner 24. By generating the deactivation field proximate to the scanner detection zone, a scanning motion utilized by the customer to scan an item with the scanner 24 causes the item to be advanced through the deactivation field thereby deactivating the electronic security tag secured to the item in the same scanning motion.

As described above, such utilization of the security deactivation device 172 is particularly useful when the checkout system 10 is being operated in its self-service mode of operation. In particular, by "automatically" deactivating the electronic security tag when the item is being scanned by a customer (i.e. deactivating the tag during a scanning motion), the customer is not required to perform additional operations for the sole purpose to deactivating the tag prior to exiting the store. In particular, heretofore designed self-service checkout systems have required the customer to take his or her items for purchase to a centralized area such as a terminal operated by a retail clerk after the customer has completed his or her transaction in order to allow the clerk to determine which of the customer's items contain electronic security tags that need to be deactivated. Thereafter, the clerk manually deactivates each of the electronic security tags associated with the customer's items for purchase. It should be appreciated that the extra step of requiring the customer to take his or her items to the centralized area to deactivate the electronic security tags adds cost to the retailer's operation (e.g. the cost associated with staffing the centralized area with a retail clerk) and also creates an inconvenience for the customer by requiring the customer to spend additional time in the retailer's store. Such an inconvenience to the customer is augmented if a line or queue is present at the centralized area.

Hence, utilization of the security deactivation device 172 of the present invention solves such shortcomings of heretofore self-service checkout systems by deactivating the electronic security tag as part of routine entry of items into the checkout system 10 by the customer. In particular, utilization of the security deactivation device 172 eliminates the need for the retail clerk to intervene into the customer's transaction thereby reducing labor costs associated with the retailer's operation, along with increasing convenience to the customer by not requiring him or her to stand in a potentially long line or queue. Moreover, by generating the deactivation field proximate to the scanner detection zone such that the electronic security tag is deactivated as a result of an item scanning motion, the customer is not required to operate a separate deactivation device such as a magnetic pad or the like thereby reducing the number of components that a customer is presented with during operation of the system 10.

It should be appreciated that the security deactivation device 172 may be configured to continuously generate the deactivation field (e.g. the magnetic or electromagnetic field), or may only generate the deactivation field once the product code associated with the item has been captured by the scanner 24. In particular, under the premise that if the customer is making an attempt to scan the item, the customer is likely not trying to commit an impropriety such as theft, the security deactivation device 172 may be configured to continuously generate the deactivation field such that the electronic security tag is deactivated whether or not the product code associated with the item is actually captured with the scanner 24. For example, if the customer attempts to scan the item with the scanner 24 (by advancing the item through the scanner detection zone with the bar code associated with the item facing one of the scanning windows 24*a*, 24*b*), but the product code is not captured by the scanner for any reason, the security deactivation device 172, if configured to continuously produce the deactivation field, may cause the electronic security label to be deactivated even though the item was not actually entered in the checkout system 10. However, in the case of operation of the checkout system 10 by an honest customer, such premature deactivation of the security tag is not an issue once the customer is subsequently successful at entering the item (e.g. by re-scanning the item or manually entering the product code). It should be appreciated that the customer is likely to perform such re-scanning or manual entry of the item since the customer is not made aware of the fact that the electronic security tag has been deactivated.

However, to prevent the unlikely occurrence that the electronic security tag is prematurely deactivated and the item is not subsequently entered into the checkout system 10, the security deactivation device 172 may be configured to generate the deactivation field only after the product code associated with the item has been entered into the system 10. In particular, an item-entered control signal is generated when a product code associated with an item is captured by the scanner 24. In response to generation of the item-entered control signal, the security deactivation device 172 may be instantaneously actuated so as to generate a deactivation field thereby deactivating the electronic security tag associated with the scanned item. In such a configuration, the location, width, and/or shape of the deactivation field generated by the security deactivation device 172 may be configured to ensure that the item is advanced therethrough during a scanning motion or subsequent handling motion (e.g. the motion associated with placement of the item into the post-scan area 18).

Moreover, the video system 94 (see FIG. 9) may also be utilized to provide security from improprieties such as theft when the checkout system 10 is being operated in its self-service mode of operation. In particular, a video security routine similar to the video security routine 250 is executed, for example, at the end of the itemization step 306 (see FIG. 28), but prior to the beginning of the finalization step 308. As with the video security routine 250 utilized when the checkout system 10 is operated in its assisted mode of operation, the video security routine utilized when the checkout system 10 is being operated in its self-service mode of operation monitors video images captured by the video camera 94*a* in order to determine if the customer's shopping receptacle (e.g. the shopping cart 238 or the shopping basket 240) is devoid of items (i.e. empty). Since the video security routine executed when the checkout system 10 is being operated in its self-service mode of operation is somewhat similar to the video security routine executed when the checkout system 10 is being operated in its assisted mode of operation, further discussion thereof is not warranted.

Moreover, the video camera 94*a* may also be operated to capture a video image of the customer operating the checkout system 10. In a known manner, the captured video image of the checkout clerk is then stored in the form of an electronic video file by the processing unit 78*b*. A subsequent video image (which is representative of the captured video image) may then be extracted from the electronic video file for use by the system 10. For example, an extracted video image of the customer (i.e. a video image extracted from the stored electronic file) may be displayed on the display monitor 78*a* of the interactive customer interface terminal 78 in order to serve as a psychological deterrent against theft or other improprieties. Moreover, the extracted video image of the customer may also be printed with the receipt printer 54 onto the customer's transaction receipt 96 (see FIG. 14) in order to serve as an additional psychological deterrent against theft or other improprieties.

As alluded to above, the status light device 84 and the paging device 86 may be utilized during operation of the checkout system 10 in its self-service mode of operation in order to page or otherwise summon retail personnel to the checkout system 10. In particular, if during operation of the checkout system 10 in its self-service mode of operation, an intervention-needed activity is detected, the status light device 84 and the paging device 86 are operated so as to summon retail personnel such as a customer service manager in order to assist and/or investigate the customer's operation of the system 10. As described in detail above, such an intervention-needed activity may take the form of a security-breach activity in which the checkout system 10 is being operated in a manner which is placing the retailer in a position of potential financial loss due to goods being taken from the store without having first been paid for (either intentionally or unintentionally). An intervention-needed activity may also take the form of a non-security-breach activity in which the customer is in need of assistance or the checkout system 10 is in need of maintenance, but the retailer is not at risk of financial loss due to goods being taken from the store without having first been paid for. For example, if the customer scanned a first item, but then placed a second item of greater value into a grocery bag as detected by, for example, the security scale 68, the processing unit 78*b* concludes that an intervention-needed activity has occurred. Moreover, if the customer operating the system 10 touches a particular portion of the touch screen associated with the display monitor 78*a*, thereby indicating that he or she is in need of assistance, the processing unit 78*b* concludes that an intervention-needed activity has occurred.

In addition, the processing unit 78*b* may monitor the status of the retail peripheral devices associated with the checkout system 10 in order to determine if an intervention-needed activity has occurred. For example, the processing unit 78*b* preferably monitors the currency level within the coin dispenser 48 and the bill dispenser 52 in order to determine if either currency dispenser 48, 52 is in need of restocking. Moreover, the processing unit 78*b* preferably monitors the paper supply level within the receipt printer 54 and a journal printer 88 (see FIG. 9) in order to determine if either printer 54, 88 is in need of restocking. It should be appreciated that if any one of the currency dispensers 48, 52 or the printers 54, 88 is in need of restocking, the processing unit 78*b* concludes that an intervention-needed activity has occurred.

As described above, once an intervention-needed activity has been detected, the status light device 84 is operated to summon retail personnel. For example, the status light device 84 may display a first colored light (e.g. yellow) in order to notify retail personnel that intervention is needed prior to the end of the current checkout transaction. Alternatively, the status light device 84 may display a second colored light (e.g. red) in order to notify retail personnel that intervention is needed immediately.

As with the status light device 84, the paging device 86 is utilized to page or otherwise summon retail personnel to the checkout system 10 once an intervention-needed activity has be detected. The paging device 86 is particularly useful since it is operable to communicate with retail personnel who are positioned at locations within or outside of the store which are out of the view of the status light device 84. In particular, the signal transmitter 86*a* of the paging device 86 communicates with a number of portable communication devices such as wireless alphanumeric pagers 90. Hence, upon detection of an intervention-needed activity by the processing unit 78*b*, an intervention-needed control signal is generated. Upon generation of an intervention-needed control signal, the signal transmitter 86*a* generates an RF personnel-request signal which is received by the pagers 90. The personnel-request signal includes a specific alphanumeric message that includes such information as the nature of the intervention that is needed and the identity of the particular checkout system 10 that requires assistance. For example, if one of the currency dispensers 48, 52 needs to be restocked, the signal transmitter 86*a* generates an RF personnel-request signal which causes a message to be displayed on one of the pagers 90 which informs the customer service manager wearing the pager 90 that a particular checkout system 10 is, for example, running low on dimes.

Moreover, as shown in FIG. 22 and discussed above, the signal transmitter 86*a* may communicate with the signal receiver 92*a* associated with the intercom device 92 in order to generate audible messages which are broadcast to retail personnel within the store with the speakers 92*b*. In particular, upon detection of an intervention-needed activity by the processing unit 78*b*, an intervention-needed control signal is generated. Generation of an intervention-needed control signal causes the signal transmitter 86*a* to generate an RF personnel-request signal which is received by the signal receiver 92*a* associated with the intercom device 92. The personnel-request signal includes a specific code which corresponds to a number of specific, prerecorded audible messages stored in, or otherwise maintained by, the controller 92*c* of the intercom device 92. For example, each of the prerecorded messages may include such information as the nature of the intervention which is needed and the identity of the particular checkout system 10 which requires assistance. The controller 92*c* causes such prerecorded audible messages to be broadcast with the speakers 92*b* so as to be audibly detected by retail personnel such as a customer service manager within the retailer's store. For example, if one of the currency dispensers 48, 52 needs to be restocked, the signal transmitter 86*a* generates an RF personnel-request signal which, once received by the signal receiver 92*a*, causes an audible message to be broadcast on the speakers 92*b* which informs the customer service manager that a particular checkout system 10 is, for example, running low on dimes.

Additionally, during operation of the checkout system 10 in its self-service mode of operation, the display monitor 78*a* of the interactive customer interface may be utilized to display certain information to the customer while the customer is entering his or her items for purchase. For example, a customer-specific message such as a customer-specific advertisement which advertises a product that was purchased by the customer during a previous visit to the retailer's store may be displayed on the first portion 272 of the display monitor 78*a*, as shown in FIG. 21, while transaction information such as item description and price is displayed on the second portion 274 of the display monitor 78*a*. In particular, during a self-service checkout transaction, the processing unit 78*b* retrieves information from a customer profile database which contains customer-specific information (e.g. previous purchases) about each of the retailer's customers. Hence, as shown in FIG. 21, if the customer routinely purchases "ACME BEER", an advertisement for "ACME BEER" may be displayed on the first portion 272 of the display monitor 78*a* while the customer is entering the his or her items for purchase.

Moreover, such a customer-specific message may include a customer-specific advertisement which advertises a product which may be used in conjunction with a product which was previously scanned or otherwise entered into the checkout system 10 during the current checkout transaction. For example, if the customer scans a case of beer, an advertisement relating to pretzels may be displayed to the customer on the first portion 272 if the display monitor 78*b* since pretzels are commonly consumed with beer.

As described above in detail, the checkout system 10 of the present invention provides numerous advantages over heretofore designed checkout systems. For example, the checkout system 10 provides a low-cost, easy-to-operate checkout system that may be operated as either an assisted checkout system or a self-service checkout system. Moreover, the checkout system 10 of the present invention provides a checkout system that may be operated as either an assisted checkout system or a self-service checkout system that can be quickly and easily converted between the two types of systems. Yet further, the checkout system 10 of the present invention provides a checkout system that can be imported into numerous foreign countries with minimal effort during the importation process in regard to compliance of local electrical standards. In addition, the checkout system 10 of the present invention provides a checkout system has enhanced data and power cable routing management relative to heretofore designed checkout systems. Moreover, the checkout system 10 of the present invention provides a checkout system which may be constructed of "off the shelf", industry-standard retail peripheral devices thereby substantially eliminating costs associated with development of proprietary data transmission and power architectures.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

There are a plurality of advantages of the present invention arising from the various features of the checkout system described herein. It will be noted that alternative embodiments of the checkout system of the present invention may not include all of the features described yet still benefit from at least some of the advantages of such features. Those of ordinary skill in the art may readily devise their own implementations of a checkout system that incorporate one or more of the features of the present invention and fall within the spirit and scope of the present invention as defined by the appended claims.

What is claimed is:

1. A method of operating a checkout terminal, comprising the steps of:

providing a first terminal cabinet having (i) a scanner, (ii) a display device, (iii) a payment device, and (iv) a processing unit which is electrically coupled to each of said scanner, said display device, and said payment device;

securing a second terminal cabinet to a cabinet interface portion of said first terminal cabinet during a first period of time, said second terminal cabinet having a belt mechanism secured thereto;

transporting a first number of items substantially toward said scanner with said belt mechanism during said first period of time;

operating said scanner so as to enter said first number of items into said checkout terminal during said first period of time;

detaching said second terminal cabinet from said first terminal cabinet;

securing a third terminal cabinet to said cabinet interface portion of said first terminal cabinet during a second period of time, wherein said third terminal cabinet (i) possesses a stationary counter top, and (ii) possesses no belt transport mechanisms;

positioning a second number of items on said stationary counter top of said third terminal cabinet during said second period of time; and operating said scanner so as to enter said second number of items into said checkout terminal during said second period of time.

2. The method of claim 1, wherein:

said second number of items are positioned in a shopping basket, and said positioning step includes the step of positioning said shopping basket on said stationary counter top of said third terminal cabinet.

3. The method of claim 1, wherein:

said providing step includes the step of electrically coupling each of said scanner, said display device, and said payment device to said processing unit with a number of data cables, and each of said number of data cables is completely contained within said first terminal cabinet.

4. The method of claim 1, wherein:

said providing step includes the step of electrically coupling each of said scanner, said display device, and said payment device to a power source with a number of power cables, and each of said number of power cables is completely contained within said first terminal cabinet.

5. The method of claim 1, wherein said cabinet interface portion of said first terminal cabinet is an upstream portion of said first terminal cabinet relative to checkout process flow of said checkout terminal.

6. A method of operating a checkout terminal, comprising the steps of:

providing a first terminal cabinet having (i) a scanner, (ii) a display device, (iii) a payment device, and (iv) a processing unit which is electrically coupled to each of said scanner, said display device, and said payment device;

securing a second terminal cabinet to a cabinet interface portion of said first terminal cabinet during a first period of time, said second terminal cabinet having a belt mechanism secured thereto;

transporting a first number of items with said belt mechanism during said first period of time;

detaching said second terminal cabinet from said first terminal cabinet;

securing a third terminal cabinet to said cabinet interface portion of said first terminal cabinet during a second period of time, wherein said third terminal cabinet (i) possesses a stationary counter top, and (ii) possesses no belt transport mechanisms; and positioning a second number of items on said stationary counter top of said third terminal cabinet during said second period of time.

7. The method of claim 6, wherein:

said second number of items are positioned in a shopping basket, and said positioning step includes the step of positioning said shopping basket on said stationary counter top of said third terminal cabinet.

8. The method of claim 6, wherein:

said providing step includes the step of electrically coupling each of said scanner, said display device, and said payment device to said processing unit with a number of data cables, and each of said number of data cables is completely contained within said first terminal cabinet.

9. The method of claim 6, wherein:

said providing step includes the step of electrically coupling each of said scanner, said display device, and said payment device to a power source with a number of power cables, and each of said number of power cables is completely contained within said first terminal cabinet.

10. The method of claim 6, wherein said cabinet interface portion of said first terminal cabinet is an upstream portion of said first terminal cabinet relative to checkout process flow of said checkout terminal.

11. A method of operating a checkout terminal, comprising the steps of:

providing a first terminal cabinet having (i) a scanner, (ii) a display device, (iii) a payment device, and (iv) a processing unit which is electrically coupled to each of said scanner, said display device, and said payment device;

securing a second terminal cabinet to a cabinet interface portion of said first terminal cabinet during a first period of time, said second terminal cabinet having a belt mechanism secured thereto;

transporting a first number of items with said belt mechanism during said first period of time;

detaching said second terminal cabinet from said first terminal cabinet;

securing a third terminal cabinet to said cabinet interface portion of said first terminal cabinet during a second period of time, wherein said third terminal cabinet (i) possesses a stationary counter top, and (ii) possesses no belt transport mechanisms; and positioning a second number of items on said stationary counter top of said third terminal cabinet during said second period of time, wherein said providing step includes the step of electrically coupling each of said scanner, said display device, and said payment device to said processing unit with a number of data cables, wherein each of said number of data cables is completely contained within said first terminal cabinet, wherein said providing step includes the step of electrically coupling each of said scanner, said display device, and said payment device to a power source with a number of power cables, and wherein each of said number of power cables is also completely contained within said first terminal cabinet.

12. The method of claim 11, wherein said cabinet interface portion of said first terminal cabinet is an upstream portion of said first terminal cabinet relative to checkout process flow of said checkout terminal.

13. The method of claim 11 wherein:

said second number of items are positioned in a shopping basket, and said positioning step includes the step of positioning said shopping basket on said stationary counter top of said third terminal cabinet.

* * * * *